(12) United States Patent
Wang et al.

(10) Patent No.: US 11,471,874 B2
(45) Date of Patent: Oct. 18, 2022

(54) METAL ORGANIC FRAMEWORK MEMBRANES

(71) Applicants: MONASH UNIVERSITY, Victoria (AU); COMMONWEALTH SCIENTIFIC AND INDUSTRIAL RESEARCH ORGANISATION, Australian Capital Territory (AU); BOARD OF REGENTS, THE UNIVERSITY OF TEXAS SYSTEM, Austin, TX (US)

(72) Inventors: Huanting Wang, Victoria (AU); Huacheng Zhang, Victoria (AU); Xingya Li, Victoria (AU); Jun Lu, Victoria (AU); Benny Freeman, Austin, TX (US); Anita Joyce Hill, Australian Capital Territory (AU)

(73) Assignees: Monash University, Victoria (AU); Commonwealth Scientific and Industrial Research Oganisation, Australian Capital Territory (AU); Board of Regents, The University of Texas System, Austin, TX (US)

( * ) Notice: Subject to any disclaimer, the term of this patent is extended or adjusted under 35 U.S.C. 154(b) by 6 days.

(21) Appl. No.: 16/771,324

(22) PCT Filed: Dec. 14, 2018

(86) PCT No.: PCT/AU2018/051341
§ 371 (c)(1),
(2) Date: Jun. 10, 2020

(87) PCT Pub. No.: WO2019/113649
PCT Pub. Date: Jun. 20, 2019

(65) Prior Publication Data
US 2020/0384454 A1 Dec. 10, 2020

(30) Foreign Application Priority Data

Dec. 15, 2017 (AU) ............................... 2017905029

(51) Int. Cl.
*B01J 47/12* (2017.01)
*B01J 41/09* (2017.01)
(Continued)

(52) U.S. Cl.
CPC .............. *B01J 47/12* (2013.01); *B01D 61/44* (2013.01); *B01D 67/0006* (2013.01);
(Continued)

(58) Field of Classification Search
None
See application file for complete search history.

(56) References Cited

U.S. PATENT DOCUMENTS 4,246,092 A    1/1981  Perry et al.
7,033,968 B1 * 4/2006  Bons ................. B01D 67/0051
                                                    502/4

(Continued)

FOREIGN PATENT DOCUMENTS

CN    106467332 A    3/2017
CN    106865555 A    6/2017
(Continued)

OTHER PUBLICATIONS

Yang, Lijia et al., "Metal-organic framework-graphene oxide composites: a facile method to highly improve the proton conductivity of PEMs operated under low humidity", Journal of Materials Chemistry A, 2015, 3, pp. 15838, 15842. (Year: 2015).*
(Continued)

*Primary Examiner* — Jason M Greene
(74) *Attorney, Agent, or Firm* — Meunier Carlin & Curfman LLC

(57) ABSTRACT

Disclosed herein is an ion selective separation membrane including: a metal organic framework layer formed on, in,
(Continued)

and/or around a substrate, the metal organic framework having a crystal structure that includes a first surface and a second surface and includes ion transport channels formed between respective pore windows in the first surface and the second surface; first and second electrodes to apply a potential difference across the membrane; wherein the respective pore windows have a pore size that is less than the hydrated diameter of the ion for which the ion selective separation membrane is selective.

23 Claims, 38 Drawing Sheets

(51) Int. Cl.
    *B01D 61/44*     (2006.01)
    *B01D 67/00*     (2006.01)
    *B01D 69/02*     (2006.01)
    *B01D 69/10*     (2006.01)
    *B01D 69/14*     (2006.01)
    *B01D 71/02*     (2006.01)
    *B01D 71/06*     (2006.01)
    *B01J 39/04*     (2017.01)
    *B01J 39/16*     (2017.01)
    *B01J 41/04*     (2017.01)

(52) U.S. Cl.
    CPC ..... *B01D 67/0023* (2013.01); *B01D 67/0051* (2013.01); *B01D 67/0079* (2013.01); *B01D 69/02* (2013.01); *B01D 69/10* (2013.01); *B01D 69/148* (2013.01); *B01D 71/021* (2013.01); *B01D 71/022* (2013.01); *B01D 71/024* (2013.01); *B01D 71/028* (2013.01); *B01J 39/04* (2013.01); *B01J 39/16* (2013.01); *B01J 41/04* (2013.01); *B01J 41/09* (2017.01); *B01D 2325/02* (2013.01); *B01D 2325/18* (2013.01); *B01D 2325/42* (2013.01)

(56) References Cited

U.S. PATENT DOCUMENTS

| | | | | |
|---|---|---|---|---|
| 2012/0310018 | A1* | 12/2012 | Lai | B01D 69/10 568/913 |
| 2016/0023167 | A1* | 1/2016 | Deemer | B01D 71/021 210/650 |
| 2017/0175278 | A1* | 6/2017 | Kimble | B01D 53/326 |

FOREIGN PATENT DOCUMENTS

| | | | | |
|---|---|---|---|---|
| CN | 107158964 | | 9/2017 | |
| CN | 107398186 | | 11/2017 | |
| CN | 107441952 A | * | 12/2017 | ............. B01D 69/12 |
| WO | 2013177199 A1 | | 11/2013 | |

OTHER PUBLICATIONS

English language machine translation for CN 107441952 A. Retrieved from translationportal.epo.org on Nov. 12, 2021. (Year: 2021).*
International Search Report and Written Opinion dated Feb. 20, 2019, from International Application No. PCT/AU2018/051341, 7 pages.
Kinik, F.P. et al. "Ionic Liquid/Metal Organic Framework Composites: From Synthesis to Applications", Chemistry and Sustainability, Energy & Materials, Jul. 21, 2017, vol. 10, No. 14, pp. 2482-63.
Office Action dated Sep. 13, 2021, from related CA application No. 3,085,642, 5 pages.
Extended EP Search Report dated Jul. 30, 2021, issued in related EP application No. 18888084.3, 9 pages.
Yang, L. et al. "Metal-organic framework—graphene oxide composites: a facile method to highly improve the proton conductivity of PEMs operated under low humidity", Journal of Materials Chemistry A, 2015, 3, 15838.
Office Action dated Dec. 17, 2021, from related CN application No. 201880080895.0, 18 pages.
Search Report dated Dec. 9, 2021, from related CN application No. 201880080895.0, 4 pages.
Office Action issued for Indian Application No. 202017027048, dated Mar. 9, 2022.

* cited by examiner

METAL ORGANIC FRAMEWORK MEMBRANES

FIELD OF THE INVENTION

The invention relates to metal organic framework membranes, such as for use in ion transport and separation processes.

BACKGROUND OF THE INVENTION

Porous membranes with ultrafast ion permeation and high ion selectivity are highly desirable for efficient mineral separation, water purification, and energy conversion, but it is still a huge challenge to efficiently separate atomic ions of the same valence and similar sizes using synthetic membranes.

Metal organic framework (MOF) membranes with a narrow distribution of pore sizes, especially in the angstrom range, are of great interest for use in separation technologies. The observation of high gas adsorption capacity and excellent selectivity through $Cu_3(BTC)_2$ with ~4.6 Å windows and other MOFs such as zeolitic imidazolate frameworks (ZIFs) with 3-5 Å windows has led to fabrication of a series of MOF membranes for pressure driven gas separation processes. However, no studies of MOF membranes for selective transport and separation of ions have been reported so far.

An object of the invention is to address and/or ameliorate at least one shortcoming of prior art membranes.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the invention there is provided an ion selective separation membrane including:

a metal organic framework layer formed on, in, and/or around a substrate, the metal organic framework having a crystal structure that includes a first surface and a second surface and includes ion transport channels formed between respective pore windows in the first surface and the second surface; and first and second electrodes to apply a potential difference across the membrane;

wherein the respective pore windows have a pore size that is less than the hydrated diameter of the ion for which the ion selective separation membrane is selective.

The inventors have found that the application of a potential difference across the ion selective separation membrane enhances the selective passage of ions through the ion selective separation membrane from the first surface to the second surface.

A wide range of metal organic framework materials may be selected, the criteria for selection include stability in the solvent in which the membrane is to be used and pore windows of less than 1 nm. Thus, in an embodiment, the metal organic framework is a solvent stable metal organic framework with sub-nanometer pore windows (e.g. pore windows having a pore size of less than 1 nm). Preferably, the metal organic framework material is selected from the group consisting of: ZIF-8, UiO-66, UiO-66-$NH_2$, UiO-66-$(COOH)_2$, and UiO-66-$N^+(CH_3)_3$.

In an embodiment, the ion transport channels include a plurality of expanded regions, each expanded region separated by an internal pore having an opening that corresponds to the shape and size of the pore windows, and wherein the size of the expanded regions is greater than the hydrated diameter of the ion for which the ion selective separation membrane is selective.

In an embodiment, the substrate is formed from a 2D layered material. Preferably, the 2D layered material is selected from the group consisting of: graphene oxide, zeolite, $MoS_2$, $WS_2$ and BN, etc. Most preferably, the 2D layered material is graphene oxide.

In an embodiment, the ion selective membrane further includes a support layer, and the metal organic framework layer is applied to a surface of the support layer. Preferably the support layer is a porous ceramic, porous metal or porous polymer. An example of a suitable support layer is an anodic aluminium oxide layer.

In an embodiment, the substrate is a porous substrate having a plurality of channels extending therethrough, and the metal organic framework layer is formed as a plug of metal-organic framework material within each of the plurality of channels. The channels may exhibit different shapes, and/or sizes, and/or change diameter over the length of the channel. The channels may be up to 1 micron in size. However, in preferred embodiments the porous substrate is a nanoporous substrate, and the channels are nanochannels having a size of from 5 nm to 200 nm.

In one form of the above embodiment, the channel tapers from a first diameter at the first surface to a second diameter at the second surface, wherein the first diameter is greater than the second diameter. In a preferred form, the second diameter is the narrowest diameter. By way of example, the channel may exhibit a 'bullet' like shape.

In one form of the above embodiment, the porous substrate is selected from the group consisting of: porous metals (a non-limiting example includes porous stainless steel), porous ceramics (a non-limiting example includes porous alumina and titania), and porous polymers (a non-limiting example includes porous PET, polycarbonate).

In an embodiment, the pore size of the pore windows is from about 2.8 Å and less than about 1 nm. Preferably, the pore size is from about 2.8 Å and up to about 6.5 Å. Preferably, the pore size is from about 2.8 Å and up to about 6.2 Å.

It will be appreciated that the pore size is dependent on the type of metal-organic framework material that is used. In the case of ZIF-8, the pore size is about 3.4 Å, thus preferably the pore size is from 3.2 Å to 3.6 Å. In the case of UiO-66, the pore size is about 6 Å in diameter, thus preferably the pore size is from 5.8 to 6.2 Å. In the case of UiO-66-$NH_2$ and UiO-66-$N^+(CH_3)_3$ the pore size is about 3 Å, thus preferably the pore size is from 2.8 to 3.2 Å. Notwithstanding the above, the selection of different metal-organic framework materials provides a mechanism for tailoring the selectivity of the membrane to target different ions.

In an embodiment, the membrane is a monovalent ion selective membrane. Preferably, the membrane is selective for monovalent ions over multivalent ions (and in particular divalent ions, a non-limiting example of which include $Mg^{2+}$, $Ca^{2+}$, and $SO_4^{2-}$). The monovalent ions and multivalent ions may be cations or anions. Preferably, the selectivity for the monovalent ions over the multivalent ions is at least 10. More preferably, the selectivity for the monovalent ions over the multivalent ions is at least 50. Even more preferably, the selectivity for the monovalent ions over the multivalent ions is at least 100. Most preferably, the selectivity for the monovalent ions over the multivalent ions is at least 1000.

In one form of this embodiment, the monovalent ion is one or more alkali metal cations selected from the group consisting of $Li^+$, $Na^+$, $K^+$, and $Rb^+$. Additionally, or alternatively, the multivalent ions are multivalent cations, such as divalent cations.

In other forms of this embodiment, the monovalent ion is one of more halide anions selected from the group consisting of $F^-$, $Cl^-$, and $I^-$. Additionally, or alternatively, the multivalent ions are multivalent anions, such as divalent anions.

In an embodiment, the membrane is a $Li^+$ ion selective membrane. Preferably, the membrane is selective for $Li^+$ ions over other monovalent ions, and in particular alkali metal ions (for example one or more of $Na^+$, $K^+$, and $Rb^+$). More preferably the selectivity for the $Li^+$ ion is at least 1.1 in comparison to $Na^+$ ions. More preferably, the selectivity for the $Li^+$ ion is at least 1.2. Even more preferably, the selectivity of the $Li^+$ ion is at least 1.3.

In an alternative embodiment, the membrane is an $F^-$ ion selective membrane. Preferably the membrane is selective for $F^-$ over other anions (such as those selected from the group consisting of $Cl^-$, $Br^-$, $I^-$, and $SO_4^{2-}$). More preferably, the selectivity for the $F^-$ ion is at least 20 in comparison to $Cl^-$. Even more preferably, the selectivity for the $F^-$ ion is at least 21 in comparison to $Cl^-$. Most preferably, the selectivity of the $F^-$ ion is at least 22 in comparison to $Cl^-$.

In a second aspect of the invention, there is provided a method for selectively separating ions in a polar solution, the method including:

providing an ion selective separation membrane including (preferably an ion selective separation membrane according to the first aspect of the invention, and/or embodiments, and/or forms thereof):

a metal organic framework layer formed on, in, and/or around a substrate, the metal organic framework having a crystal structure that includes a first surface and a second surface and includes ion transport channels formed between respective pore windows in the first surface and the second surface; and first and second electrodes to apply a potential difference across the membrane;

wherein the respective pore windows have a pore size that is less than the hydrated diameter for which the ion selective separation membrane is selective; and exposing a polar solution containing a plurality of ions to the first surface; and applying a potential difference across the membrane to selectively transport ions in to a pore window in the first surface, through the ion transport channel, and out of a pore window in the second surface.

The application of a potential difference across the ion selective separation membrane enhances the passage and selectivity of ions through the ion selective separation membrane from the first surface to the second surface.

In an embodiment, the potential difference is from about 10 mV to about 2 V. The inventors have found that the rate of ion transport through the membrane is a function of the potential difference applied across the membrane. Increasing the potential difference increases the rate of ion transport through the membrane, and similarly decreasing the potential difference decreases the rate of ion transport through the membrane. While there is no specific lowermost value, the inventors have found that a potential difference of about 10 mV provides an adequate rate of ion transport. Similarly, there is no specific upper limit to the potential difference. However, it will be appreciated that application of high potential differences can have a deleterious effect on the membrane, and may also result in electrolysis of the polar solvent (such as in the case where the polar solvent is water). In this regard, an upper potential difference of about 2 V is suitable.

In one form of the above embodiment, the potential difference is at least 12 mV. Preferably, the potential difference is at least 14 mV. More preferably, the potential difference is at least 16 mV. Most preferably, the potential difference is at least 18 mV. In an additional or alternative form of the above embodiment, the potential difference is at most 1.8 V. Preferably, the potential difference is at most 1.6 V. More preferably, the potential difference is at most 1.4 V. Even more preferably, the potential difference is at least 1.2 V. Most preferably, the potential difference is at least 1V.

In an embodiment, the polar solvent is selected from the group consisting of: water, methanol, ethanol, isopropyl alcohol, n-butanol, formic acid, acetic acid, dichloromethane, tetrahydrofuran, ethyl acetate, acetonitrile, dimethyl sulfoxide, acetone, hexamethylphosphoric triamide, dimethylformamide, nitromethane, propylene carbonate. However, it is preferred that the polar solvent is water.

In an embodiment, the method is for selectively separating a monovalent ion from the polar solution, and the polar solution contains at least one type of monovalent ion and at least one type of multivalent ion (and in particular a divalent ion, a non-limiting example of which include $Mg^{2+}$, $Ca^{2+}$, and $SO_4^{2-}$). The monovalent ions and multivalent ions may be cations or anions. Preferably, the selectivity for the monovalent ions over the multivalent ions is at least 10. More preferably, the selectivity for the monovalent ions over the multivalent ions is at least 50. Even more preferably, the selectivity for the monovalent ions over the multivalent ions is at least 100. Most preferably, the selectivity for the monovalent ions over the multivalent ions is at least 1000.

In one form of this embodiment, the monovalent ion is one or more alkali metal cations selected from the group consisting of $Li^+$, $Na^+$, $K^+$, and $Rb^+$. Additionally, or alternatively, the multivalent ions are multivalent cations, such as divalent cations.

In other forms of this embodiment, the monovalent ion is one of more halide anions selected from the group consisting of $F^-$, $Cl^-$, and $I^-$. Additionally, or alternatively, the multivalent ions are multivalent anions, such as divalent anions.

In an embodiment, the method is for selectively separating $Li^+$ ions from the polar solution, and the polar solution contains $Li^+$ ions and at least one further cation. Preferably, the further cation is a monovalent cation. More preferably, the monovalent cation is a further alkali metal ion (for example one or more of $Na^+$, $K^+$, and $Rb^+$).

In one form of the above embodiment, the selectivity for the $Li^+$ ion is at least 1.1 in comparison to the further cation. More preferably, the selectivity for the $Li^+$ ion is at least 1.2. Even more preferably, the selectivity of the $Li^+$ ion is at least 1.3.

In one form of the above embodiment, the selectivity for the $Li^+$ ion is at least 1.1 in comparison to $Na^+$. More preferably, the selectivity for the $Li^+$ ion is at least 1.2 in comparison to $Na^+$. Even more preferably, the selectivity of the $Li^+$ ion is at least 1.3 in comparison to $Na^+$.

In an alternative embodiment, the method is for selectively separating $F^-$ ions from the polar solution, and the polar solution contains $F^-$ ions and at least one further anion. Preferably the further anion is selected from the group consisting of: $Cl^-$, $Br^-$, $I^-$, and $SO_4^{2-}$. In one form of this embodiment, the selectivity for the $F^-$ ion is at least 20 in comparison to the further anion. Preferably, the selectivity for the F⁻ ion is at least 20 in comparison to one or more of Cl⁻, Br⁻, I⁻, and $SO_4^{2-}$.

In one form of the above embodiment, the selectivity for the F⁻ ion is at least 20 in comparison to Cl⁻. More preferably, the selectivity for the F⁻ ion is at least 21 in comparison to Cl⁻. Even more preferably, the selectivity of the F⁻ ion is at least 22 in comparison to Cl⁻.

In a third aspect of the invention, there is provided an ion selective separation membrane including:

a porous substrate having a plurality of channels; and a plug of a metal-organic framework material within each of the plurality of channels;

the metal-organic framework having a crystal structure that includes a first surface and a second surface and including ion transport channels between respective pore windows in the first surface and the second surface; and wherein the respective pore windows have a pore size that is less than the hydrated diameter for which the ion selective separation membrane is selective.

A wide range of metal organic framework materials may be selected, the criteria for selection include stability in the solvent in which the membrane is to be used and pore windows of less than 1 nm. Thus, in an embodiment, the metal organic framework is a solvent stable metal organic framework with sub-nanometer pores. Preferably, the metal organic framework material is selected from the group consisting of: ZIF-6, UiO-66, UiO-66-$NH_2$, UiO-66-$(COOH)_2$, and UiO-66-$N^+(CH_3)_3$.

In an embodiment, the ion transport channels include a plurality of expanded regions, each expanded region separated by an internal pore having an opening that corresponds to the shape and size of the pore windows, and wherein the size of the expanded regions is greater than the hydrated diameter of the ion for which the ion selective separation membrane is selective.

In an embodiment, the substrate is a porous substrate having a plurality of channels, and the metal organic framework layer is formed as a plug of metal-organic framework material within each of the plurality of channels. The channels may exhibit different shapes, and/or sizes, and/or change diameter over the length of the channel. The channels may be up to 1 micron in size. However, in preferred embodiments the porous substrate is a nanoporous substrate, and the channels are nanochannels having a size of from about 5 nm to about 200 nm.

In one form of the above embodiment, the channel has tapers for a first diameter at the first surface to a second diameter at the second surface, wherein the first diameter is greater than the second diameter. In a preferred form, the second diameter is the narrowest diameter. By way of example, the channel may exhibit a 'bullet' like shape.

In one form of the above embodiment, the porous substrate is selected from the group consisting of: porous metals (a non-limiting example includes porous stainless steel), porous ceramics (a non-limiting example includes porous alumina and titania), and porous polymers (a non-limiting example includes porous PET, polycarbonate).

In an embodiment, the pore size of the pore windows is from about 2.8 Å and less than about 1 nm. Preferably, the pore size is from about 2.8 Å and up to about 6.5 Å. Preferably, the pore size is from about 2.8 Å and up to about 6.2 Å.

It will be appreciated that the pore size is dependent on the type of metal-organic framework material that is used. In the case of ZIF-8, the pore size is about 3.4 Å, thus preferably the pore size is from about 3.2 Å to about 3.6 Å. In the case of UiO-66, the pore size is about 6 Å in diameter, thus preferably the pore size is from 5.8 to 6.2 Å. In the case of UiO-66-$NH_2$ and UiO-66-$N^+(CH_3)_3$ the pore size is about 3 Å, thus preferably the pore size is from 2.8 to 3.2 Å. Notwithstanding the above, the selection of different metal-organic framework materials provides a mechanism for tailoring the selectivity of the membrane to target different ions.

In an embodiment, the membrane is a monovalent ion selective membrane. Preferably, the membrane is selective for monovalent ions over multivalent ions (and in particular divalent ions, a non-limiting example of which include $Mg^{2+}$, $Ca^{2+}$, and $SO_4^{2-}$). The monovalent ions and multivalent ions may be cations or anions. Preferably, the selectivity for the monovalent ions over the multivalent ions is at least 10. More preferably, the selectivity for the monovalent ions over the multivalent ions is at least 50. Even more preferably, the selectivity for the monovalent ions over the multivalent ions is at least 100. Most preferably, the selectivity for the monovalent ions over the multivalent ions is at least 1000.

In one form of this embodiment, the monovalent ion is one or more alkali metal cations selected from the group consisting of $Li^+$, $Na^+$, $K^+$, and $Rb^+$. Additionally, or alternatively, the multivalent ions are multivalent cations, such as divalent cations.

In other forms of this embodiment, the monovalent ion is one of more halide anions selected from the group consisting of F⁻, Cl⁻, and I⁻. Additionally, or alternatively, the multivalent ions are multivalent anions, such as divalent anions.

In an embodiment, the membrane is a $Li^+$ ion selective membrane. Preferably, the membrane is selective for $Li^+$ ions over other monovalent ions, and in particular alkali metal ions (for example one or more of $Na^+$, $K^+$, and $Rb^+$). More preferably the selectivity for the $Li^+$ ion is at least 1.1 in comparison to $Na^+$ ions. More preferably, the selectivity for the $Li^+$ ion is at least 1.2. Even more preferably, the selectivity of the $Li^+$ ion is at least 1.3.

In an alternative embodiment, the membrane is an F⁻ ion selective membrane. Preferably the membrane is selective for F⁻ over other anions (such as those selected from the group consisting of Cl⁻, Br⁻, I⁻, and $SO_4^{2-}$). More preferably, the selectivity for the F⁻ ion is at least 20 in comparison to Cl⁻. Even more preferably, the selectivity for the F⁻ ion is at least 21 in comparison to Cl⁻. Most preferably, the selectivity of the F⁻ ion is at least 22 in comparison to Cl⁻.

In a fourth aspect of the invention, there is provided a method of forming an ion selective separation membrane (preferably an ion selective separation membrane according to the third aspect of the invention, and/or embodiments, and/or forms thereof) including:

crystallising a metal-organic framework material from a metal ion and an organic ligand to plug channels of a porous substrate, the channels extending through the porous substrate from openings in a first surface of the porous substrate to openings in a second surface of the porous substrate;

wherein the metal-organic framework has a crystal structure that includes a first surface and a second surface and includes ion transport channels formed between respective pore windows in the first surface and the second surface; and wherein the respective pore windows have a pore size that is less than the hydrated diameter for which the ion selective separation membrane is selective.

In an embodiment, the step of crystallising the metal organic framework includes exposing the first surface of the porous substrate to a ligand containing solution and exposing the second surface of the porous substrate to a metal ion containing solution; wherein the ligand containing solution and the metal ion containing solution infiltrate into the channels of the porous substrate through the respective openings in the first surface and the second surface of the porous substrate, and react to crystallise the metal-organic framework material.

In an alternative embodiment, the step of crystallising the metal organic framework includes filling the pores of the porous substrate with a solution including the metal ion and the organic ligand, and crystallising the metal-organic framework material within the pores. Preferably, the method includes submerging the porous substrate within the solution such that the solution infiltrates into the pores of the porous substrate. Preferably, the method additionally includes heating the solution for a time sufficient to crystallise the metal-organic framework material within the pores. More preferably, the step of heating the solution includes heating the solution to a temperature that is at or below the boiling point of the solution, for example to 100° C.

In a fifth aspect of the invention, there is provided an ion selective separation membrane including:

a crystalline metal-organic framework structure formed around and through pores of a porous two-dimensional layered material;

the metal-organic framework having a crystal structure that includes a first surface and a second surface and ion transport channels extending between respective pore windows in the first surface and the second surface; and the pore windows having a pore size that is less than the hydrated diameter for which the ion selective separation membrane is selective.

As discussed previously, a wide range of metal organic framework materials may be selected, the criteria for selection include stability in the solvent in which the membrane is to be used and pore windows of less than 1 nm. Thus, in an embodiment, the metal organic framework is a solvent stable metal organic framework with sub-nanometer pores. Preferably, the metal organic framework material is selected from the group consisting of: ZIF-6, UiO-66, UiO-66-NH$_2$, UiO-66-(COOH)$_2$, and UiO-66-N$^+$(CH$_3$)$_3$. In an embodiment, the ion transport channels include a plurality of expanded regions, each expanded region separated by an internal pore having an opening that corresponds to the shape and size of the pore windows, and wherein the size of the expanded regions is greater than the hydrated diameter of the ion for which the ion selective separation membrane is selective.

In an embodiment, the substrate is formed from a 2D layered material. Preferably, the 2D layered material is selected from the group consisting of: graphene oxide, zeolite, MoS$_2$, WS$_2$, and BN. Most preferably, the 2D layered material is graphene oxide.

In an embodiment, the ion selective membrane further includes a support layer, and the metal organic framework layer is applied to a surface of the support layer. Preferably the support layer is a porous ceramic, porous metal or porous polymer. An example of a suitable support layer is anodic aluminium oxide layer.

In an embodiment, the pore size of the pore windows is from 2.8 Å and less than 1 nm. Preferably, the pore size is from 2.8 Å and up to 6.5 Å. Preferably, the pore size is from 2.8 Å and up to 6.2 Å.

It will be appreciated that the pore size is dependent on the type of metal-organic framework material that is used. In the case of ZIF-8, the pore size is about 3.4 Å, thus preferably the pore size is from 3.2 Å to 3.6 Å. In the case of UiO-66, the pore size is about 6 Å in diameter, thus preferably the pore size is from 5.8 to 6.2 Å. In the case of UiO-66-NH$_2$ and UiO-66-N$^+$(CH$_3$)$_3$ the pore size is about 3 Å, thus preferably the pore size is from 2.8 to 3.2 Å In an embodiment, the membrane is a monovalent ion selective membrane.

Preferably, the membrane is selective for monovalent ions over multivalent ions (and in particular divalent ions, a non-limiting example of which include Mg$^{2+}$, Ca$^{2+}$, and SO$_4^{2-}$). The monovalent ions and multivalent ions may be cations or anions. Preferably, the selectivity for the monovalent ions over the multivalent ions is at least 10. More preferably, the selectivity for the monovalent ions over the multivalent ions is at least 50. Even more preferably, the selectivity for the monovalent ions over the multivalent ions is at least 100. Most preferably, the selectivity for the monovalent ions over the multivalent ions is at least 1000.

In one form of this embodiment, the monovalent ion is one or more alkali metal cations selected from the group consisting of Li$^+$, Na$^+$, K$^+$, and Rb$^+$. Additionally, or alternatively, the multivalent ions are multivalent cations, such as divalent cations.

In other forms of this embodiment, the monovalent ion is one of more halide anions selected from the group consisting of F$^-$, Cl$^-$, and I$^-$. Additionally, or alternatively, the multivalent ions are multivalent anions, such as divalent anions.

In an embodiment, the membrane is a Li$^+$ ion selective membrane. Preferably, the membrane is selective for Li$^+$ ions over other monovalent ions, and in particular alkali metal ions (for example one or more of Na$^+$, K$^+$, and Rb$^+$). More preferably the selectivity for the Li$^+$ ion is at least 1.1 in comparison to Na$^+$ ions. More preferably, the selectivity for the Li$^+$ ion is at least 1.2. Even more preferably, the selectivity of the Li$^+$ ion is at least 1.3.

In an alternative embodiment, the membrane is an F$^-$ ion selective membrane. Preferably the membrane is selective for F$^-$ over other anions (such as those selected from the group consisting of Cl$^-$, Br$^-$, I$^-$, and SO$_4^{2-}$). More preferably, the selectivity for the F$^-$ ion is at least 20 in comparison to Cl$^-$. Even more preferably, the selectivity for the F$^-$ ion is at least 21 in comparison to Cl$^-$. Most preferably, the selectivity of the F$^-$ ion is at least 22 in comparison to Cl$^-$.

In an embodiment of the third and fifth aspects, the ion selective separation membrane further includes first and second electrodes to apply a potential difference across the membrane.

In an sixth aspect of the invention, there is provided a method of forming an ion selective separation membrane (preferably an ion selective separation membrane according to the fifth aspect of the invention, and/or embodiments, and/or forms thereof) including:

forming a seed layer of nanosheets of a two-dimensional layered material having seed crystals of a metal-organic framework embedded therein;

wherein the metal-organic framework is formed from a metal ion and an organic ligand, and the metal-organic framework has a crystal structure that includes a first surface and a second surface and includes ion transport channels formed between respective pore windows in the first surface and the second surface;

forming pores extending from a first surface of the seed layer, through the two-dimensional layered material, and to a second surface of the seed layer; and exposing the seed layer to the metal ion and the organic ligand and growing the seed crystals to form an ion selective separation membrane including a crystalline layer of the metal-organic framework around the two-dimensional layered material and through the pores;

wherein the pore windows have a pore size that is less than the hydrated diameter for which the ion selective separation membrane is selective.

In an embodiment, the step of forming the seed layer includes spin coating a solution including the two-dimensional layered material and the seed crystals of a metal-organic framework onto the surface of a support.

In an embodiment, the step of forming the pores includes subjecting the seed layer to air plasma treatment.

In an embodiment, the step of exposing the seed layer to the metal ion and the organic ligand includes: exposing the first surface of the seed layer to a ligand containing solution and exposing the second surface of the seed layer to a metal ion containing solution; wherein the ligand containing solution and the metal ion containing solution infiltrate into through the pores and into the seed layer through the respective openings in the first surface and the second surface of the seed layer, and grow the seed crystals to form the crystalline layer.

In a seventh aspect of the invention, there is provided method for selectively separating ions in a polar solution, the method including:

providing an ion selective separation membrane according to any one of the first, third, and fifth aspects of the invention (and embodiments and forms thereof), and exposing a polar solution containing a plurality of ions to the first surface; and applying a potential difference across the membrane to selectively transport ions in to a pore window in the first surface, through the ion transport channel, and out of a pore window in the second surface.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
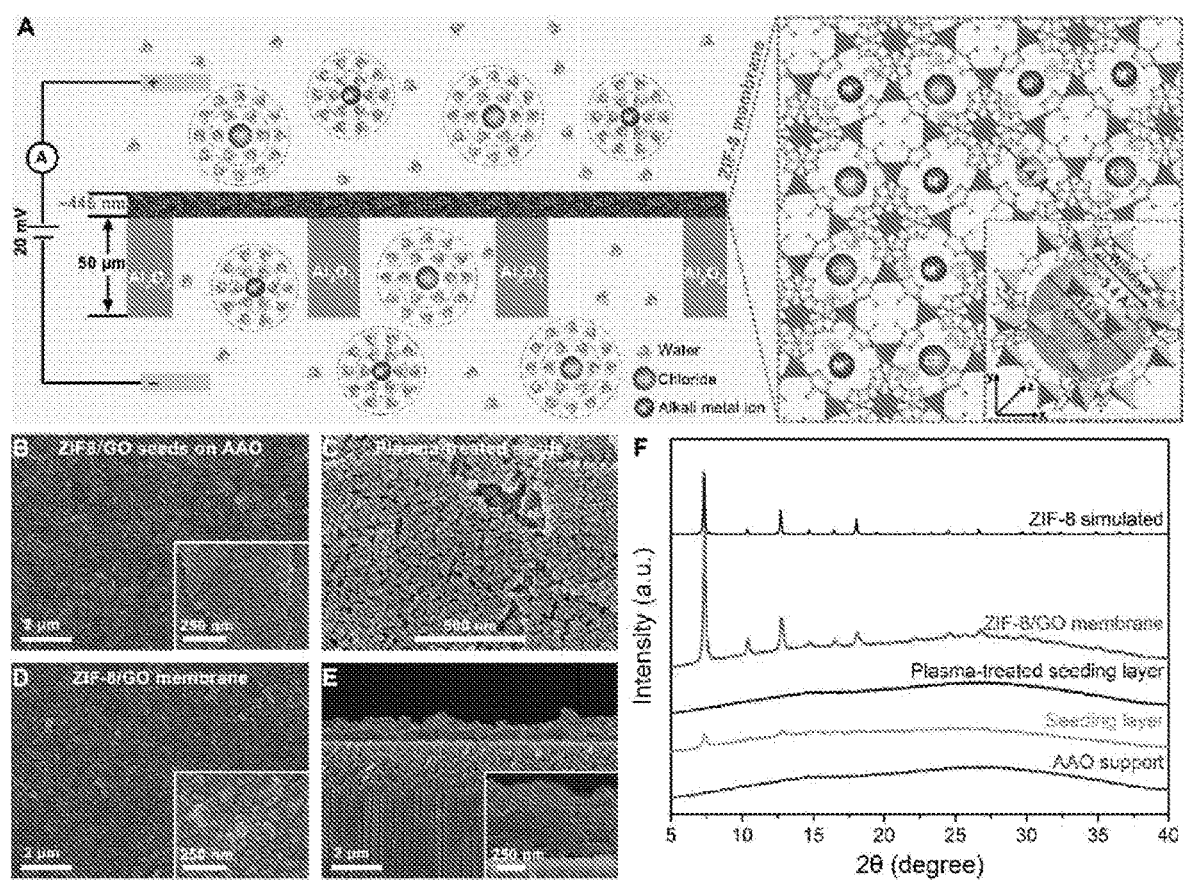
FIG. 1: (A) Schematic illustration of ion transport through a ZIF-8/GO/AAO membranes with ~3.4 Å pore windows for ion selectivity and ~11.6 Å pore cavities for fast ion transport (drawing not to scale). The inset indicates the crystal structure of ZIF-8. (B) Scanning electron microscopy (SEM) images the hybrid ZIF-8/GO nanosheet seeds coated on the AAO support. (C) SEM image of the plasma-treated nanoporous ZIF-8/GO seeds. (D) SEM images of the ZIF-8/GO/AAO membrane surface. (E) SEM images of the membrane cross section reveal that a ~446-nm-thick ZIF-8/GO layer is densely grown on the top of the AAO support. (F) XRD patterns of the AAO support, the seeding layer, the plasma-treated seeding layer, the ZIF-8/GO/AAO membrane, and simulated ZIF-8 structure.

The invention will now be described in relation to exemplary embodiments below. The examples provided below include both examples that illustrate the fabrication of ion selective separation membrane according to the invention, as well as providing corresponding characterisation data and testing data. Comparative examples are also provided which demonstrate the ion selectivity of membranes according to the present invention.

EXAMPLES

Chemicals and Materials

The following reagents were used in the below described examples. Zn (NO$_3$)$_2$.6H$_2$O (98.0%), 2-methylimidazole (Hmim, 99.0%), lithium chloride (LiCl, 99.0%), sodium chloride (NaCl, 99.0%), potassium chloride (KCl, 99.0%), rubidium chloride (RbCl, 99.0%), sodium hydroxide (NaOH, 85%), and hydrogen chloride (HCl, 36%~38%), potassium hydroxide (KOH, 85%), graphene oxide, 1,4-benzenedicarboxylic acid (BDC, 98%), zirconium chloride (ZrCl4, >99.5%), benzimidazole (Bim, 99.0%), N,N-dimethylformamide (DMF, 99.8%) were purchased from Sigma-Aldrich. Methanol (analysis) was purchased from Merck. All chemicals were used as provided. All solutions were prepared with Milli-Q water (18.2 MΩ). Porous anodic aluminium oxide (AAO) disks with a diameter of 13 mm (average pore diameter of 200 nm, pore density of ~7.6×106 mm$^{-2}$) from GE healthcare companies were used as supports.

Example 1

Synthesis of Hybrid ZIF-8/GO Nanosheets ZIF-8/GO nanosheets were prepared by our previously reported method (19). 6 mL methanol solution of 0.183 g Zn (NO$_3$)$_2$.6H$_2$O, 10 mL methanol solution with 0.405 g 2-methylimidazole (Hmim), and 4 mL 1 mg mL-1 GO suspension in mixture of methanol-water (4:1, v/v) were mixed together stirred for 3 h, leading to the formation of ZIF-8/GO nanosheets. The molar ratio of Hmim/Zn$^{2+}$ in this system was 8. The precipitation was collected by centrifugation (8000 rpm for 5 min) and washed with methanol for three times.

Fabrication of Ultrathin ZIF-8 Membrane on the AAO Support

Hybrid ZIF-8/GO nanosheets were re-dispersed in methanol to form a stable colloid suspension with a concentration of 20 mg mL$^{-1}$. Then the suspension was spin-coated onto the AAO support to form ultrathin and uniform ZIF-8/GO seeding layer. The spin-coating process was performed for 30 s at 1000 rpm. After coating, the support with seeding layer was dried at 50° C. for 2 h and then coated again. Twice coating was carried out to ensure formation of a uniform seeding layer on the AAO support. The coated support was dried at 50° C. overnight. The ZIF-8/GO seeding layer was further etched by air plasma to make the ZIF-8/GO nanosheets nanoporous. Plasma treatment was carried out using Harrick Plasma PDC-32G-2 with 18 watts of power (max) at 1 mbar pressure. Optimal time of the air plasma treatment for obtaining nanoporous seeding layer was 30 s. The ultrathin ZIF-8/GO membrane was prepared by secondarily growing the plasma-treated seeding layer on the AAO support via counter-diffusion method. Zn$^{2+}$ and Hmim solution were prepared by dissolving Zn (NO$_3$)$_2$.6H$_2$O (0.183 g) and Hmim (0.405 g) in 10 ml methanol, respectively. The coated AAO support with nanoporous seeding layer was mounted on a custom-made setup, where the Zn$^{2+}$ and Hmim solutions were separated by the coated support, the seeding layer faced the Zn$^{2+}$ side, and the AAO support was vertically aligned. After reaction at room temperature for 3 h, the ZIF-8/GO/AAO membrane were taken out and rinsed with fresh methanol. Lastly, the membranes were dried at 50° C. overnight.

Characterization

Scanning electron microscopy (SEM) images were taken with field-emission scanning electron microscopes (FEI Nova NanoSEM 450 and FEI Magellan 400) operating at 5 kV. Transmission electron microscopy (TEM) images and selected area electron diffraction (SAED) were taken by a FEI Tecnai G2 T20 operated at an accelerating voltage of 200 kV. Powder X-ray diffraction (PXRD) patterns were carried out in the 2θ range of 5–40° at room temperature using a Miniflex 600 diffractometer (Rigaku, Japan) in transmission geometry using Cu Kα radiation (15 mA and 40 kV) at a scan rate of 2° min-1 with a step size of 0.02°. For gas adsorption isotherms, high-purity grade (99.999%) nitrogen (N$_2$) was used throughout the adsorption experiments. Prior to the gas adsorption measurement, ZIF-8 powders were activated at 60° C. for 24 h. Low pressure volumetric N$_2$ adsorption isotherms up to 1 bar were measured using a micromeritics 3 Flex gas sorption analyser.

BET surface area and pore size were determined by measuring $N_2$ adsorption isotherms at 77 K in a liquid nitrogen bath and calculated using the Micromeritics software.

Ion Current Measurement

The ion transport properties of the ZIF-8/GO/AAO membranes were studied by measuring ion currents through AAO supports before and after growth of ZIF-8/GO membranes. Ion current was measured by a Keithley 6487 picoammeter (Keithley Instruments, Cleveland, Ohio, USA). The membrane was mounted between two chambers of an electrochemical cell, and test area of each membrane was ~28.26 $mm^2$. Ag/AgCl electrodes were used to apply a transmembrane potential across the membrane. Forward voltage was the positive potential applied on the ZIF-8/GO side of the membrane. The main transmembrane potential used in this work had been evaluated beforehand, and a scanning voltage varying from −0.2 V to +0.2 V with a 40 s period was selected. The pH values of electrolyte solutions were adjusted by 1 M NaOH, KOH, or HCl solutions. The influence of addition substance on the ionic strength of the electrolyte solutions can be ignored. Unless otherwise stated, the pH value of the electrolyte solution was 7.0. Each test was repeated at least three times to obtain the average current value at different voltages on the same membrane.

Results

The experiments were conducted in a typical configuration where two chambers with ionic solutions were separated by a ZIF-8/GO/AAO membrane and biased by a pair of Ag/AgCl electrodes, as shown in FIG. 1A. FIG. 1A is a schematic illustration of ion transport through a ZIF-8/GO/AAO membranes with ~3.4 Å pore windows for ion selectivity and ~11.6 Å pore cavities for fast ion transport (drawing not to scale). The inset indicates the crystal structure of ZIF-8.

Figure 2:
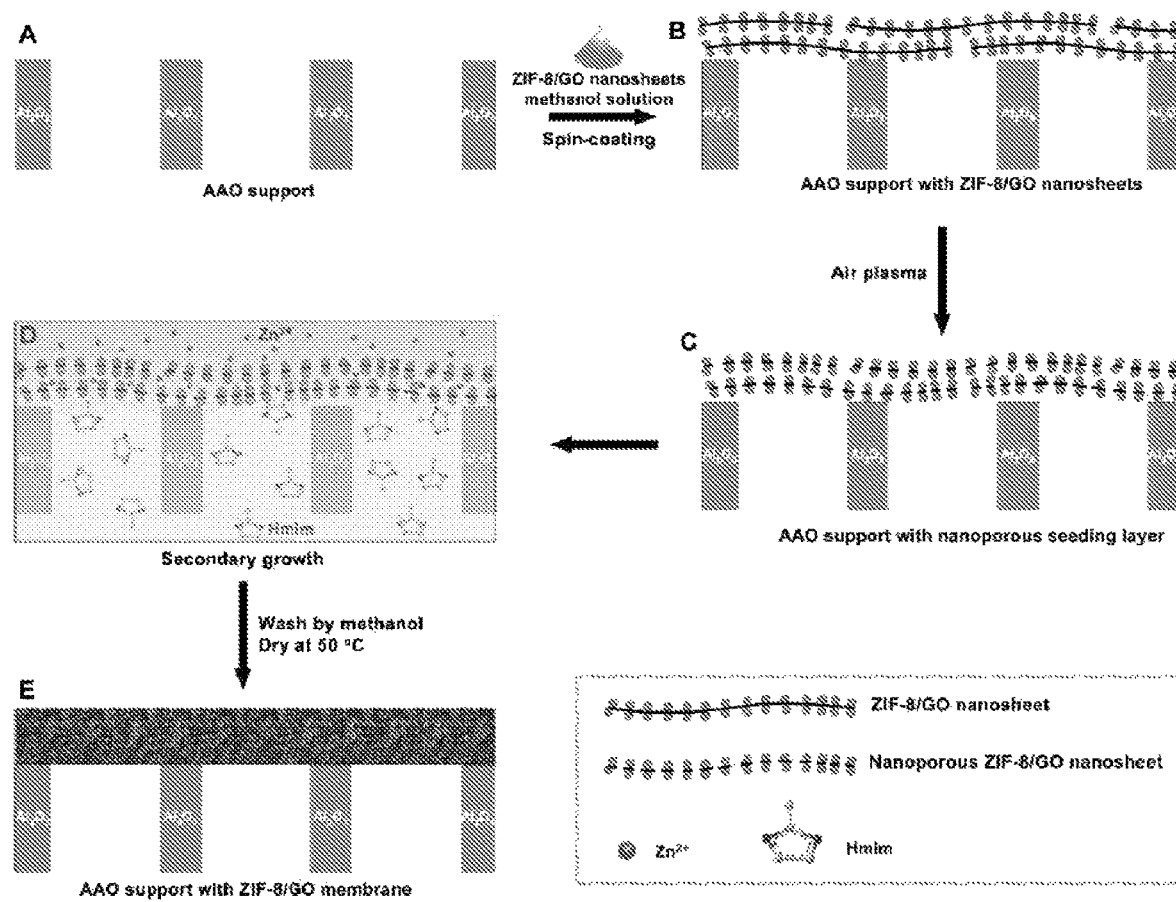
FIG. 2: Fabrication process of the ZIF-8/GO/AAO membrane. (A) Schematic of AAO support. (B) Spin-coating of hybrid ZIF-8/GO nanosheets onto the AAO support to form a uniform and ultrathin seeding layer. (C) Air plasma treatment of the ZIF-8/GO nanosheets to obtain the nanoporous seeding layer. (D) Secondary growth of the nanoporous seeding layer by contra-diffusion method. (E) Schematic of the ZIF-8/GO membrane on the AAO support.

The ZIF-8/GO/AAO membranes used in this study are produced by a nanoporous GO-assisted interfacial growth method. FIG. 2 illustrates the fabrication process. Hybrid two-dimensional graphene oxide (GO) nanosheets with ZIF-8 crystals were fabricated as seeds and assembled onto the AAO support by spin-coating to produce an ultrathin seeding layer (FIG. 2A and FIG. 2B). Then, air plasma was used to treat the ZIF-8/GO nanosheets to make the GO nanosheets nanoporous because the nanoporous structure could facilitate fast crystal intergrowth during membrane formation (FIG. 2C). Finally, the ZIF-8/GO/AAO membranes were synthesized via a counter-diffusion method at room temperature (FIG. 2D and FIG. 2E). During secondary growth, the nanoporous seeding layer acts as a barrier between two different synthesis solutions, self-limits crystal growth and effectively eliminates defects during the counter-diffusion process.

FIG. 1B shows scanning electron microscopy (SEM) images of ZIF-8/GO hybrid nanosheets uniformly coated on the AAO support, a cross section of the seeding layer (see FIG. 3C), nanoporous ZIF-8/GO nanosheets obtained by air plasma treatment (see FIG. 1C), a ZIF-8/GO/AAO membrane after secondary growth (see FIG. 1D), and the membrane cross section (see FIG. 1E). The average thickness of the ZIF-8/GO membrane on the AAO support was 446±74 nm. XRD patterns confirmed that a highly crystalline ZIF-8 structure was formed in the ZIF-8/GO membrane after secondary growth (see FIG. 1F).

Figure 4:
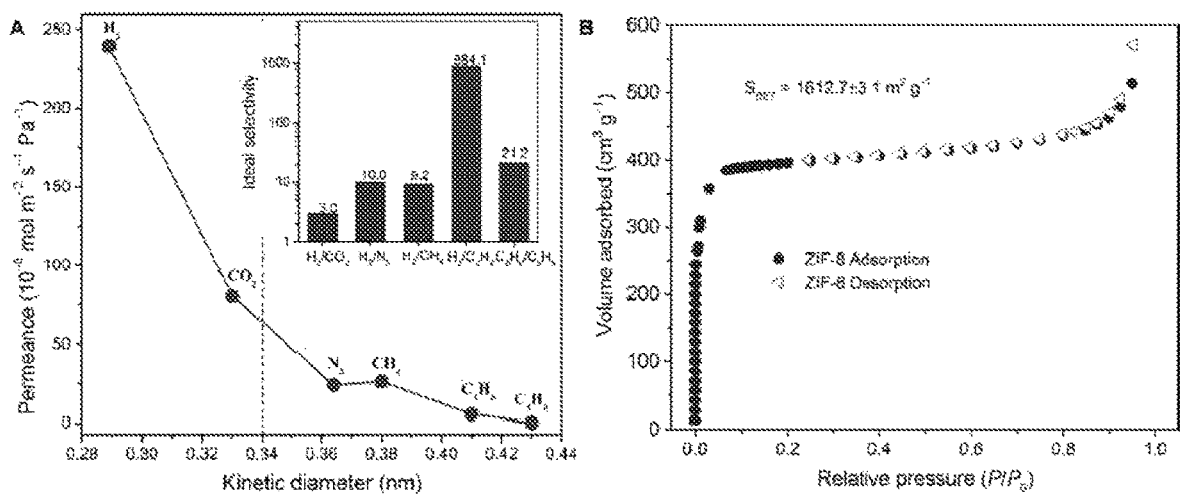
FIG. 4: (A) Single gas permeances of different gases through ZIF-8/GO/AAO membrane as a function of the kinetic diameter. The insets are ideal gas selectivity factors for $H_2/CO_2$, $H_2/N_2$, $H_2/CH_4$, $H_2/C_3H_8$ and $C_3H_6/C_3H_8$. All gas performance measured at 25° C. and 1 bar. (B) $N_2$ adsorption isotherms of ZIF-8 crystals.

Gas permeation tests showed that ZIF-8/GO/AAO membranes exhibited remarkable gas selectivity (see FIG. 4). FIG. 4 illustrates the gas permeation of the ZIF-8/GO/AAO membrane and the $N_2$ adsorption isotherms of ZIF-8 crystals. In particular, FIG. 4A shows the results of single gas permeances of different gases ($H_2$, $CO_2$, $N_2$, $CH_4$, $C_3H_6$, and $C_3H$) through ZIF-8/GO/AAO membrane as a function of the kinetic diameter. The insets are ideal gas selectivity factors for the following gas pairs: $H_2/CO_2$, $H_2/N_2$, $H_2/CH_4$, $H_2/C_3H$ and $C_3H_6/C_3H$. All gas performance measured at 25° C. and 1 bar. FIG. 4B are $N_2$ adsorption isotherms of ZIF-8 crystals. The results suggest that the ZIF-8 membranes were of high quality with negligible defects. The $N_2$ adsorption-desorption isotherm profiles of ZIF-8 crystals revealed a Brunauer-Emmett-Teller (BET) surface area of 1612.7±3.1 $m^2$ $g^{-1}$ and a high pore volume of 0.61 $cm^3$ $g^{-1}$.

Figure 5:
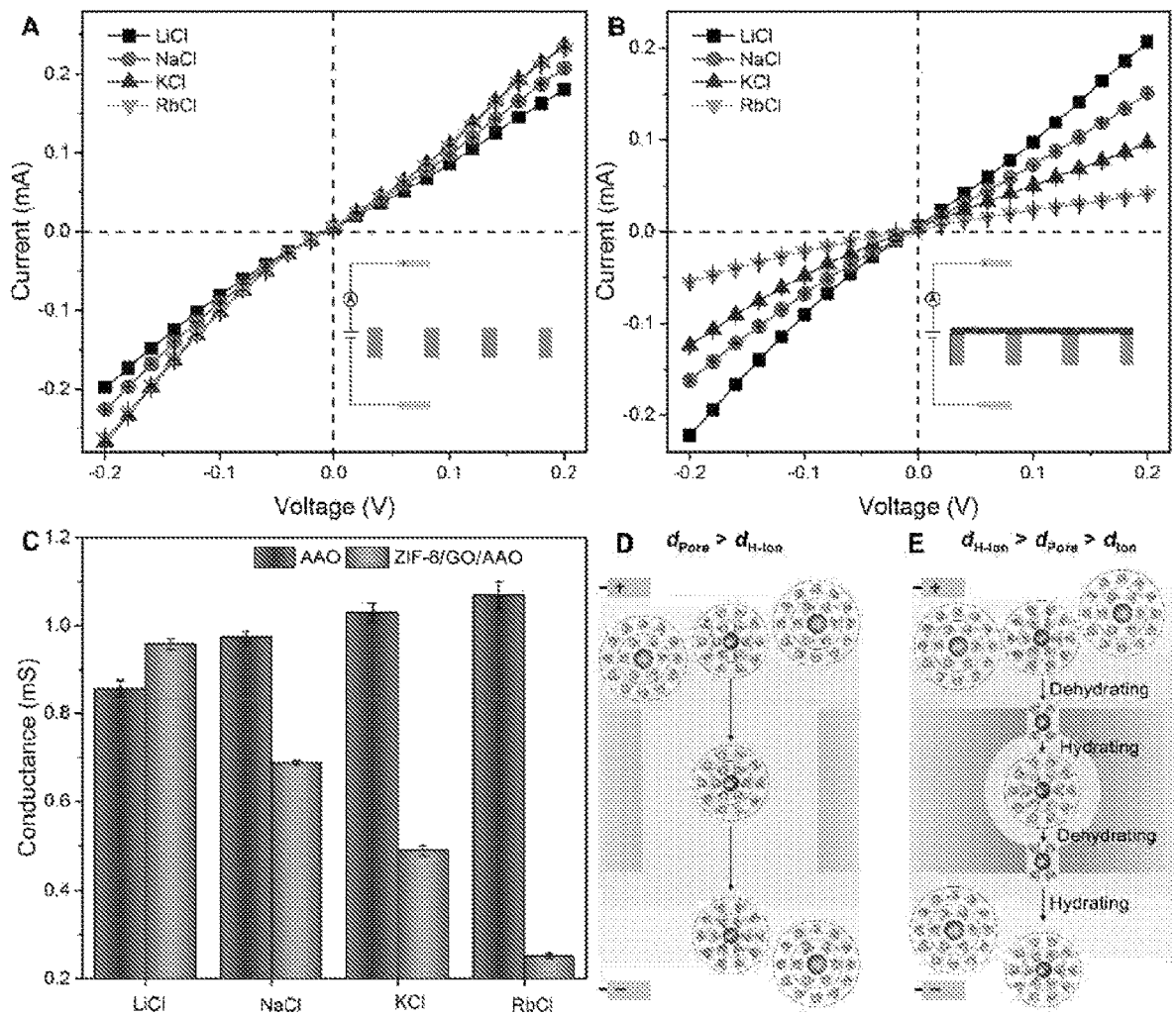
FIG. 5: (A) I-V curves of the AAO support measured with different ions. (B) I-V curves of ZIF-8/GO/AAO membranes measured with different ions. (C) Ion conductance values of the AAO support with and without the ZIF-8/GO membrane. (D) Schematic of ion transport through a pore with a diameter much larger than the hydrated ionic diameter with ions transport in a hydrated state. (E) Schematic of ion transport through a simplified sub-nanometer ZIF-8 pore with 3.4-Å-diameter windows.

Ion transport properties of the ZIF-8/GO/AAO membranes were studied by current-voltage (I-V) measurements, which were performed at room temperature. FIG. 5 provides current-voltage (I-V) characteristics of an AAO support before and after growth of ZIF-8/GO layer to make the ZIF-8/GO/AAO membrane, ion conductance values of the AAO support with and without the ZIF-8/GO membrane, and schematics showing the ion transport through the ZIF-8/GO/AAO membranes.

Figure 6:
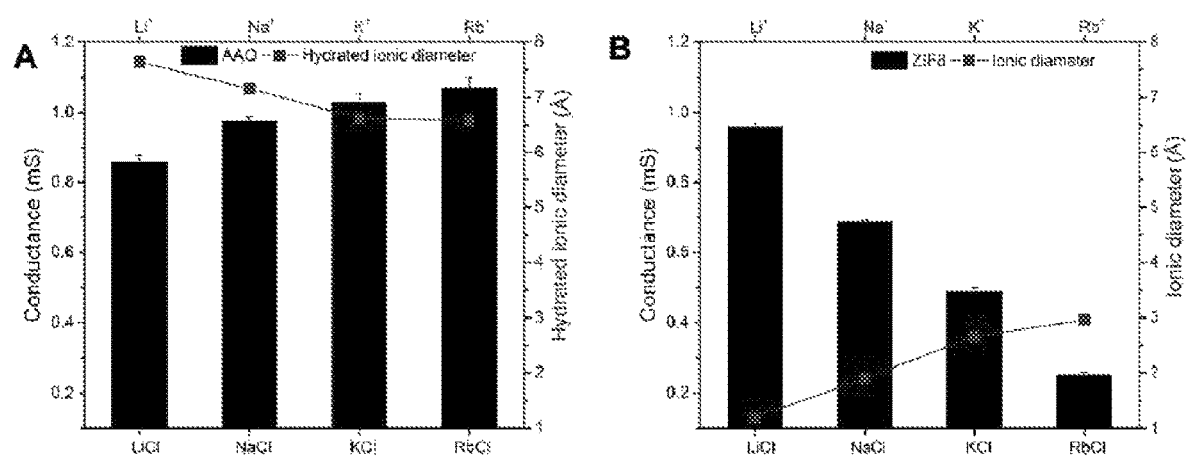
FIG. 6: Dependence of the ion conductance of the ZIF-8/GO/AAO membrane on the ionic diameter with FIG. 6A illustrating average ion conductance of the AAO support increases with decreasing hydrated ionic diameter of alkali metal ions, and FIG. 6B illustrating average ion conductance of the ZIF-8/GO/AAO membrane in different electrolytes decreases with increasing unhydrated ionic diameter of alkali metal ions.

FIG. 5A shows typical I-V characteristics of a 200-nm porous AAO support in different ionic solutions (0.1 M). All tested alkali metal ion types ($Li^+$, $Na^+$, $K^+$, and $Rb^+$) exhibit a linearity in their I-V curves, with different transport rates for different ions and a strong dependence on their hydrated ionic diameters, based on the differential conductance values shown in FIG. 6 (which shows dependence of the ion conductance of the ZIF-8/GO/AAO membrane on the ionic diameter with FIG. 6A illustrating average ion conductance of the AAO support increases with decreasing hydrated ionic diameter of alkali metal ions, and FIG. 6B illustrating average ion conductance of the ZIF-8/GO/AAO membrane in different electrolytes decreases with increasing unhydrated ionic diameter of alkali metal ions). Since the four electrolyte solutions share the same anion ($Cl^-$), the differences of the ionic currents shown in FIG. 5A are mainly caused by the cations. The order of the ion transport rate though the AAO support, indicated by ion conductance, was: $Li^+<Na^+<K^+<Rb^+$. After growth of ZIF-8/GO layer onto the AAO support, however, I-V characteristics of the ZIF-8/GO/AAO membrane (illustrated in FIG. 5B) are very different from the results shown in FIG. 5A. The order of ion transport of the ZIF-8/GO/AAO membrane was: $Li^+>Na^+>K^+>Rb^+$.

The ion conductance values of the AAO substrates before and after growth of the ZIF-8/GO layer were also systematically compared. The LiCl conductance values (GLiCl) of ZIF-8/GO/AAO membranes were slightly higher than that of pure AAO supports, while the NaCl, KCl, and RbCl conductance values of ZIF-8/GO/AAO membranes were much less than those of pure AAO supports (see FIG. 5C and Table 1 and Table 2 below). Note: Ion conductance value (G) of the AAO and ZIF-8/GO membranes was determined by fitting the slope of the transmembrane ion current as a function of the applied voltage:

$$G = dI/dU \qquad \text{Equation 1}$$

TABLE 1

Conductance values of the AAO supports before growth of
ZIF-8/GO membranes measured in 0.1M MCl solutions
($M^+$ = $Li^+$, $Na^+$, $K^+$, and $Rb^+$)

| | Conductance of the AAO membrane (mS) | | | |
|---|---|---|---|---|
| Sample | LiCl | NaCl | KCl | RbCl |
| 1 | 0.86 ± 0.02 | 0.97 ± 0.01 | 1.03 ± 0.02 | 1.07 ± 0.03 |
| 2 | 0.84 ± 0.03 | 0.96 ± 0.02 | 1.03 ± 0.01 | 1.09 ± 0.01 |
| 3 | 0.85 ± 0.01 | 0.95 ± 0.02 | 1.04 ± 0.02 | 1.08 ± 0.02 |

TABLE 2

Conductance values of the AAO supports after growth of
ZIF-8/GO membranes measured in 0.1M MCl solutions
($M^+$ = $Li^+$, $Na^+$, $K^+$, and $Rb^+$)

| | Conductance of the ZIF-8/GO/AAO membrane (mS) | | | |
|---|---|---|---|---|
| Sample | LiCl | NaCl | KCl | RbCl |
| 1 | 0.96 ± 0.01 | 0.68 ± 0.01 | 0.49 ± 0.01 | 0.25 ± 0.01 |
| 2 | 0.99 ± 0.01 | 0.70 ± 0.01 | 0.47 ± 0.01 | 0.24 ± 0.01 |
| 3 | 0.96 ± 0.01 | 0.73 ± 0.01 | 0.39 ± 0.01 | 0.22 ± 0.02 |

Figure 3:
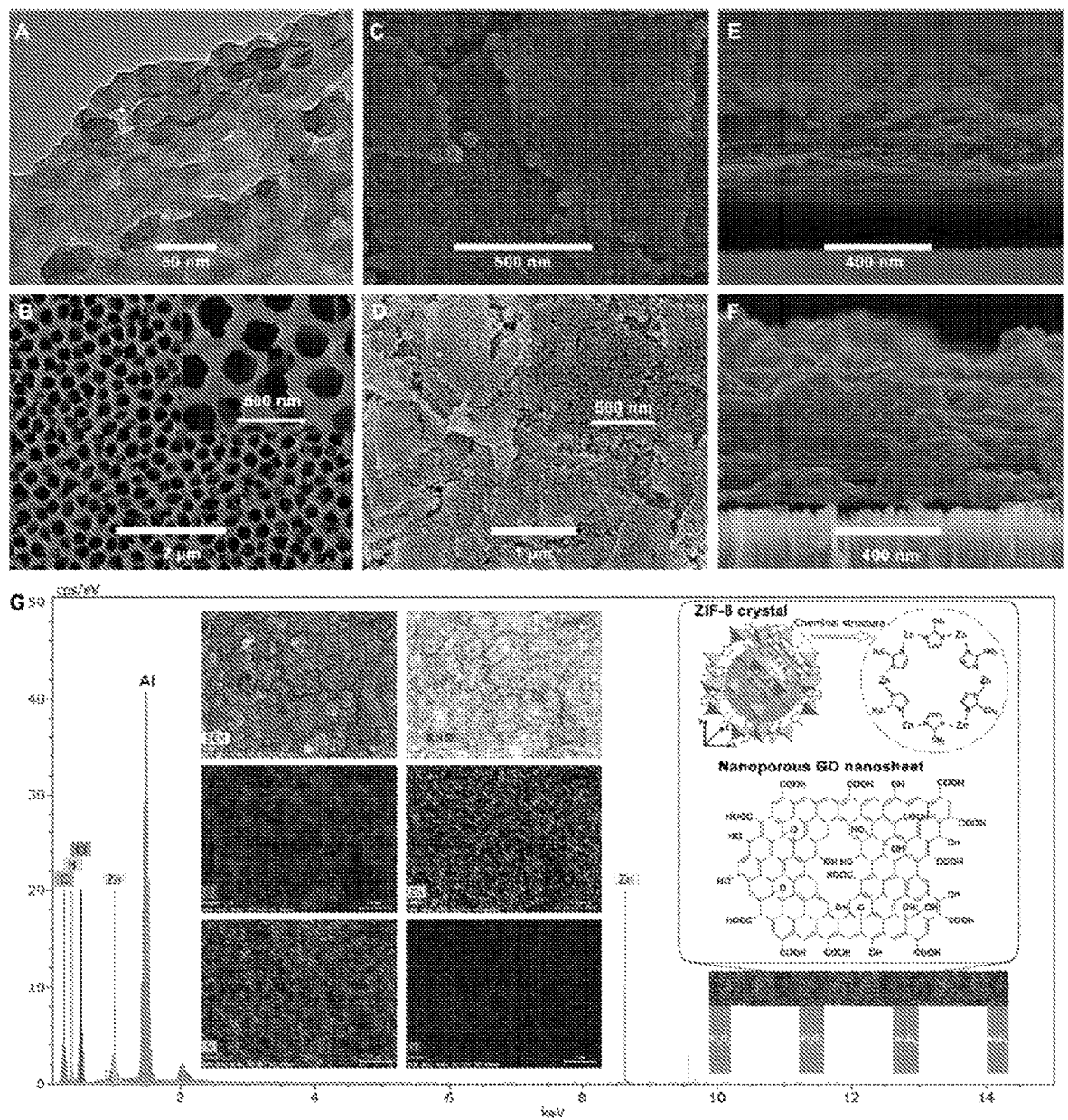
FIG. 3: (A) TEM image of the ZIF-8/GO nanosheets. (B) SEM images of the surface of the AAO support. (C) SEM images of the ZIF-8/GO seeding layer. (D) SEM images of the plasma-treated nanoporous ZIF-8/GO seeding layer. (E) Enlarged SEM image of the cross section of the AAO support with a ZIF-8/GO nanosheet seeding layer without plasma treatment. Due to low interaction between the seeding layer and the AAO, the seeding layer is peeled off the AAO support during fracture of the membrane. (F) Enlarged SEM image of the cross section the ZIF-8/GO/AAO membrane. The ZIF-8/GO membrane still attaches to the AAO support after fracture. (G) EDX mapping of the ZIF-8/GO/AAO membrane. The insets are the surface of the ZIF-8/GO/AAO membrane for C, N, Zn, and O mappings (scale bar 1 μm) and the chemical structures of the ZIF-8/GO/AAO membranes with ZIF-8 crystals, nanoporous GO nanosheets and AAO support. The ZIF-8/GO layer was cracked after EDX mapping due to damage by high-energy electron irradiation.
Figure 7:
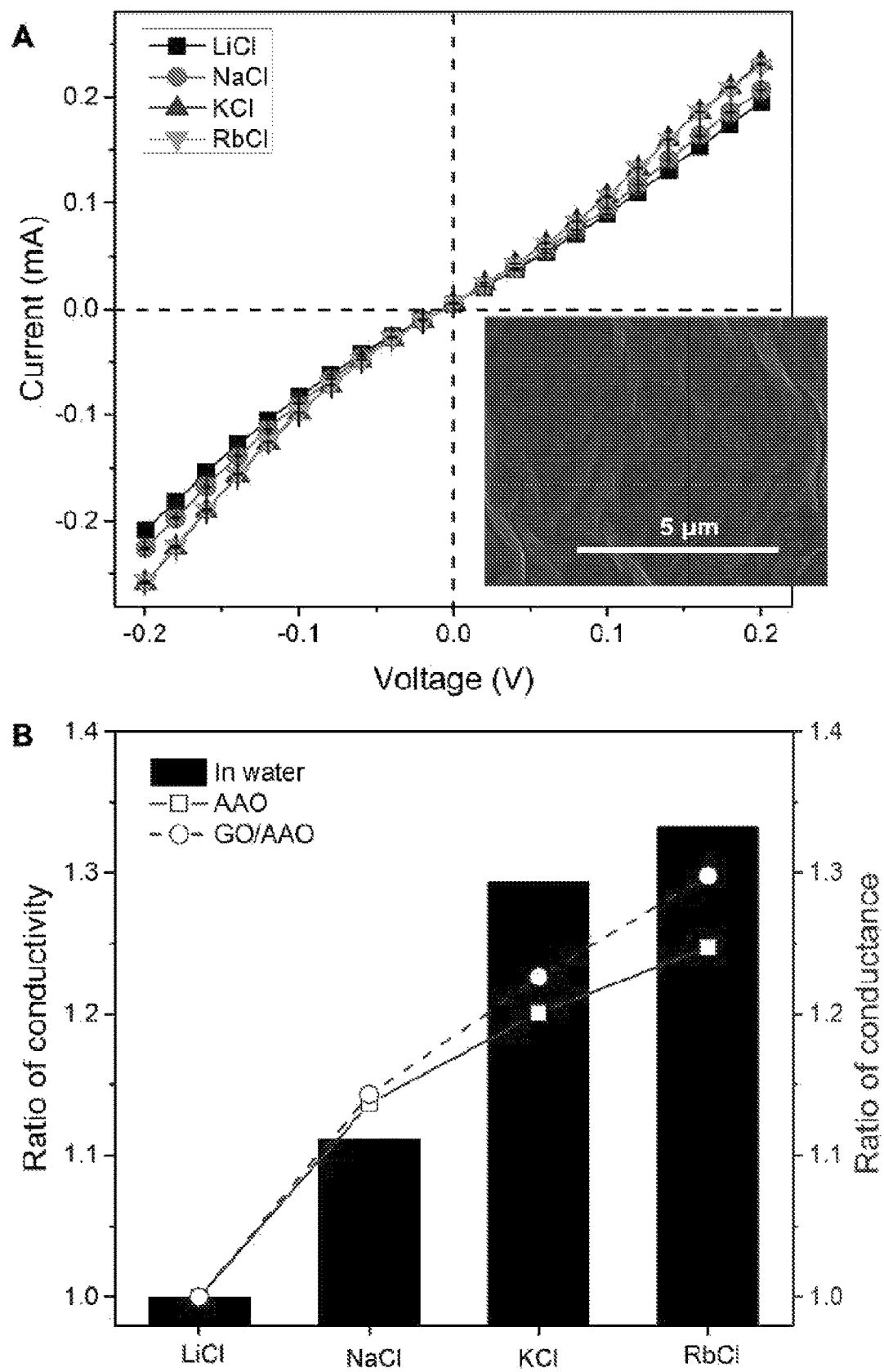
FIG. 7: (A) Ion transport property and SEM image of the GO/AAO membrane obtained from the ZIF-8/GO/AAO membrane. (B) Conductivity ratio of 0.1 MCl relative to 0.1 M LiCl and conductance ratio of the GO/AAO membrane and pure AAO support.

As shown in FIG. 3F, the interlayer spacing of the GO nanosheets within the ZIF-8 membrane varied from 5 to 30 nm, which are much larger than the angstrom-sized hydrated ionic diameters. Therefore, it is the presence of the sub-nanometer pores that provides for the alkali metal ion selectivity of the ZIF-8/GO/AAO membrane. To further confirm that the GO nanosheets did not play an important role in ion transport properties of ZIF-8/GO/AAO membranes, the ZIF-8/GO/AAO membrane was washed with hydrochloric acid to remove the ZIF-8 and the ion transport properties of the nanoporous GO/AAO membrane were tested. Different from I-V curves of the ZIF-8/GO/AAO membranes shown in FIG. 5B, the GO/AAO membrane without ZIF-8 does not have alkali metal ion selectivity as shown in FIG. 7.

FIG. 7A and FIG. 7B illustrate the ion transport properties of the nanoporous GO/AAO membrane, with an ion transport order of $Li^+<Na^+<K^+<Rb^+$, which was the same as the result observed in and the AAO support shown in FIG. 5A. The GO/AAO membranes were observed by washing the ZIF-8/GO/AAO membrane using 1 M HCl solution. FIG. 7A shows the ion transport property and SEM image of the GO/AAO membrane obtained from the ZIF-8/GO/AAO membrane. The GO/AAO membrane does not have alkali metal ion selectivity because the interlayer spacing of GO layer in water is about 13.5 Å, which is much larger than the hydrated ionic diameters of the alkali metal ions. FIG. 7B shows the conductivity ratio of 0.1 MCl relative to 0.1 M LiCl and conductance ratio of the GO/AAO membrane and pure AAO support. For nanoporous membranes, conductance value (G) is defined as: G=1/R, R=L/Sk. Where k is conductivity of the electrolyte solution, L is the thickness of the membrane, and S is the test area of the membrane. For a membrane, L and S are constant parameters. Therefore, the conductance can be described as a function of k, G=S/L×k. As a result, the conductance value of the AAO membrane under different solutions is proportional to the conductivity of the electrolytes.

To explain the observed unusual ion transport properties in ZIF-8 membranes with sub-nanometer pores, two different models for ion transport through AAO and ZIF-8 membranes are suggested. Ions are hydrated by water molecules in aqueous solution, and hydrated ionic diameters of alkali metal ions ($d_H$) are about 6 Å to about 8 Å, which are much larger than the dehydrated ionic diameters (d) of the ions (about 1 Å to about 3 Å). Ionic diameters and hydrated ionic diameters of alkali metals and chloride are provided in Table 3 below:

TABLE 3 ionic diameter (d), hydrated ionic diameter ($d_H$),
hydration enthalpy, and limited ion conductivity

| Ion | Ionic diameter (Å) | Hydrated ionic diameter (Å) | Hydration enthalpy (KJ $mol^{-1}$) | Limited ion conductivity in water at 25° C. (mS $m^2$ $mol^{-1}$) |
|---|---|---|---|---|
| $Li^+$ | 1.20 | 7.64 | −519 | 3.869 |
| $Na^+$ | 1.90 | 7.16 | −406 | 5.011 |
| $K^+$ | 2.66 | 6.62 | −322 | 7.352 |
| $Rb^+$ | 2.96 | 6.58 | −293 | 7.640 |
| $Cl^-$ | 3.62 | 6.64 | −381 | 7.634 |

For the AAO support, its pore diameter of ~200 nm is much larger than the hydrated ionic diameters, so ions transport through the pores of the AAO support in the hydrated form, as illustrated in FIG. 5D. The order of the hydrated ionic diameter is: (7.64 Å)>(7.16 Å)>(6.62 Å)> (6.58 Å), so the conductance values of the AAO support for different ion types decrease with increasing hydrated ionic diameter: $G_{LiCl}<G_{NaCl}<G_{KCl}<G_{RbCl}$ (see FIG. 6A). However, when the pore diameter becomes less than the hydrated ionic diameter but larger than the dehydrated ionic diameter, ions undergo a dehydration process in order to enter the pore as illustrated in the proposed schematic shown in FIG. 5E. The dehydrated ions can be rehydrated by water molecules when they exit the pore into an aqueous solution.

Figure 8:
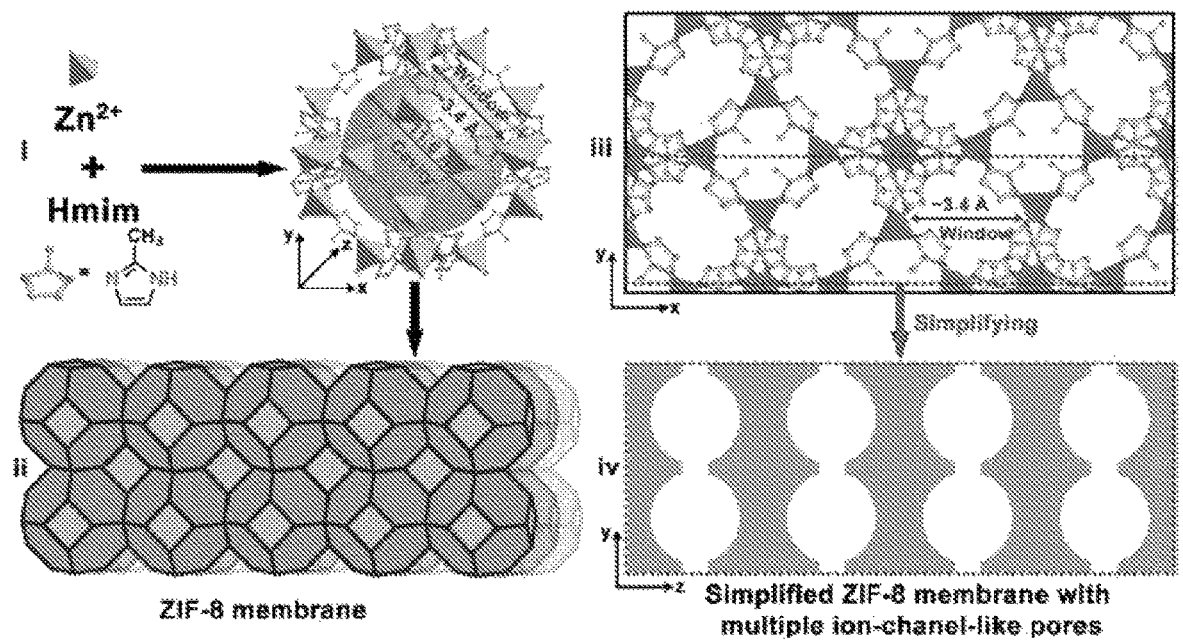
FIG. 8: Schematic of the ZIF-8 membrane. As shown in the crystal structure (i) and SOD topology (ii), pores of the ZIF-8 membrane consist of ~3.4 Å windows and ~11.6 Å cavities. The geometrically identical pores are shown along the z-axis (iii). The pore morphologies are illustrated in the yz plane (iv).
Figure 9:
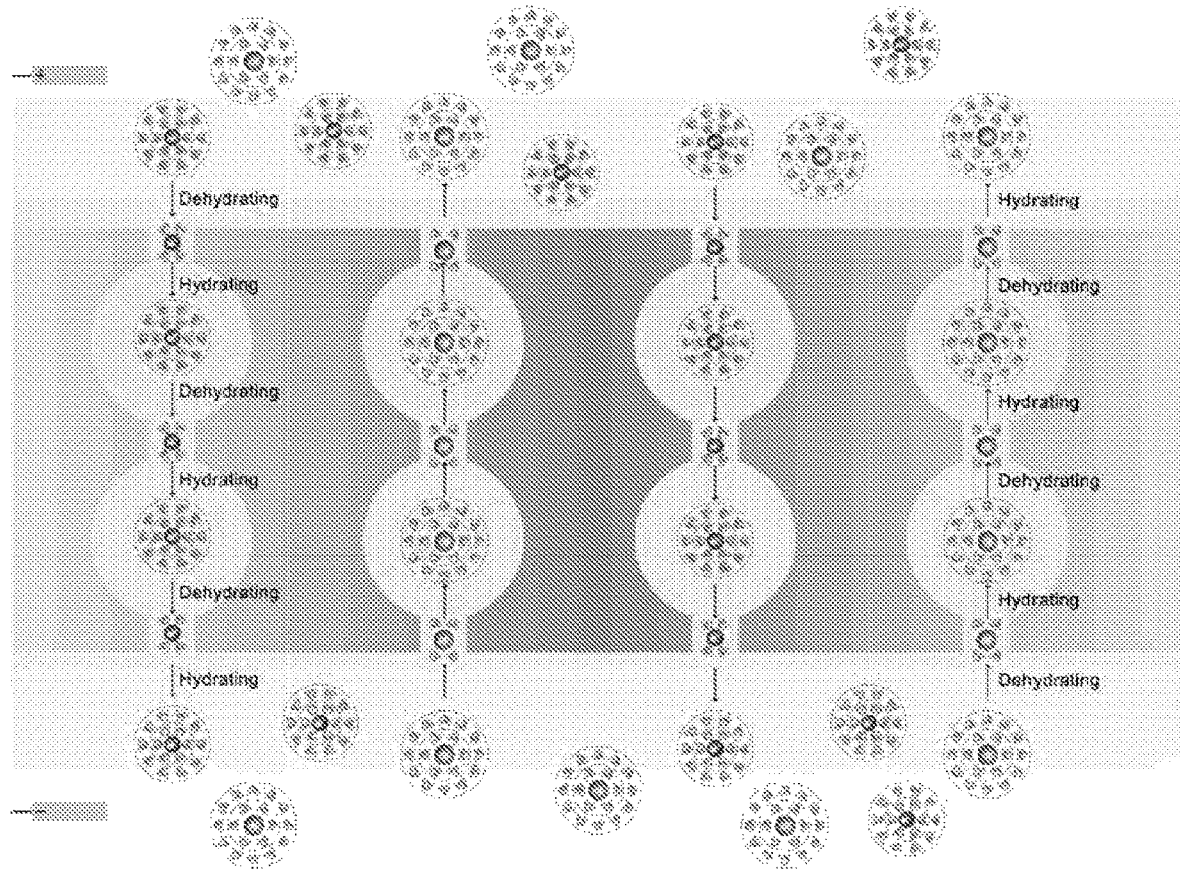
FIG. 9: Schematic illustration of proposed ion transport mechanism through sub-nanometer ZIF-8 pores.

FIG. 8 is a schematic of the ZIF-8 membrane. As shown in the crystal structure (i) and SOD topology (ii), pores of the ZIF-8 membrane consist of ~3.4 Å windows and ~11.6 Å cavities. The geometrically identical pores are shown along the z-axis (iii). The pore morphologies are illustrated in the yz plane (iv). Because the ZIF-8 crystal structure contains multiple uniform ~3.4 Å windows and ~11.6 Å cavities, it is expected that ions passing through ZIF-8 will undergo multiple dehydration-hydration processes (as schematically shown in FIG. 9—which illustrates that due to the unique structure of the ZIF-8 windows and cavities, ions undergo multiple dehydrating-hydrating processes when they transport through the ZIF-8 membrane. Hydrated ions are dehydrated partly when they enter into the window regions of the ZIF-8 membrane. But ions are hydrated again when they exit the windows of the ZIF-8 membrane and enter the cavities of the membrane). Given this mechanism, the order of conductance values of the ZIF-8/GO/AAO membrane is a function of the dehydrated ionic diameter. The ionic diameter of alkali metal ions is in the following order: (1.20 Å)<(1.90 Å)<(2.66 Å)<(2.96 Å), so the ZIF-8/GO/AAO membrane for different ions has opposite ion conductance values: $G_{LiCl}>G_{NaCl}>G_{KCl}>G_{RbCl}$ (see FIG. 6B).

Figure 10:
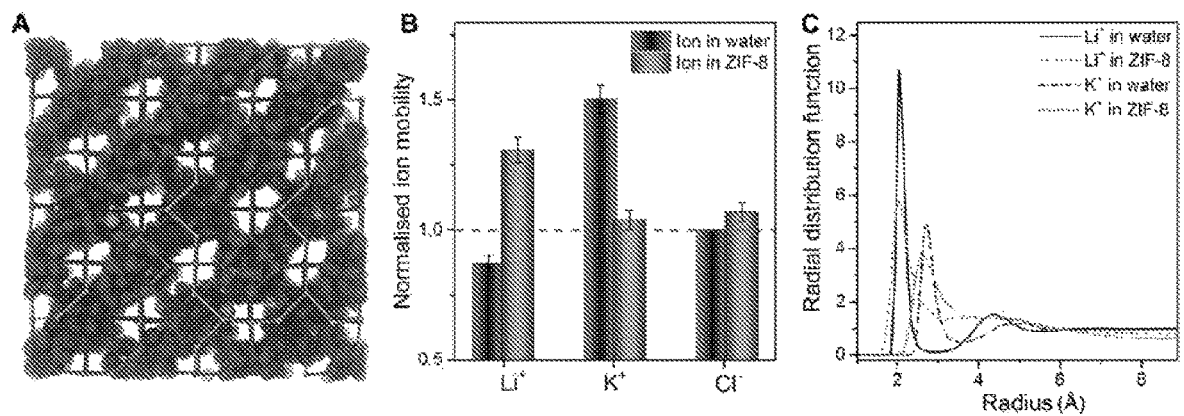
FIG. 10: (A) Molecular representation of the ZIF-8 cavities filled with water molecules (spheres) connected via narrow windows, with the ZIF-8 shown as a wireframe. (B) The normalized mobility of $K^+$, $Li^+$, and $Cl^-$ ions in ZIF-8 and in water. (C) Radial distribution function of water molecules around $Li^+$ and $K^+$ in bulk solutions and in ZIF-8.

To support this hypothesis, molecular dynamics (MD) simulations were performed to study ion transport of LiCl and KCl in ZIF-8 and in bulk water. FIG. 10 shows the results of the MD simulations of ion transport in ZIF-8. FIG. 10A is a molecular representation of the MD simulations, with the ZIF-8 cavities filled with water molecules (spheres) and ZIF-8 shown as a wireframe.

The calculated ion mobility of $K^+$, $Li^+$, and $Cl^-$ ions in ZIF-8 and in water are summarized in FIG. 10B and provided in Table 4 below. The mobility of $Cl^-$ in 1 M aqueous solution is taken as the reference. The $Li^+$ mobility is enhanced in ZIF-8 compared with that in water, whereas the opposite trend is observed for $K^+$. Consequently, $Li^+$ in ZIF-8 has a higher mobility than $K^+$, which is consistent with experiments.

TABLE 4

Calculated ion mobility in bulk solution and in ZIF-8.

| Ion | 1M bulk solution* ($10^{-7}$ m$^2$/Vs) | ZIF-8† ($10^{-7}$ m$^2$/Vs) | ZIF-8§ ($10^{-7}$ m$^2$/Vs) |
|---|---|---|---|
| $K^+$ | 3.47 ± 0.02 | 2.40 ± 0.01 | 2.20 ± 0.03 |
| $Cl^-$ | 2.31 ± 0.08 | 2.47 ± 0.01 | 2.12 ± 0.04 |
| $Li^+$ | 2.01 ± 0.01 | 3.02 ± 0.03 | 3.21 ± 0.02 |
| $Cl^-$ | 2.45 ± 0.01 | 2.51 ± 0.01 | 2.17 ± 0.01 |

Note:
*calculated under an electric field of 0.5 V/Å;
†calculated under an electric field of 0.5 V/Å;
§calculated under an electric field of 1.0 V/Å

Figure 11:
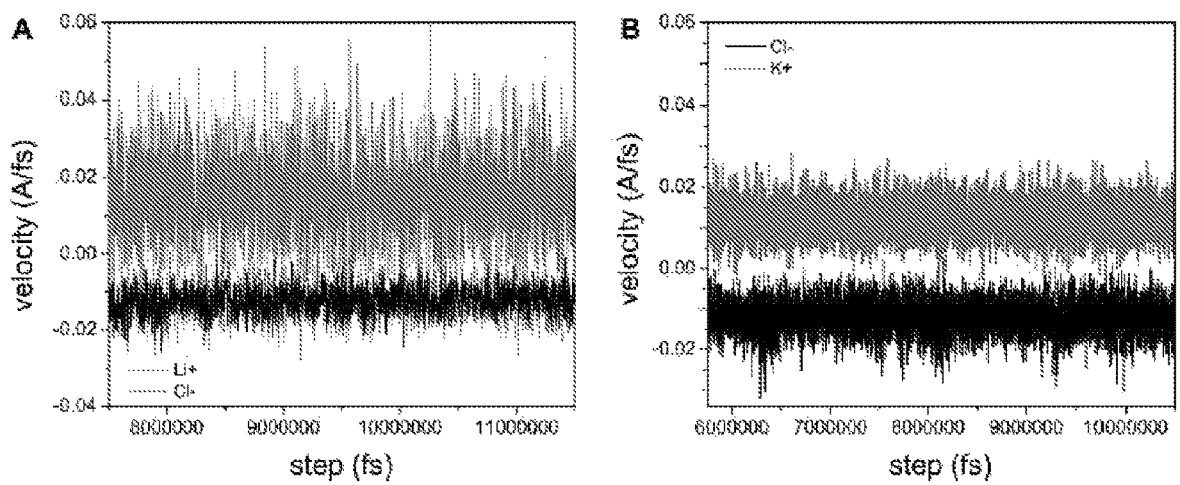
FIG. 11: Calculated ion velocities in ZIF-8 pores under an electric field of 0.5V/Å for (A) LiCl, and (B) KCl.

As can be seen from the data, the $Li^+$ mobility is enhanced in ZIF-8 compared to the $Li^+$ mobility in water, whereas the opposite trend is observed for $K^+$ ions. As a result, in ZIF-8, $Li^+$ ions have a higher mobility than $K^+$ ions, which agrees with the conductance experiments. To understand this observation, FIG. 10C shows the radial distribution function of the oxygen atoms on water molecules surrounding $Li^+$ and $K^+$ ions. The reduced oxygen atom density peaks clearly suggest the partial dehydration of $Li^+$ and $K^+$ ions in ZIF-8. More importantly, in ZIF-8 their second hydration shell nearly disappears. The partially dehydrated $Li^+$ ion apparently has a smaller effective size than $K^+$, which could explain its higher mobility. FIG. 1A and FIG. 11B provide calculated ion velocities in ZIF-8 pores, under an electric field of 0.5V/Å, for LiCl and KCl respectively.

Figure 12:
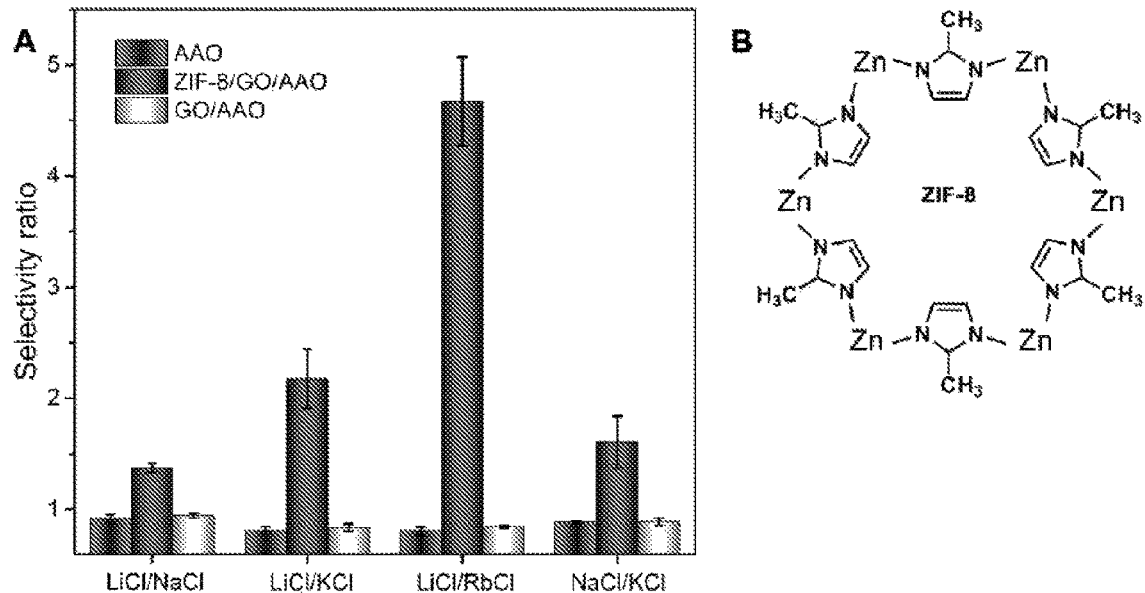
FIG. 12: (A) Alkali metal ion selectivity of AAO supports, ZIF-8/GO/AAO membranes, and GO/AAO membranes. (B) Window structures of MOF pores: 6-ring ZIF-8 window of ~3.4 Å in diameter.
Figure 13:
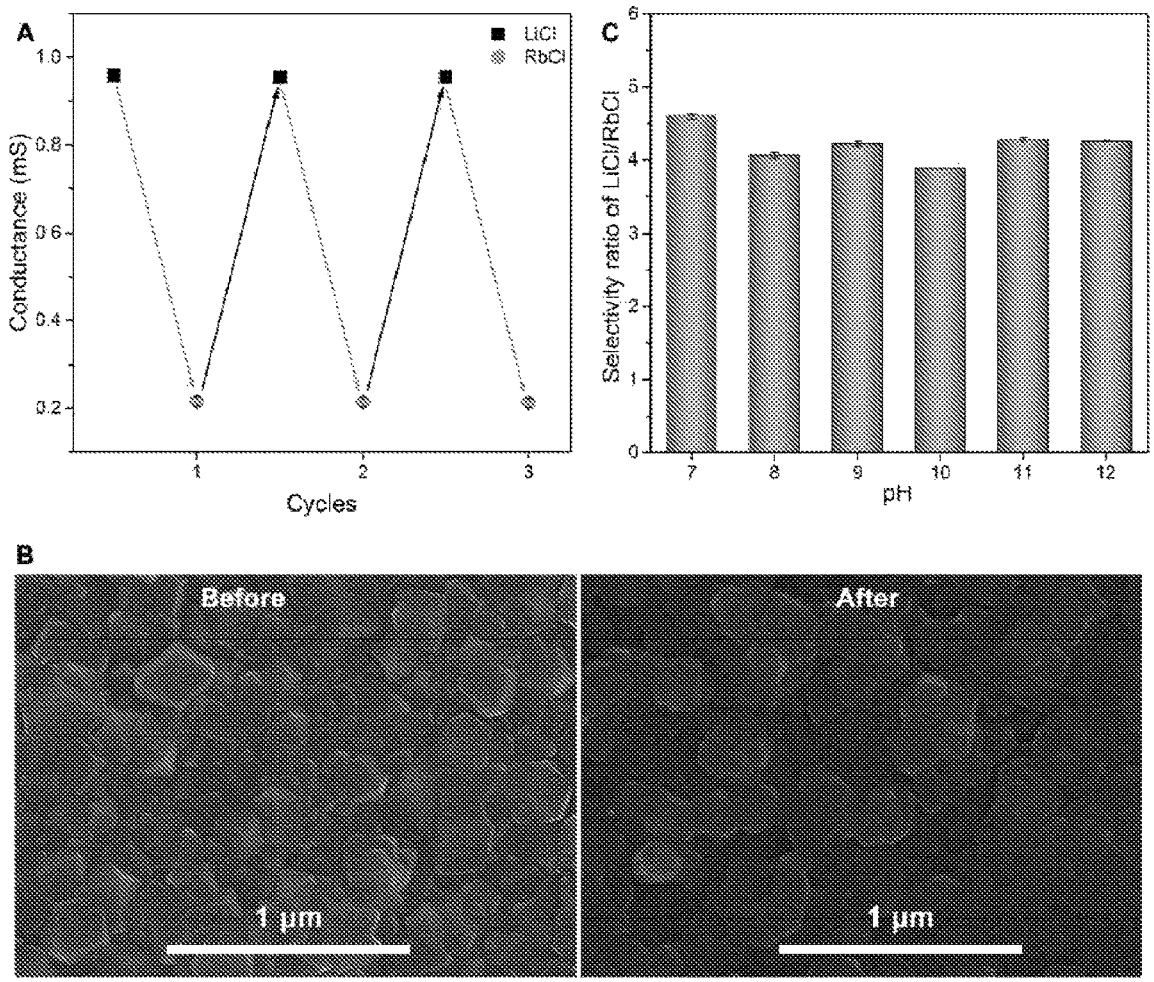
FIG. 13: (A) Reversible cycles of conductance values of the ZIF-8/GO membrane measured in 0.1 M LiCl and RbCl solutions. (B) SEM image of the ZIF-8/GO membrane before and after ion current measurements. (C) LiCl/RbCl selectivity of the ZIF-8 membrane under different pH conditions.

Alkali metal ion selectivities of the produced ZIF-8/GO/AAO membranes are summarized in FIG. 12A, which is a graph showing alkali metal ion selectivity of AAO supports, ZIF-8/GO/AAO membranes, and GO/AAO membranes; and Tables 5 and 6.

TABLE 5

Ion selectivity ratio of the AAO membrane

| Sample | $Li^+$/$Na^+$ | $Li^+$/$K^+$ | $Li^+$/$Rb^+$ | $Na^+$/$K^+$ |
|---|---|---|---|---|
| 1 | 0.870 ± 0.003 | 0.767 ± 0.004 | 0.773 ± 0.004 | 0.881 ± 0.002 |
| 2 | 0.926 ± 0.002 | 0.823 ± 0.003 | 0.806 ± 0.002 | 0.889 ± 0.002 |
| 3 | 0.943 ± 0.002 | 0.839 ± 0.002 | 0.847 ± 0.002 | 0.890 ± 0.001 |
| Average | 0.91 ± 0.03 | 0.80 ± 0.04 | 0.80 ± 0.04 | 0.88 ± 0.01 |

TABLE 6

Ion selectivity ratio of the ZIF-8/GO/AAO membrane

| Sample | $Li^+$/$Na^+$ | $Li^+$/$K^+$ | $Li^+$/$Rb^+$ | $Na^+$/$K^+$ |
|---|---|---|---|---|
| 1 | 1.332 ± 0.004 | 1.933 ± 0.001 | 4.335 ± 0.002 | 1.456 ± 0.001 |
| 2 | 1.369 ± 0.004 | 2.138 ± 0.006 | 4.571 ± 0.002 | 1.482 ± 0.006 |
| 3 | 1.415 ± 0.002 | 2.464 ± 0.003 | 5.113 ± 0.001 | 1.873 ± 0.002 |
| Average | 1.37 ± 0.04 | 2.18 ± 0.26 | 4.67 ± 0.39 | 1.60 ± 0.23 |

The $Li^+$/$Rb^+$, $Li^+$/$K^+$, and $Li^+$/$Na^+$ selectivity ratios of 4.6, 2.2, and 1.4, respectively, are the highest ever reported for synthetic membranes. It is worth noting that the angstrom-sized pore windows of ZIF-8 are neutral and without functional groups, having no specific ion binding properties (see FIG. 12B for the structure of the ZIF-8 pore window of ~3.4 Å in diameter). Additionally, the pore windows of ZIF-8 are flexible, without sharp sieving at 3.4 Å. Thus, the ion selectivity of ZIF-8/GO/AAO membranes is mainly based on the sub-angstrom differences in ionic diameters of alkali metal ions. As $Li^+$ and $Rb^+$ have the largest difference in ionic diameters, the ZIF-8/GO/AAO membrane shows a higher $Li^+$/$Rb^+$ selectivity than $Li^+$/$Na^+$ or $Li^+$/$K^+$ selectivity.

To confirm the stability of the ZIF-8/GO/AAO membranes, ion conductance values were cyclically tested between LiCl and RbCl solutions (0.1 M). However, after testing for at least three cycles, no obvious change in the conductance values at each testing state was observed. Cycle performance and Stability of the ZIF-8/GO membrane results are shown in FIG. 10, in which: FIG. 10A shows reversible cycles of conductance values of the ZIF-8/GO membrane measured in 0.1 M LiCl and RbCl solutions; FIG. 10B are SEM images of the ZIF-8/GO membrane before and after ion current measurements; and FIG. 10C shows the LiCl/RbCl selectivity of the ZIF-8 membrane under different pH conditions. The results show that the ZIF-8/GO/AAO membranes have good stability and cycling performance. The stability of ZIF-8/GO/AAO membranes was further confirmed by SEM images of the membranes before and after ion current tests; and that there is no obvious change in $Li^+$/$Rb^+$ selectivity is observed at pH values ranging from 7 to 12, which confirms that the ZIF-8 membranes have stable $Li^+$/$Rb^+$ selectivity under basic conditions. Moreover, ions can pass through the ZIF-8/GO/AAO membrane under very low applied voltage, down to 20 mV (see FIG. 5B), showing fast ion transport rates of $\sim 10^5$ ions s$^{-1}$ for single ZIF-8/GO/AAO pore at 20 mV and $10^6$ ions s$^{-1}$ for single ZIF-8/GO/AAO pore at 200 mV.

In summary, MOF membranes with pore structures comprised of sub-nanometer-sized windows and nanometer-sized cavities are useful for separating monatomic ions of the same valence and similar sizes. The substantial alkali metal ion selectivity and conductivity observed in these experiments can be attributed to the pore morphologies of the MOF membranes. The angstrom-sized windows act as ion selectivity filters for sieving alkali metal ions, while the nanometer-sized cavities function as ion conductive pores for fast ion transport.

Example 2

Figure 14:
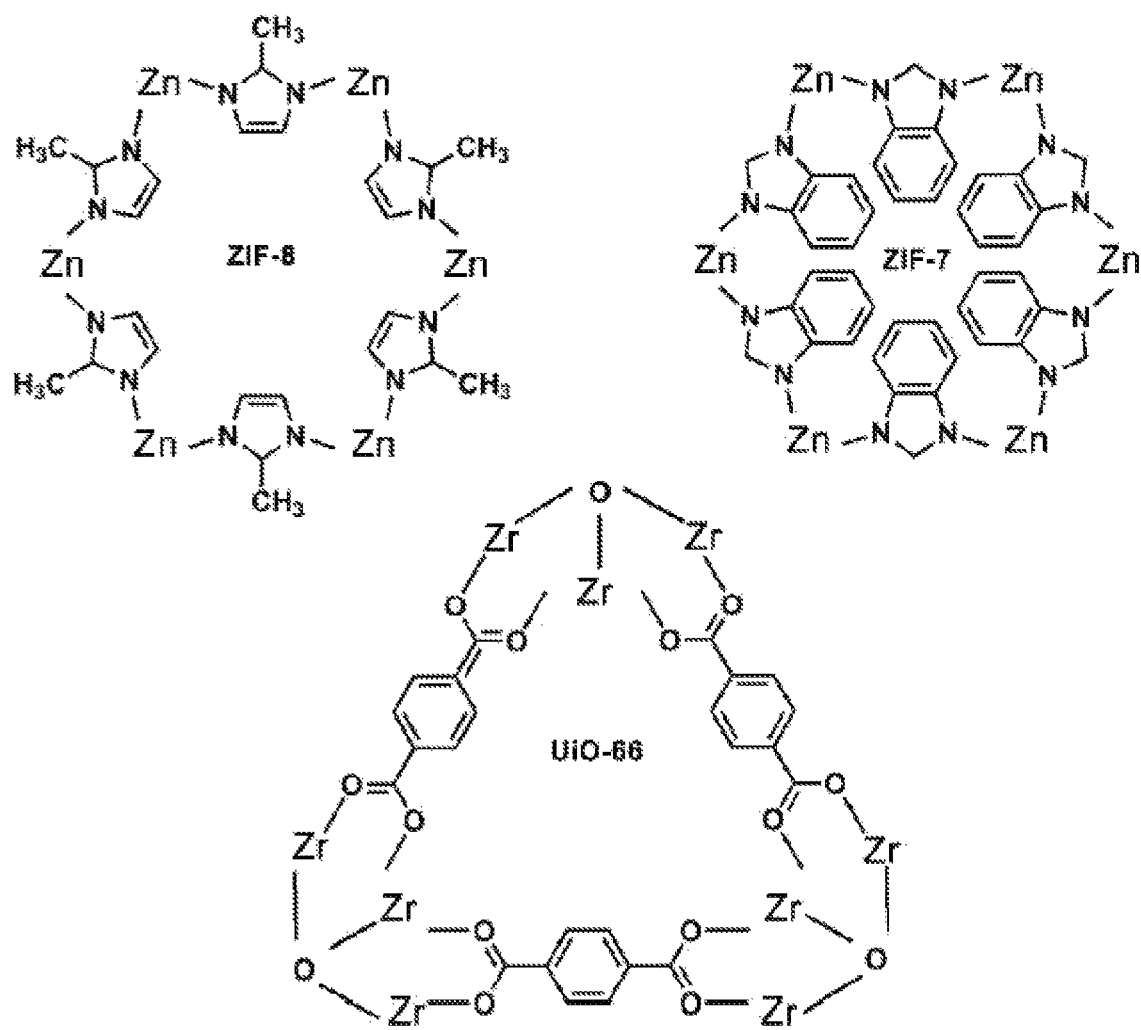
FIG. 14: Pore window structures for ZIF-8, ZIF-7, and UiO-66.

To further investigate the influence of pore window diameter on alkali metal ion selectivity of the MOF membranes, two different MOF membranes of different pore window sizes were prepared based on PET supports. One is the ZIF-7/PET membrane with ~2.9 Å pore windows (smaller than ZIF-8 windows) and ~6.0 Å pore cavities, the other is the UiO-66/PET membrane with ~6.0 Å windows (larger than ZIF-8 windows) and ~11.0 Å cavities (see FIG. 14 for MOF pore window structures). Moreover, we have grown ZIF-8 inside the single-channel polyethylene terephthalate (PET) membrane without using GO nanosheets, and investigated its ion transport behaviour.

Fabrication of bullet-shaped single-nanochannel PET membranes Single bullet-shaped nanochannels were fabricated in 12 µm thick polyethylene terephthalate (PET) membranes (diameter of 30 mm) by adopting the method of surfactant-protected ion-track-etching method. One side of the membrane was etched by 6 M NaOH+0.025% sodium dodecyl diphenyloxide disulfonate, while the other side was etched by 6 M NaOH at 60° C. During the etching process, a constant voltage of 1.0 V was applied across the film. After etching for about 3 min, a 1 M KCl+1 M HCOOH solution that is able to neutralize the etchant was added into the containers on both sides of the membrane, thus slowing down and finally stopping the etching process, and single bullet-shaped nanochannels were produced in the PET membranes. The nanochannel membranes were then soaked in MilliQ water to remove residual salts. Average tip diameter of the bullet-shaped nanochannel is 33±6 nm, while average base diameter is 239±20 nm.

Table 7 provides selectivity ratios for the PET membrane with a membrane thickness of 12000 nm, and for different channel diameters. Note that the 332 Å channel diameter corresponds with the bullet-shaped single-nanochannel PET membranes discussed above.

TABLE 7

Selectivity ratios for the PET membrane with a membrane thickness of 12000 nm

| Channel diameter | Li$^+$/Na$^+$ | Li$^+$/K$^+$ | Li$^+$/Rb$^+$ | Na$^+$/K$^+$ |
|---|---|---|---|---|
| 22 Å | 0.90 ± 0.02 | 0.77 ± 0.03 | 0.75 ± 0.01 | 0.86 ± 0.01 |
| 332 Å | 0.90 ± 0.03 | 0.67 ± 0.03 | 0.60 ± 0.03 | 0.74 ± 0.01 |
| 1000 Å | 0.83 ± 0.03 | 0.73 ± 0.03 | 0.68 ± 0.01 | 0.87 ± 0.02 |

* Ion selectivity ratio of Mi/Mj was calculated from the relation between the current of $M_iCl$ and the current of $M_jCl$ at +0.2 V according to Formula 1 below.

$$\text{ratio} = \frac{I^{+0.2\,V}_{M_iCl}}{I^{+0.2\,V}_{M_jCl}}$$

Equation 2

Figure 15:
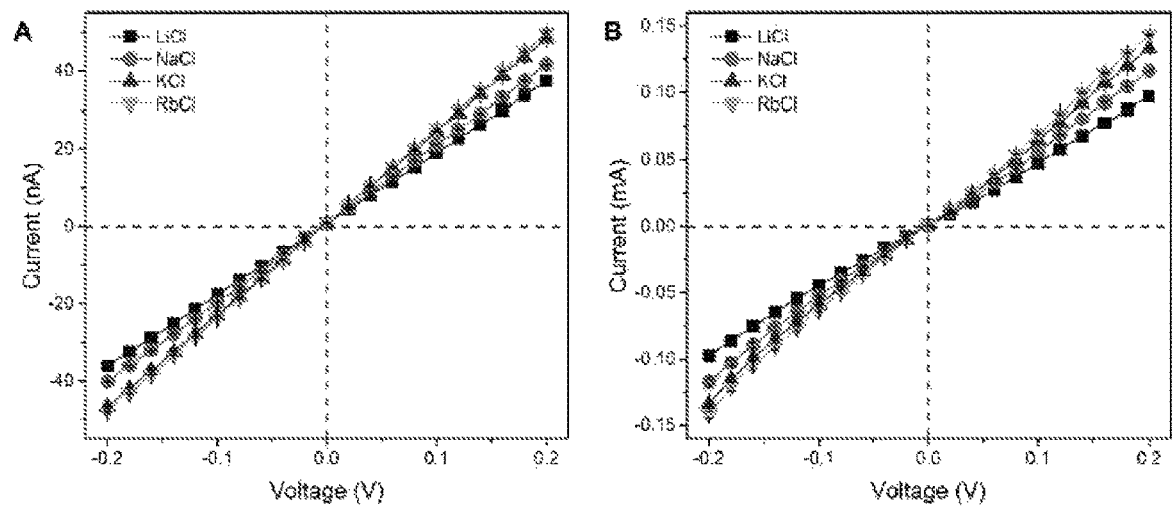
FIG. 15: (A) I-V curves of a cylindrical multichannel membrane with average channel diameter of 2.2 nm under different ion types (0.1 M MCl, pH 5.6). (B) I-V curves of a cylindrical multichannel membrane with average channel diameter of 120 nm (0.1 M MCl, pH 5.6).

FIG. 15A is an I-V curves of a cylindrical multichannel PET membrane with a channel density of $10^8$ cm$^{-2}$ with average channel diameter of 2.2 nm under different ion types (0.1 M MCl, pH 5.6). FIG. 15B is an I-V curves of a cylindrical multichannel PET membrane with a channel density of $10^8$ cm$^{-2}$ with average channel diameter of 120 nm (0.1 M MCl, pH 5.6).

Fabrication of Single-Nanochannel Supported ZIF-8/PET Membranes

ZIF-8/PET membranes were fabricated by interfacially growing ZIF-8 crystals into the base regions of the bullet-shaped single-nanochannel PET membranes formed according to the method discussed above.

Figure 16:
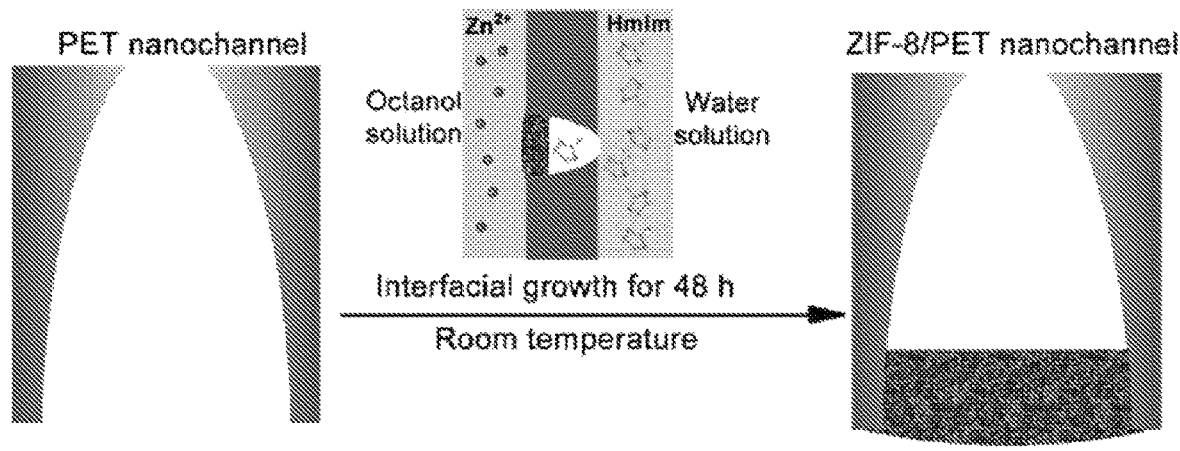
FIG. 16: Schematic illustrating the fabrication of ZIF-8/PET single-nanochannel membrane by an interfacial growth method.

The ZIF-8/PET membrane was prepared using an interfacial growth method in which the base side of the single nanochannel was fully filled with the ZIF-8 material. A schematic illustrating this is provided in FIG. 16.

The ZIF-8/PET membrane was formed using a counter-diffusion method. To form the membrane, the single-nanochannel PET membrane was mounted with the base side of the nanochannel membrane exposed to a Zn$^{2+}$ solution (prepared by dissolving Zn(NO$_3$)$_2$.6H$_2$O (0.055 g) in 10 mL octanol) and the tip side of the nanochannel membrane exposed to a 2-methylimidazole (Hmim) solution (prepared by dissolving Hmim (1.125 g) in 10 ml water). The Zn$^{2+}$ and Hmim solutions were separated by the membrane, and the single-nanochannel support was vertically aligned. After reacting at room temperature for 48 h, the ZIF-8/PET membrane was taken out and rinsed with fresh methanol, before being dried at 25° C. overnight.

Figure 17:
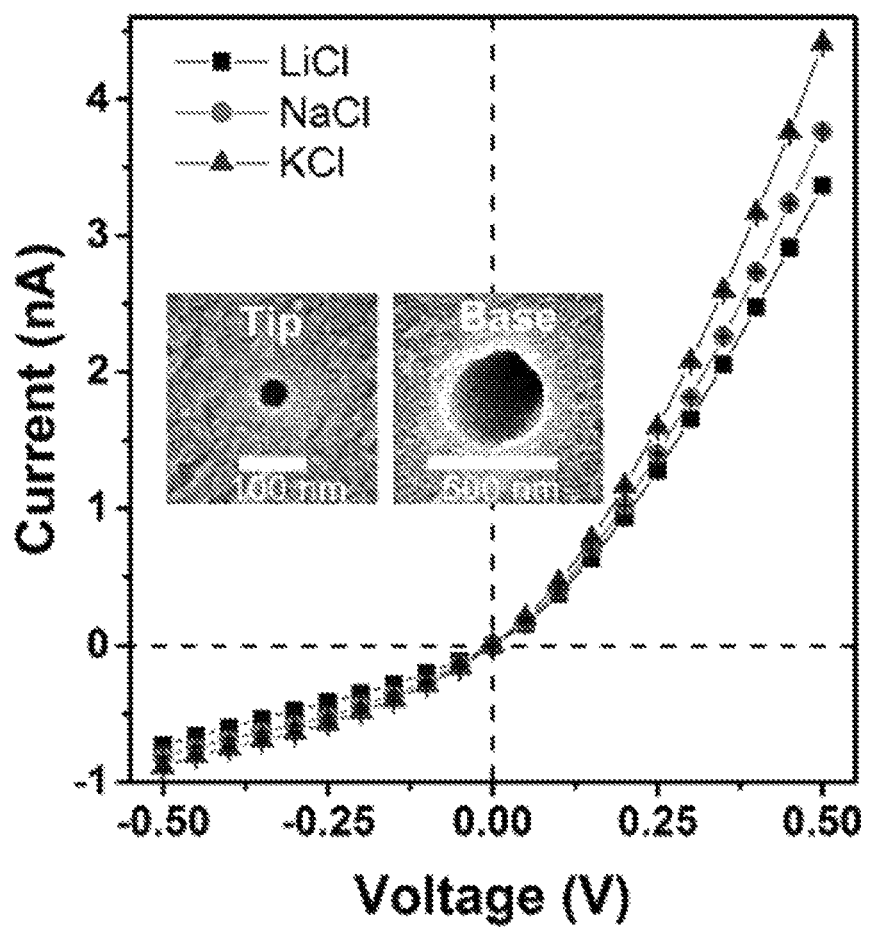
FIG. 17: I-V curves for LiCl, NaCl, and KCl; and SEM image of the original single nanochannel PET membrane.
Figure 18:
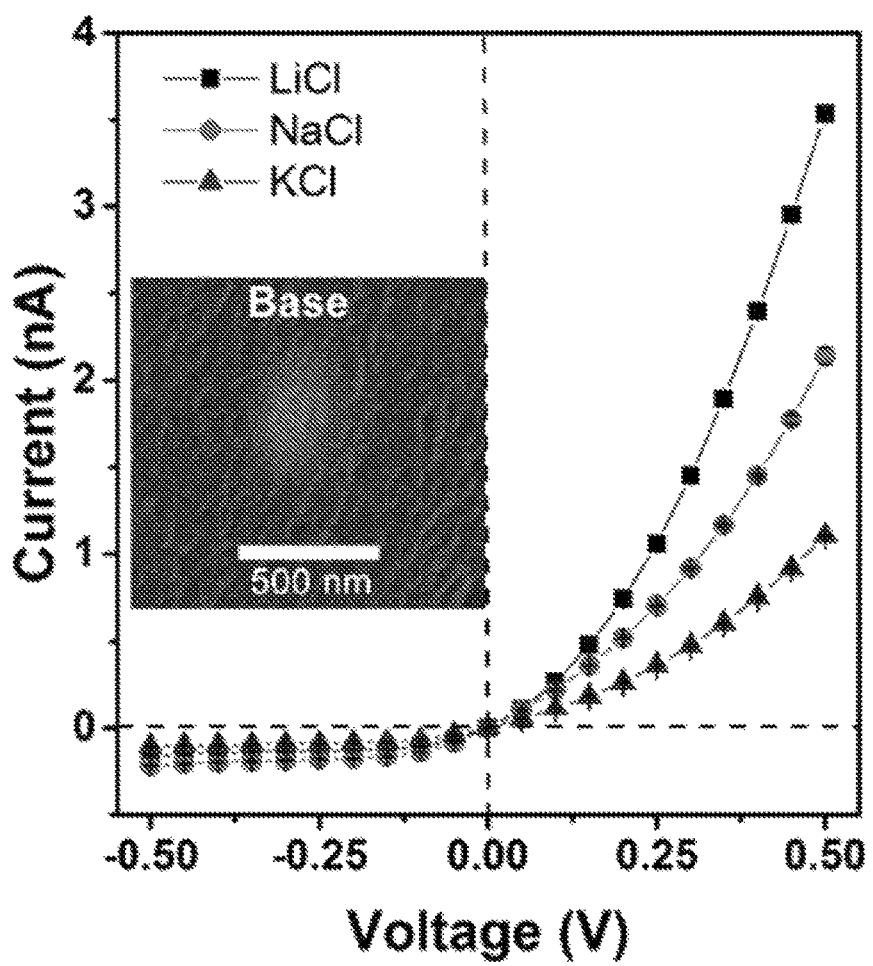
FIG. 18: I-V curves for LiCl, NaCl, and KCl; and SEM images of the ZIF-8-single-nanochannel membrane.

FIG. 17 provides I-V curves and SEM image of the original single nanochannel PET for LiCl, NaCl, and KCl. FIG. 18 provides I-V curves and SEM images of the single nanochannel ZIF-8/PET membrane. I-V curves are based on measurements taken in 0.1 M electrolyte solutions at pH 7.0. All I-V curves were measured in 0.1 M electrolyte solutions at pH 7.0. To clearly demonstrate that the base side of the PET nanochannel was fully filled by ZIF-8 crystals, the surface layer of ZIF-8 crystals fabricated on the PET-nanochannel membrane was manually removed before SEM characterization.

Fabrication of Single-Nanochannel Supported ZIF-7/PET Membrane

ZIF-7/PET membranes were fabricated by interfacially growing ZIF-7 crystals into the base regions of the bullet-shaped single-nanochannel PET membranes formed according to the method discussed above.

Figure 19:
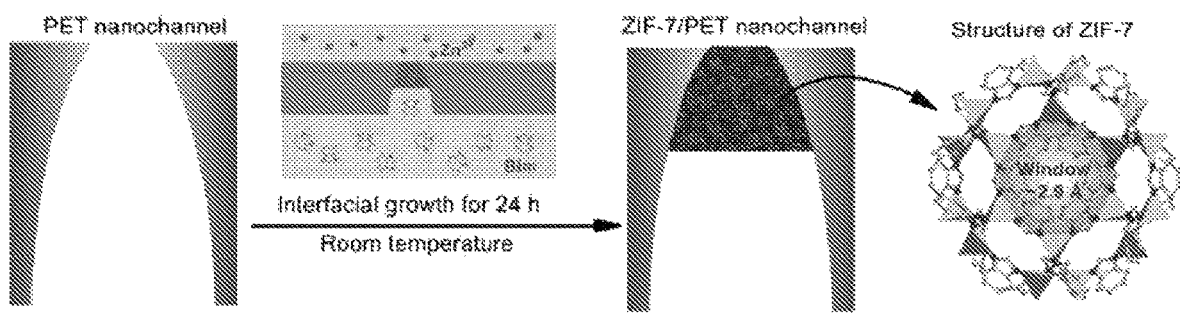
FIG. 19: Schematic illustrating the fabrication of ZIF-7/PET single-nanochannel membrane by an interfacial growth method with ~2.9 Å pore windows.

The ZIF-7/PET membrane was prepared using an interfacial growth method in which the base side of the single nanochannel was fully filled with the ZIF-8 material. A schematic illustrating this is provided in FIG. 19.

The ZIF-7/PET membrane was formed using a counter-diffusion method. To form the membrane, the single-nanochannel PET membrane was mounted with the base side of the nanochannel membrane exposed to a Zn$^{2+}$ solution (prepared by dissolving Zn(NO$_3$)$_2$.6H$_2$O (0.1 g) in 10 mL DMF) and the tip side of the nanochannel membrane exposed to a benzimidazole (Bim) solution (prepared by dissolving Bim (0.256 g) in 10 ml DMF). The Zn$^{2+}$ and Bim solutions were separated by the membrane, and the single-nanochannel support was vertically aligned. After reacting at room temperature for 24 h, the ZIF-7/PET membrane was taken out and rinsed with fresh methanol, before being dried at 25° C. overnight.

Figure 20:
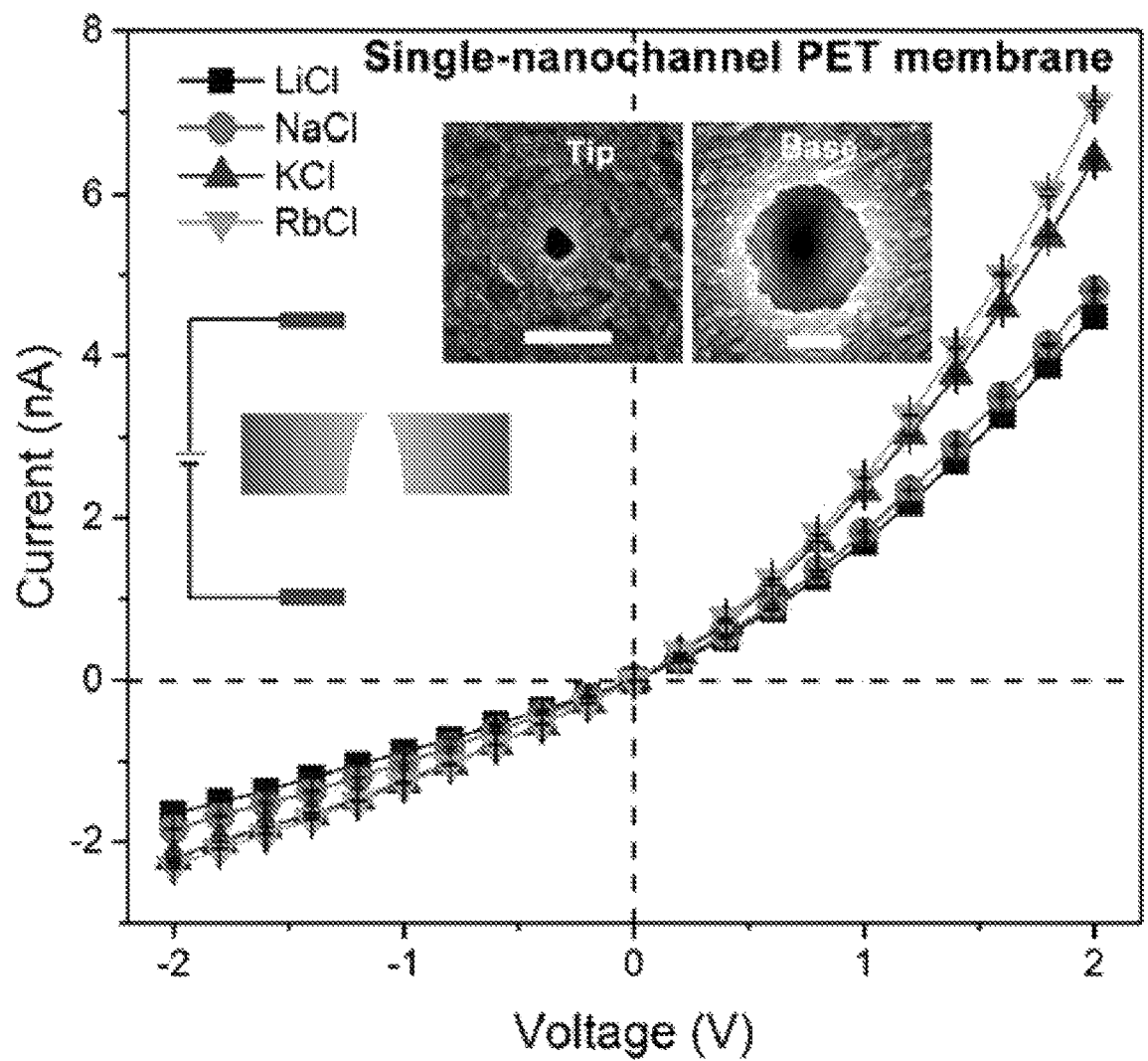
FIG. 20: I-V curves of a bullet-shaped single-nanochannel membrane before growth of ZIF-7 and in the presence of LiCl, NaCl, KCl, and RbCl (0.1 M MCl, pH 7.0). The insets are SEM images of the tip and base sides of single PET nanochannels before growth of MOFs, scale bar 100 nm. Tip diameter of the nanochannels before modification is 33±6 nm, while base diameter of the nanochannel before modification is 239±20 nm.
Figure 21:
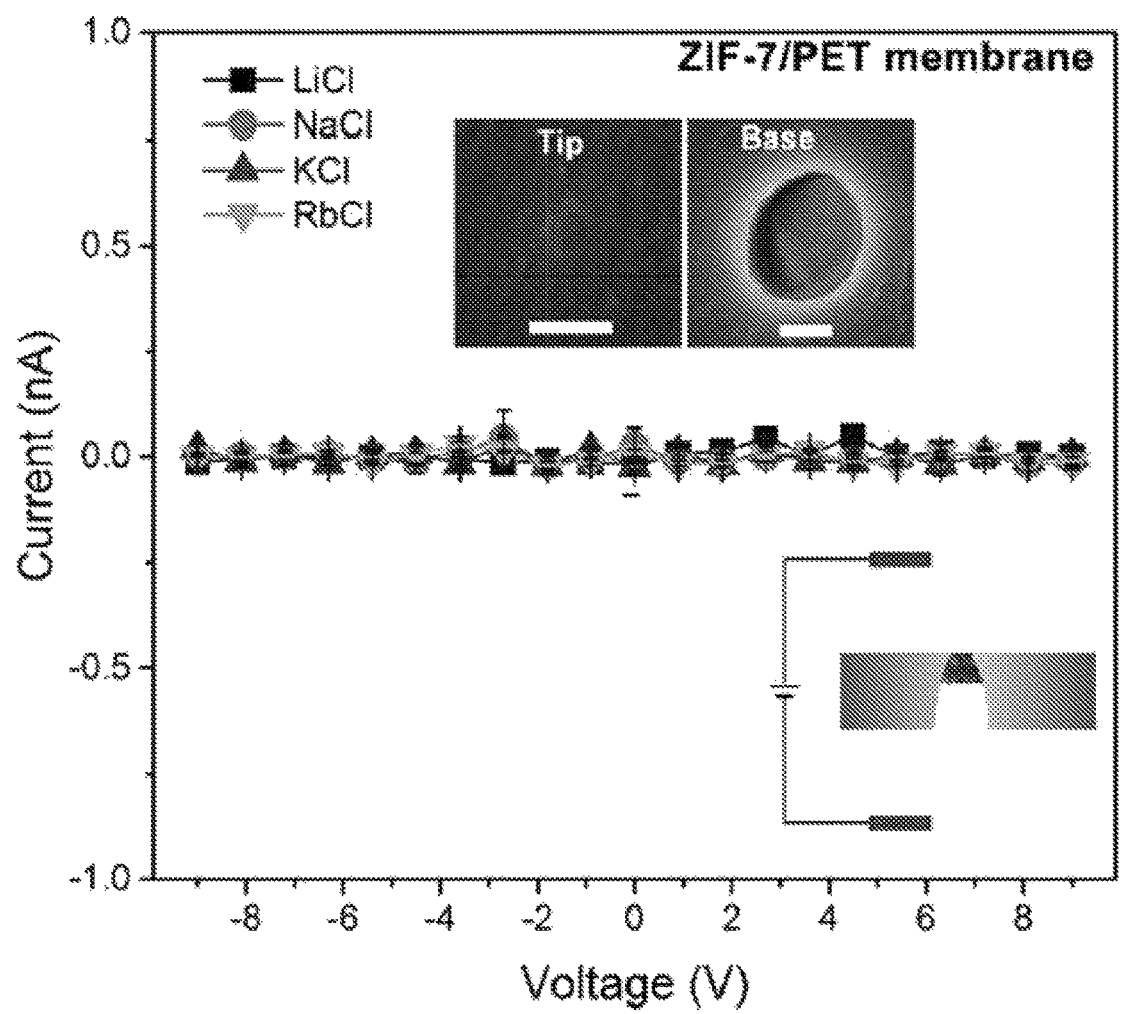
FIG. 21: I-V curves of a bullet-shaped single-nanochannel membrane after growth of ZIF-7 and in the presence of LiCl, NaCl, KCl, and RbCl (0.1 M MCl, pH 7.0). The insets are SEM images of the tip and base sides of single PET nanochannels after growth of MOFs, scale bar 100 nm. Tip diameter of the nanochannels before modification is 33±6 nm, while base diameter of the nanochannel before modification is 239±20 nm.

FIG. 20 provides I-V curves and SEM image of the original single nanochannel PET for LiCl, NaCl, and KCl. FIG. 21 provides I-V curves and SEM images of the single nanochannel ZIF-7/PET membrane. I-V curves are based on measurements taken in 0.1 M electrolyte solutions at pH 7.0. No ion conduction is observed in the ZIF-7/PET-single-nanochannel membrane because the pore structure of the ZIF-7 is superhydrophobic.

The insets are SEM images of the tip and base sides of single PET nanochannels before and after growth of ZIF-7; scale bar 100 nm. Tip diameter of the nanochannels before modification is 33±6 nm, while base diameter of the nanochannel before modification is 239±20 nm.

Figure 25:
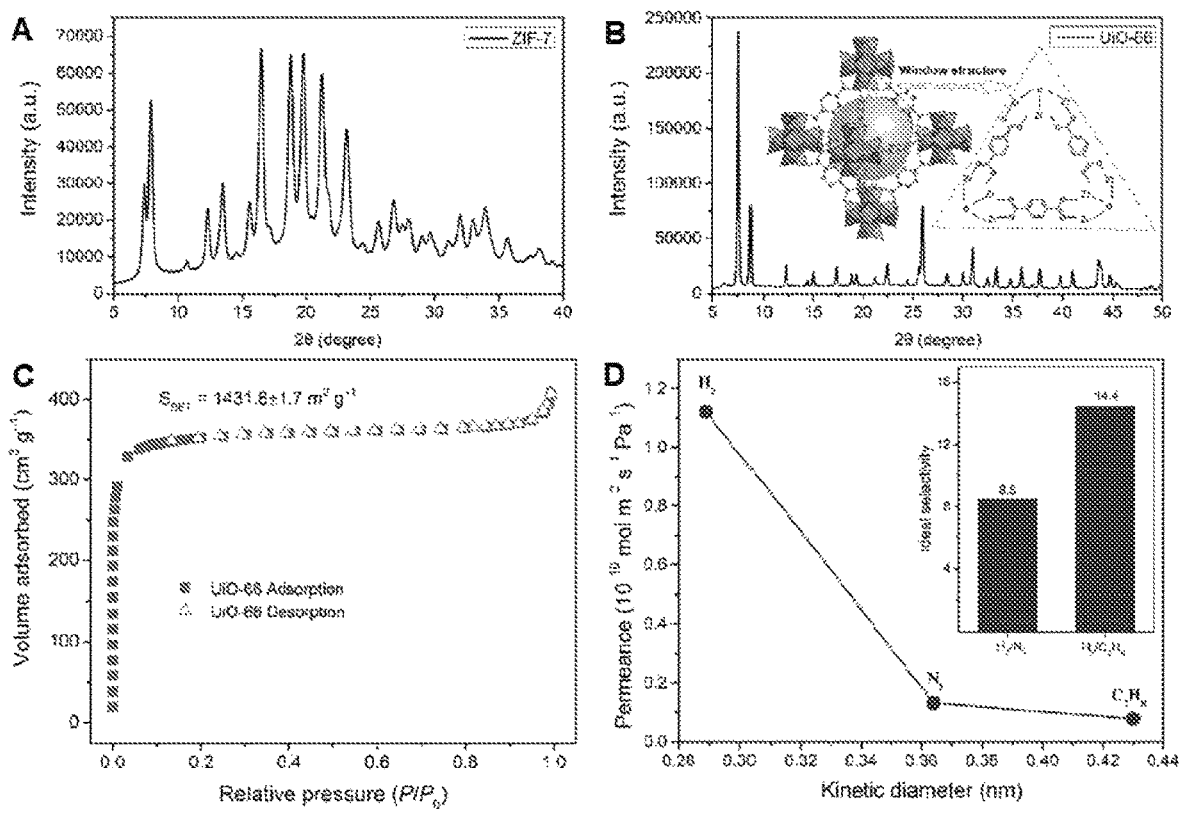
FIG. 25: (A) XRD of the ZIF-7 powder fabricated under the same condition as the ZIF-7/PET membrane. (B) XRD of UiO-66 powder fabricated under the same condition as the UiO-66/PET membrane. (C) $N_2$ adsorption-desorption isotherms of UiO-66 crystals. (D) Gas permeance and selectivity of the multichannel UiO-66/PET membrane with a channel density of $10^6$ $cm^{-2}$.

FIG. 25A is an XRD of the ZIF-7 powder fabricated under the same condition as the ZIF-7/PET membrane.

Fabrication of Sing Le-Nanochannel Supported UiO-66/PET Membrane

UiO-66/PET membranes were fabricated by interfacially growing ZIF-7 crystals into the base regions of the bullet-shaped single-nanochannel PET membranes formed according to the method discussed above.

Figure 22:
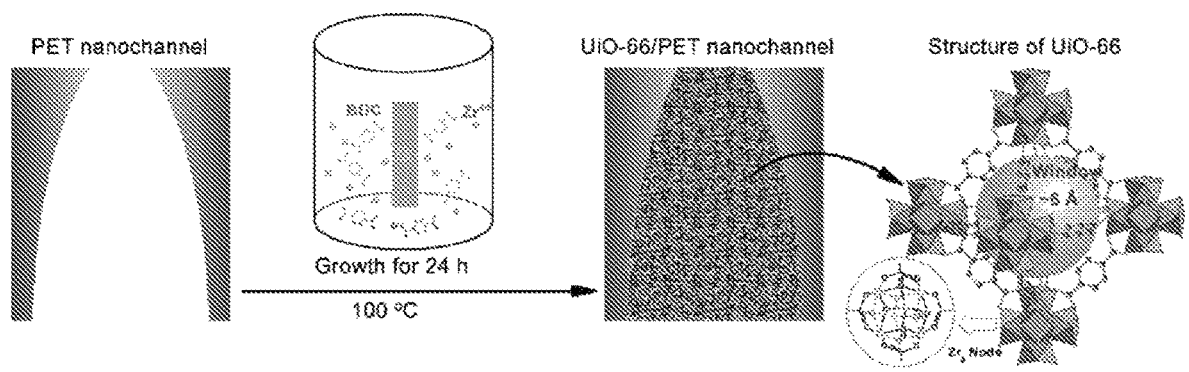
FIG. 22: Schematic illustrating the fabrication of the UiO-66/PET single-nanochannel membrane with ~6.0 Å pore windows.

The UiO-66/PET membrane was prepared using an in-situ solvothermal synthesis method. A schematic illustrating this is provided in FIG. 22. ZrCl$_4$ and BDC were dissolved in 40 mL DMF under stirring to give a molar composition: Zr$^{4+}$/BDC/DMF=1:1:500. This clear solution was transferred into a Teflon-lined stainless-steel autoclave in which a single-nanochannel PET membrane was placed vertically. Afterwards the autoclave was placed in a convective oven and heated at 100° C. for 24 h. After cooling, each membrane was washed with methanol and dried at 25° C. overnight.

Figure 23:
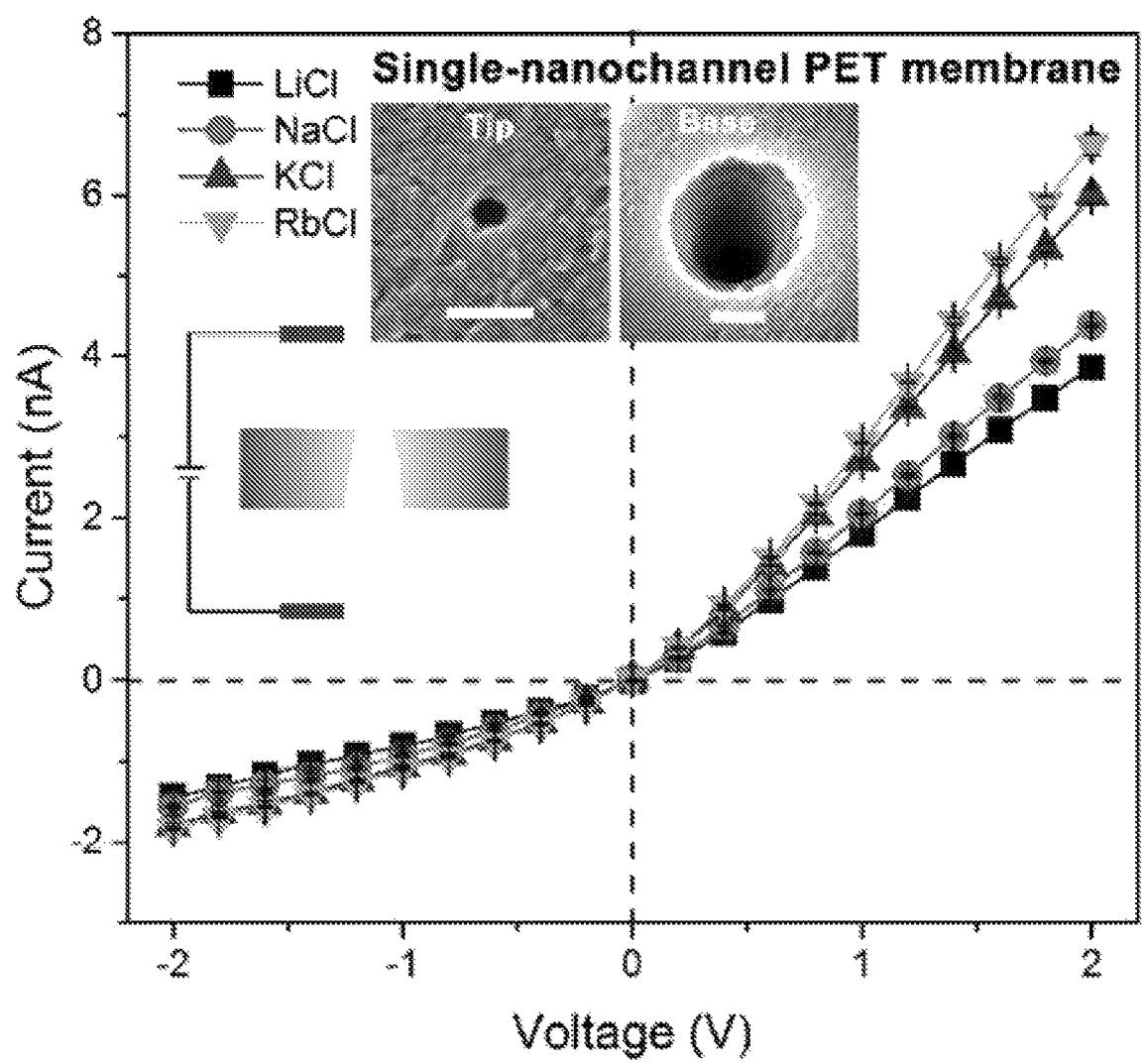
FIG. 23: I-V curves of a bullet-shaped single-nanochannel membrane before growth of UiO-66 in the presence of LiCl, NaCl, KCl, and RbCl (0.1 M MCl, pH 5.6). The insets are SEM images of the tip and base sides of single PET nanochannels before growth of MOFs, scale bar 100 nm. Tip diameter of the nanochannels before modification is 33±6 nm, while base diameter of the nanochannel before modification is 239±20 nm.
Figure 24:
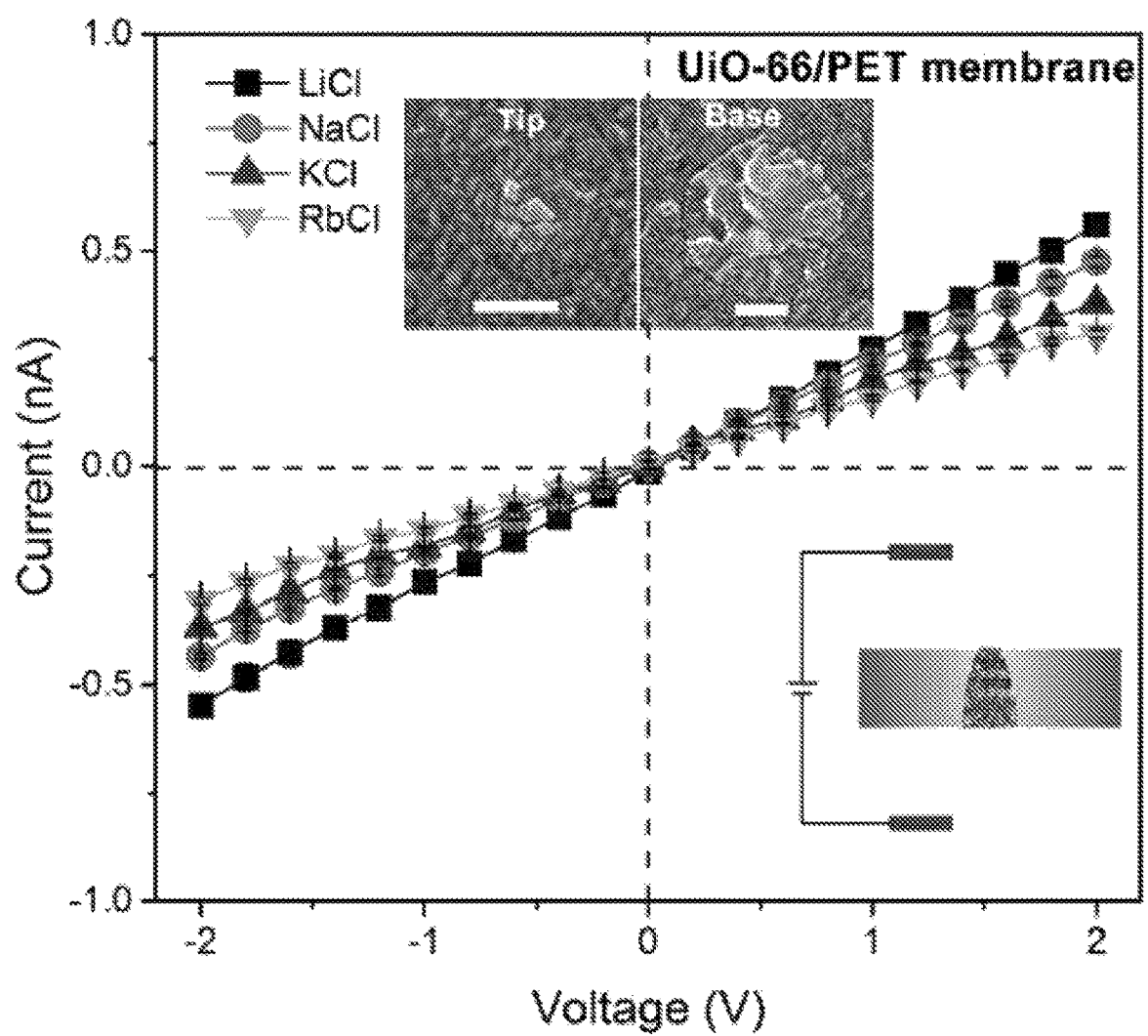
FIG. 24: I-V curves of a bullet-shaped single-nanochannel membrane after growth of UiO-66 in the presence of LiCl, NaCl, KCl, and RbCl (0.1 M MCl, pH 5.6). The insets are SEM images of the tip and base sides of single PET nanochannels after growth of MOFs, scale bar 100 nm. Tip diameter of the nanochannels before modification is 33±6 nm, while base diameter of the nanochannel before modification is 239±20 nm.

FIG. 23 provides I-V curves and SEM image of the original single nanochannel PET for LiCl, NaCl, and KCl. FIG. 24 provides I-V curves and SEM images of the single nanochannel ZIF-7/PET membrane. I-V curves are based on measurements taken in 0.1 M electrolyte solutions at pH 5.6. The insets are SEM images of the tip and base sides of single PET nanochannels before and after growth of ZIF-7; scale bar 100 nm. Tip diameter of the nanochannels before modification is 33±6 nm, while base diameter of the nanochannel before modification is 239±20 nm.

FIG. 25B, FIG. 25C, and FIG. 25D provide further characterisation data for the UiO-66/PET membranes. FIG. 25B is an XRD of UiO-66 powder fabricated under the same condition as the UiO-66/PET membrane. FIG. 25C is an $N_2$ adsorption-desorption isotherms of UiO-66 crystals. FIG. 25D shows the gas permeance and selectivity of the multichannel UiO-66/PET membrane with a channel density of $10^6$ $cm^{-2}$.

The selectivity ratios for the UiO-66/PET membrane for different $Li^+$/alkali metal ion pairs are provided in Table 8 below.

TABLE 8

Selectivity ratios for the UiO-66/PET membrane with a membrane thickness of 12000 nm and a pore diameter of 6 Å.

| Sample | $Li^+/Na^+$ | $Li^+/K^+$ | $Li^+/Rb^+$ | $Na^+/K^+$ |
|---|---|---|---|---|
| 1 | 1.176 ± 0.012 | 1.474 ± 0.033 | 1.825 ± 0.013 | 1.253 ± 0.016 |
| 2 | 1.065 ± 0.008 | 1.514 ± 0.001 | 1.664 ± 0.010 | 1.421 ± 0.011 |
| 3 | 1.488 ± 0.005 | 1.760 ± 0.009 | 1.965 ± 0.011 | 1.183 ± 0.010 |
| Average | 1.24 ± 0.22 | 1.58 ± 0.15 | 1.82 ± 0.15 | 1.29 ± 0.12 |

Example 3

Materials

Zirconium (IV) chloride ($ZrCl_4$), terephthalic acid (BDC), 2-aminoterephthalic acid (BDC-$NH_2$), dimethylformamide (DMF), iodomethane ($CH_3I$), potassium fluoride (KF), potassium chloride (KCl), potassium bromide (KBr), potassium iodide (KI), and hydrochloric acid (HCl) were purchased from Sigma-Aldrich. Methanol, ethanol and sodium hydroxide (NaOH) were purchased from Merck. PET membranes were ordered from Hostaphan RN12 Hoechst.

Nanochannel Preparation

PET membranes (12 μm thick, with single or multiple ion tracks in the center) were etched from one side with (6 M NaOH+0.025% sodium dodecyl diphenyloxide disulfonate) and the other side with 6 M NaOH etching solution at 60° C. at the same time to produce single or multiple bullet-shaped nanochannels. A picoammeter was employed to observe the current changing of single-nanochannel membrane during the etching process. The etching process was terminated by adding a mixture of 1 M KCl and 1 M HCOOH aqueous solution which can neutralize the alkaline etching solution. The morphologies and diameters of the nanochannels were observed by SEM using the multichannel membranes prepared with the same etching conditions as single channel membranes.

Modification of Single Nanochannel with UiO-66-X MOFs $ZrCl_4$ (150 mg) and BDC (106 mg) or BDC-$NH_2$ (120 mg) in DMF (25 mL) were ultrasonically dissolved in a glass bottle. The obtained clear solution was transferred into a Teflon-lined stainless steel autoclave, in which the PET membrane with a single nanochannel was placed vertically with a holder. Subsequently, the autoclave was placed in an oven and heated at 100° C. for 24 h. After cooling down to room temperature, the as-prepared nanochannel membrane was washed with ethanol three times, followed by drying in a vacuum oven at 25° C. overnight. Finally the resulting single membrane was immersed into $CH_3$ methanol solution for 48 h for the quaternization process, followed by washing with methanol three times and drying in a vacuum oven at 25° C. overnight.

Current Measurement

The current measurements were carried out with a Keithley 6487 picoammeter (Keithley Instruments, Cleverland), and the PET membrane with a single nanochannel was placed between two cells. Two platinum (Pt) electrodes were placed in both cells, respectively, and employed to apply a voltage across the nanochannel. The tip side of the nanochannel faced the anode, and the base side facing the cathode. A scanning voltage from −2 V to +2 V with a period of 20 s was determined four times. For measurements of the anion selective transport property of the nanochannel, different solutions including KF, KCl, KBr, KI, $KNO_3$, $K_2SO_4$ with a concentration of 0.1 M and a pH around 5.7 was added to both cells, respectively. The selectivity of $F^-$ over the other halogen ions ($Cl^-$, $Br^-$, $I^-$), $NO_3^-$ and $SO_4^{2-}$ was studied by recording the ionic current during potential scan when the anions transport through the nanochannel under potential driven.

Characteristics

Powder X-ray diffraction (PXRD): XRD patterns were recorded in the 2θ range of 2-50° at room temperature using a Miniflex 600 diffractometer (Rigaku, Japan) in transmission geometry using Cu Kα radiation (15 mA and 40 kV) at a scan rate of 2°/min and a step size of 0.02°.

Scanning electron microscopy (SEM): SEM images were taken with a field-emission scanning electron microscope (FEI Magellan 400 FEG SEM) operating at 5 kV, 13 pA.

X-ray photoelectron spectroscopy (XPS): XPS spectra was recorded using a Kratos Axis UltraDLD instrument (KratosLtd., Telford, UK) equipped with a monochromated Alkα (1486 eV) source operating at a power of 150 W (15 kV and 10 mA). The photoelectron take off angle with respect to the normal surface in all measurements was 0°.

Zeta Potential: Zeta potential of UiO-66 derivative crystals were measured and analysed through a Zeta Sizer (Nano Series).

Gas Adsorption and Desorption Measurement: For gas adsorption isotherms, high-purity grade (99.999%) nitrogen was used throughout the adsorption experiments. Prior to the gas adsorption measurement, UiO-66 derivative powders were activated at 140° C. for 48 h. Low pressure volumetric nitrogen adsorption isotherms up to 1 bar were measured using a micromeritics 3 Flex gas sorption analyzer. BET surface area and pore size were determined by measuring $N_2$ adsorption isotherms at 77 K in a liquid nitrogen bath and calculated using the Micromeritics software.

Ion Conductivity

Ion conductivity (K) of a nanochannel can be defined as:

$$\kappa = \frac{I}{U} \cdot \frac{L}{S} \qquad \text{Equation 3}$$

where I is the ionic current measured at the applied voltage U, S is the cross-sectional area of the nanochannel, and L is the length of the nanochannel. For MOF-modified membranes, S is the effective cross-sectional areas of MOF pores, which can be calculated from the pore volume of the MOF crystals.

For the bullet-shaped nanochannel, its radius profile r(x) can be described as:

$$r(x) = \frac{r_b - r_t\exp(-\frac{L}{h}) - (r_b - r_t)\exp(-\frac{x}{h})}{1 - \exp(-\frac{L}{h})} \quad \text{Equation 4}$$

where $r_b$ is the base radius, $r_t$ is the tip radius, L is the length of the nanochannel, and h is the length of the nanochannel. L/S of the bullet-shaped nanochannel is theoretically described as:

$$\frac{L}{S} = \int_0^L \frac{1}{\pi r^2(x)} dx = \int_0^L \frac{1}{\pi \left[\frac{r_b - r_t\exp(-\frac{L}{h}) - (r_b - r_t)\exp(-\frac{x}{h})}{1 - \exp(-\frac{L}{h})}\right]^2} dx \quad \text{Equation 5}$$

At high electrolyte concentration (i.e. 1.0 M) and pH close to the isoelectric point of the surface (3.8), at which the electrical double layer can be neglected and the specific ion conductivity in the nanochannel is equal to that in the bulk solution, $(L/S)_{NC}$ of the nanochannel can be calculated by:

$$\left(\frac{L}{S}\right)_{NC} = \kappa \cdot \frac{U}{I} \quad \text{Equation 6}$$

where k is the ion conductivity of the 1.0 M electrolyte in bulk solution, I is the ion current measured at the applied voltage U. For MOF-modified nanochannel membrane, $(L/S)_{MOF}$ is calculated by:

$$\left(\frac{L}{S}\right)_{MOF} = \left(\frac{L}{S}\right)_{NC} \cdot \frac{1}{v_{MOF} d_{calc}} \quad \text{Equation 7}$$

where $v_{MOF}$ is the pore volume of MOF crystal and $d_{calc}$ is the calculated crystal density. The values are provided in Table 9 below.

Figure 26:
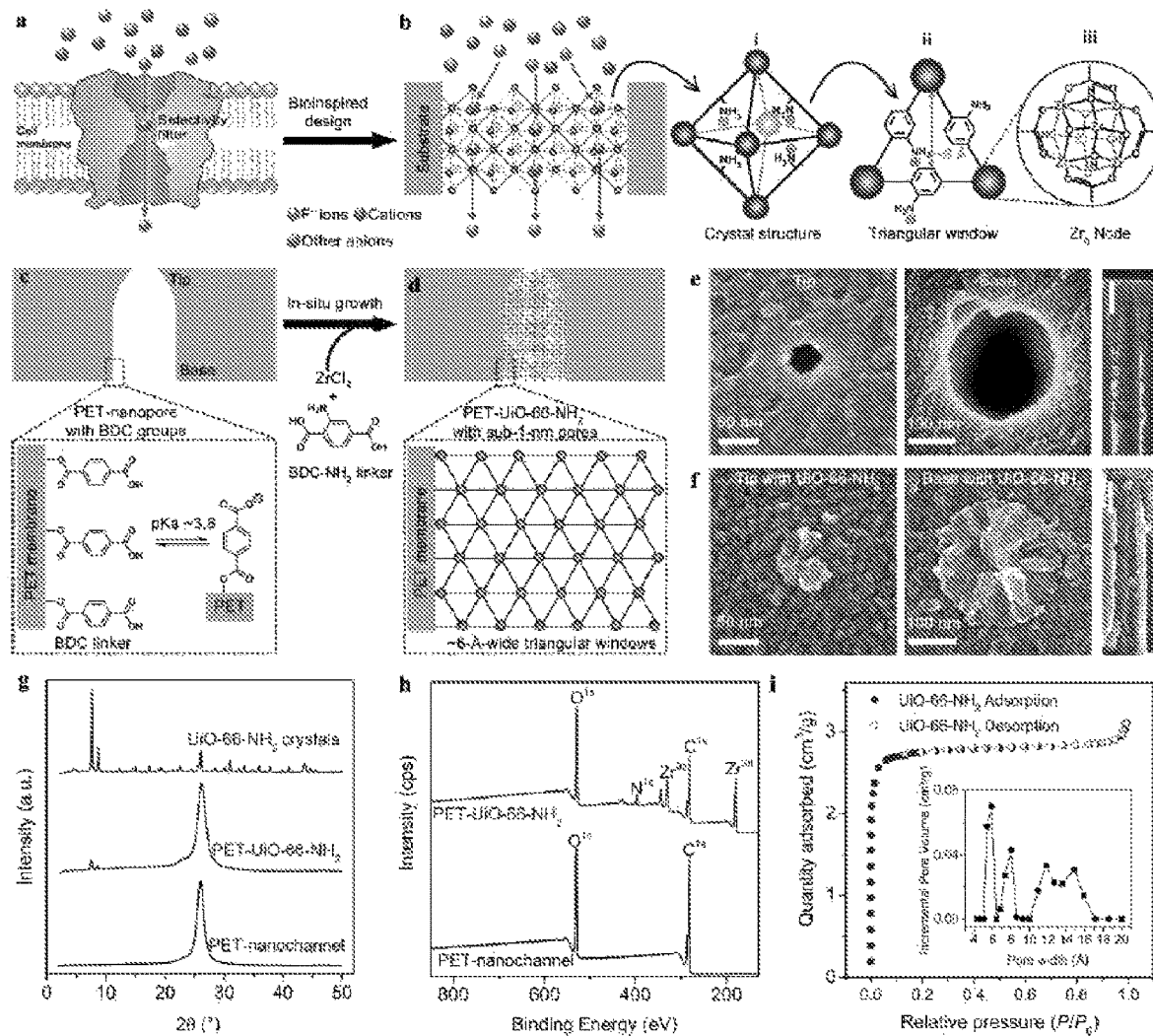
FIG. 26: Fabrication and characterization of PET-UiO-66-$NH_2$ membranes with sub-1-nm pores. (A) Schematic of a biological fluoride ion channel that has an angstrom-sized region as $F^-$ selective filter and nanometer-sized entrances and residues for ultrafast $F^-$ transport. (B) Schematics of a bioinspired artificial Zr-based UiO-66-$NH_2$ MOF membrane with sub-1-nm crystalline pores for ultrafast fluoride transport. Sub-1-nm MOF pores consist of (i) nanometer-sized tetrahedral cavities (μ11 Å in diameter) for ultrafast ion conduction and (ii) angstrom-sized triangular windows (~6 Å in diameter) for sieving of $F^-$ ions. (iii) Chemical structure of $Zr_6$ node. (C) Schematics of a 12-μm-thick PET membrane with single bullet-shaped nanochannel: the large opening side is called base, while the small opening side is called tip (up). The PET-nanochannel surface possesses BDC linkers for further in-situ growth of UiO-66-derived MOFs, such as UiO-66, UiO-66-$NH_2$, and UiO-66-$N^+(CH_3)_3$ (down). (D) Schematics of a PET-UiO-66-$NH_2$ membrane (up) and side view of UiO-66-$NH_2$ window structure (down). (E) SEM images of tip side, base side, and tip cross section of the bullet-shaped nanochannel. Average tip diameter is 36.3±5.6 nm, while average base diameter is 328.3±35.2 nm. (F) SEM image of tip side, base side, and tip cross section of the PET-UiO-66-$NH_2$ membrane. (G) XRD patterns of the PET-nanochannel membrane, PET-UiO-66-$NH_2$ membrane, and UiO-66-$NH_2$ crystal powders. (H) XPS of the PET-nanochannel and the PET-UiO-66-$NH_2$ membranes. (I) $N_2$ adsorption isotherms of UiO-66-$NH_2$. The inset is pore size distribution of UiO-66-$NH_2$.

12-μm-thick single-nanochannel PET membranes (FIG. 26C and FIG. 26D). Single bullet-shaped nanochannel embedded within a PET membrane was fabricated by a surfactant-protected ion-track-etching method (FIG. 26C). Here the bullet-shaped single-nanochannel PET membranes were prepared as supports to fabricate PET-MOF membranes because the asymmetric shape and the BDC-linkers on the PET-nanochannel surface were benefit to further in-situ growth of UiO-66-derived MOFs into the nanochannels (FIG. 26C). SEM images of the tip, base, and tip cross section of the PET-nanochannel membrane showed that the nanochannel is bullet-shaped (FIG. 26E). The mean diameter of the tip side is 36.3±5.6 nm, whereas the mean diameter of the base side is about 328.3±35.2 nm.

Figure 32:
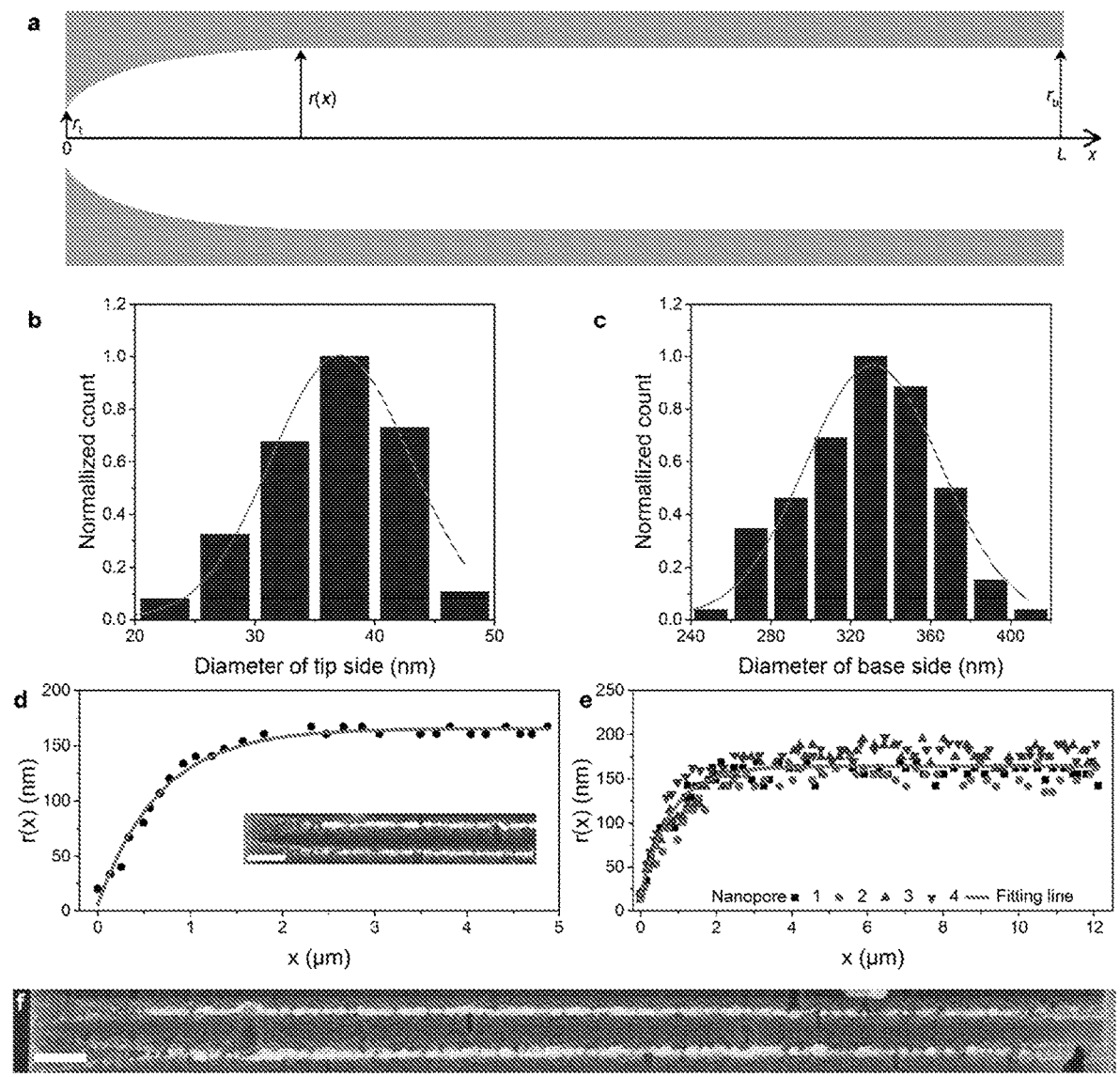
FIG. 32: (A) Schematic of whole cross section of the bullet-shaped nanochannel. (B) Distribution of the tip diameter with an average value of 36±6 nm. (C) Distribution of the base diameter with an average value of 328±35 nm. (D) Experimental (scatters) and theoretical (red line) tip radius profile of the nanochannel. The inset is the SEM image of a tip profile of one nanochannel, scale bar 500 nm. (E) Experimental (scatters, 1-4: four samples) and theoretical (red line) radius calculated from equation (2), r$_b$=164.13 nm, r$_t$=18.13 nm, h=800 nm and L=12 μm) radius profiles of the whole nanochannel. (F) SEM image of whole cross section of the bullet-shaped nanochannel, scale bar 500 nm.

FIG. 32 provides characterisation of the structure of single bullet-shaped nanochannels embedded within PET membranes. FIG. 32A is a schematic of a cross section of the bullet-shaped nanochannel. FIG. 32B shows distribution of the tip diameter with an average value of 36±6 nm. FIG. 32C shows distribution of the base diameter with an average value of 328±35 nm. FIG. 32D shows experimental (scatters) and theoretical (red line) tip radius profile of the nanochannel. The inset is the SEM image of a tip profile of one nanochannel, scale bar 500 nm. FIG. 32E reports experimental (scatters, 1-4: four samples) and theoretical (red line calculated from equation (2), $r_b$=164.13 nm, $r_t$=18.13 nm, h=800 nm and L=12 μm) radius profiles of the whole nanochannel. FIG. 32F is an SEM image of whole cross section of the bullet-shaped nanochannel, scale bar 500 nm.

Figure 33:
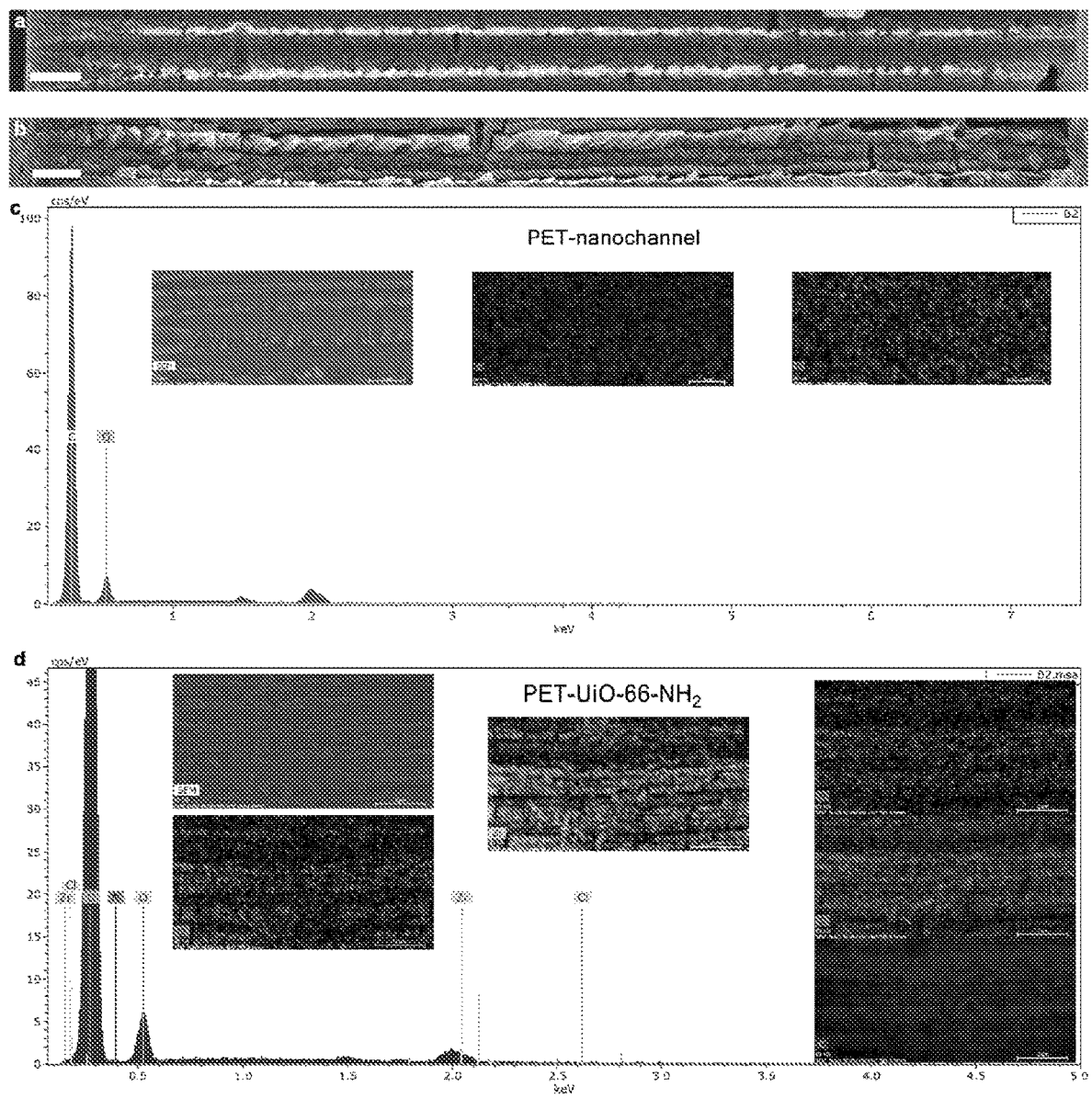
FIG. 33: (A) and (B) SEM images of the whole cross section of the bullet-shaped nanochannel before and after the in-situ growth of UiO-66-NH$_2$, scale bar 500 nm. (C) EDX of the PET-nanochannel membrane, the insets are cross-sectional images of the PET-nanochannel membrane for C and O mappings, scale bar 1 μm. (D) EDX of the PET-UiO-66-NH$_2$ membrane, the insets are cross-sectional images of the PET-UiO-66-NH$_2$ membrane for C, O, N, Zr, and Cl mappings, scale bar 2 μm.

After the in-situ growth of UiO-66-NH$_2$, the nanochannel was completely filled by UiO-66-NH$_2$ MOF crystals (FIG. 26D), which was well confirmed by SEM images of the tip, base and tip cross section of the PET-UiO-66-NH$_2$ membrane (FIG. 26F), as well as EDX mappings of PET-nanochannel membrane before and after growth of UiO-66-NH$_2$ (see FIG. 33).

FIG. 33 shows EDX mapping of the cross sections of PET-multi-nanochannel membrane (with a pore density of $10^8$ cm$^{-2}$) before and after the growth of UiO-66-NH$_2$. FIG. 33A and FIG. 33B are SEM images of the whole cross section of the bullet-shaped nanochannel before and after the in-situ growth of UiO-66-NH$_2$, scale bar 500 nm. FIG. 33C is an EDX of the PET-nanochannel membrane, the insets are cross-sectional images of the PET-nanochannel membrane for C and O mappings, scale bar 1 μm. FIG. 33D is an EDX of the PET-UiO-66-NH$_2$ membrane, the insets are cross-

TABLE 9

Crystallographic data of UiO-66-X (X = H, NH$_2$ and N$^+$(CH$_3$)$_3$)

| | Compound | | |
|---|---|---|---|
| | UiO-66(Zr) | UiO-66-NH$_2$ | UiO-66-N$^+$(CH$_3$)$_3$ |
| | | Formula | |
| | Zr$_6$O$_4$(OH)$_4$(CO$_2$—C$_6$H$_4$—CO$_2$)$_6$ | Zr$_6$O$_4$(OH)$_4$(CO$_2$—C$_6$H$_3$—CO$_2$—(NH$_2$))$_6$ | Zr$_6$O$_4$(OH)$_4$(CO$_2$—C$_6$H$_3$—CO$_2$—(N$^+$(CH$_3$)$_3$))$_6$ |
| Pore volume (cm$^3$ g$^{-1}$) | 0.52256 | 0.40263 | 0.35637 |
| Crystal density (g cm$^{-3}$) | 1.222 | 1.289 | 1.465 |

PET-UiO-66-NH$_2$ MOF Membranes with Sub-1-nm Pores

Defect-free PET-UiO-66-NH$_2$ membranes were firstly fabricated by in-situ growth of UiO-66-NH$_2$ crystals into sectional images of the PET-UiO-66-NH$_2$ membrane for C, O, N, Zr, and C mappings, scale bar 2 μm.

The XRD patterns and XPS spectrums of PET-nanochannel and PET-UiO-66-NH$_2$ membranes also confirmed the existence of UiO-66-NH$_2$ crystals (FIG. 26G and FIG. 26H). The N$_2$ sorption isotherm profiles of UiO-66-NH$_2$ revealed a Brunauer-Emmett-Teller (BET) surface area of 1071.9±12.4 m$^2$ g$^{-1}$, and the inset of pore size distribution profile exhibited a window size of ~6 Å in diameter (FIG. 26I).

Ultrahigh Fluoride Ion Conductivity in Sub-1-nm MOF Pores

Figure 34:
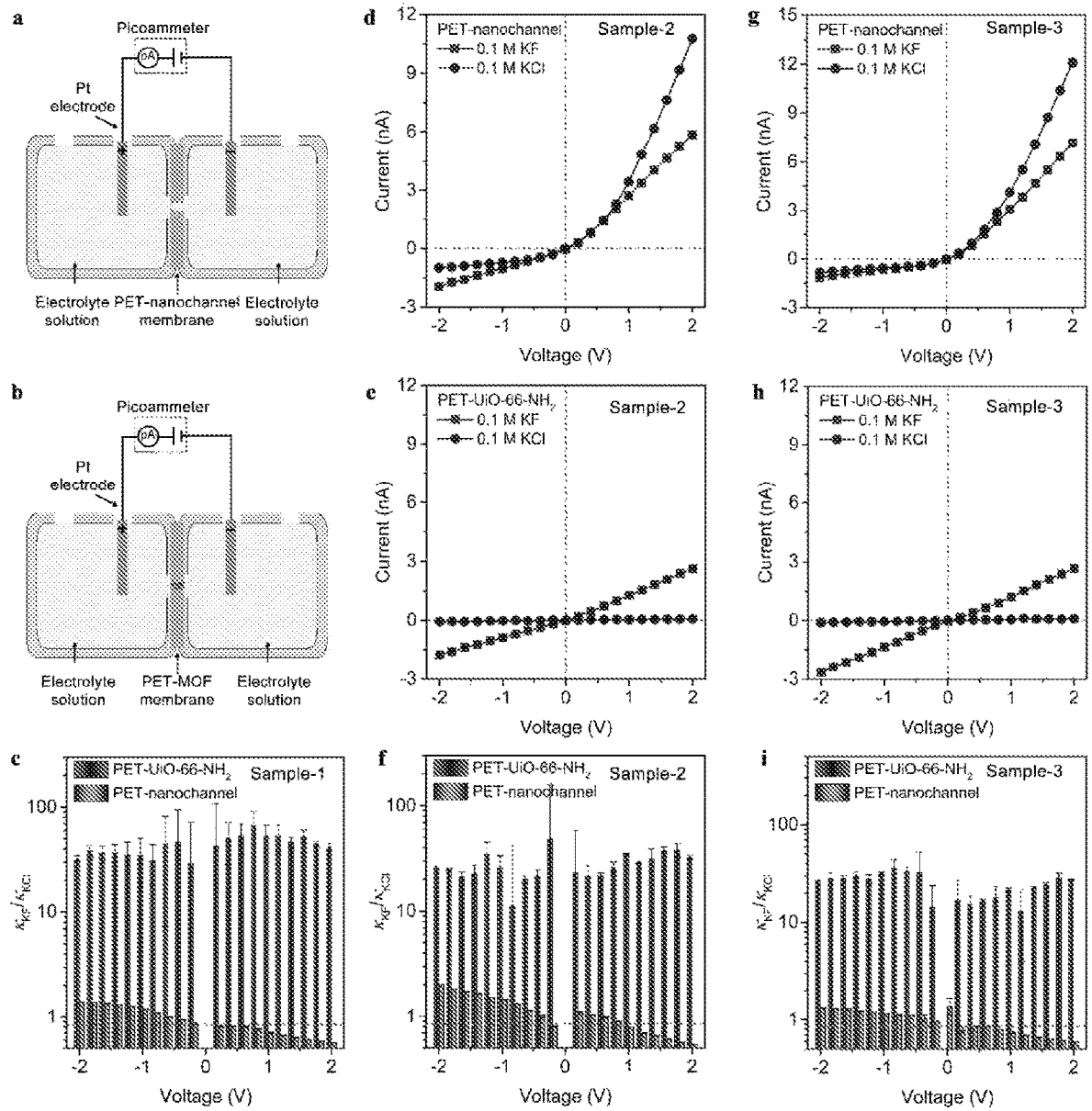
FIG. 34: (A) and (B) Experimental ion current measurement setups. (C) K$_{KF}$/K$_{KCl}$ ratios of the membrane (sample-1) before and after growth of UiO-66-NH$_2$. (D) to (F) I-V curves and K$_{KF}$/K$_{KCl}$ ratios of the membrane (sample-2) before and after growth of UiO-66-NH$_2$. (G) to (I) I-V curves and K$_{KF}$/K$_{KCl}$ ratios of the membrane (sample-3) before and after growth of UiO-66-NH$_2$.

To study fluoride ion conductivity of UiO-66-NH$_2$ MOF membranes, current-voltage (I-V) properties of PET-nanochannel membranes before and after growth of UiO-66-NH$_2$ were systematically measured in KF and KCl aqueous solutions. The testing set up, for experimental ion current measurement, is shown in FIG. 34A and FIG. 34B. FIG. 34C reports the K$_{KF}$/K$_{KCl}$ ratios of the membrane before and after growth of UiO-66-NH$_2$ for sample 1. FIG. 34D to FIG. 34F are I-V curves and K$_{KF}$/K$_{KCl}$ ratios of the membrane for sample 2 before and after growth of UiO-66-NH$_2$. FIG. 34G to FIG. 34I are I-V curves and K$_{KF}$/K$_{KCl}$ ratios of the membrane for sample 3 before and after growth of UiO-66-NH$_2$.

Figure 27:
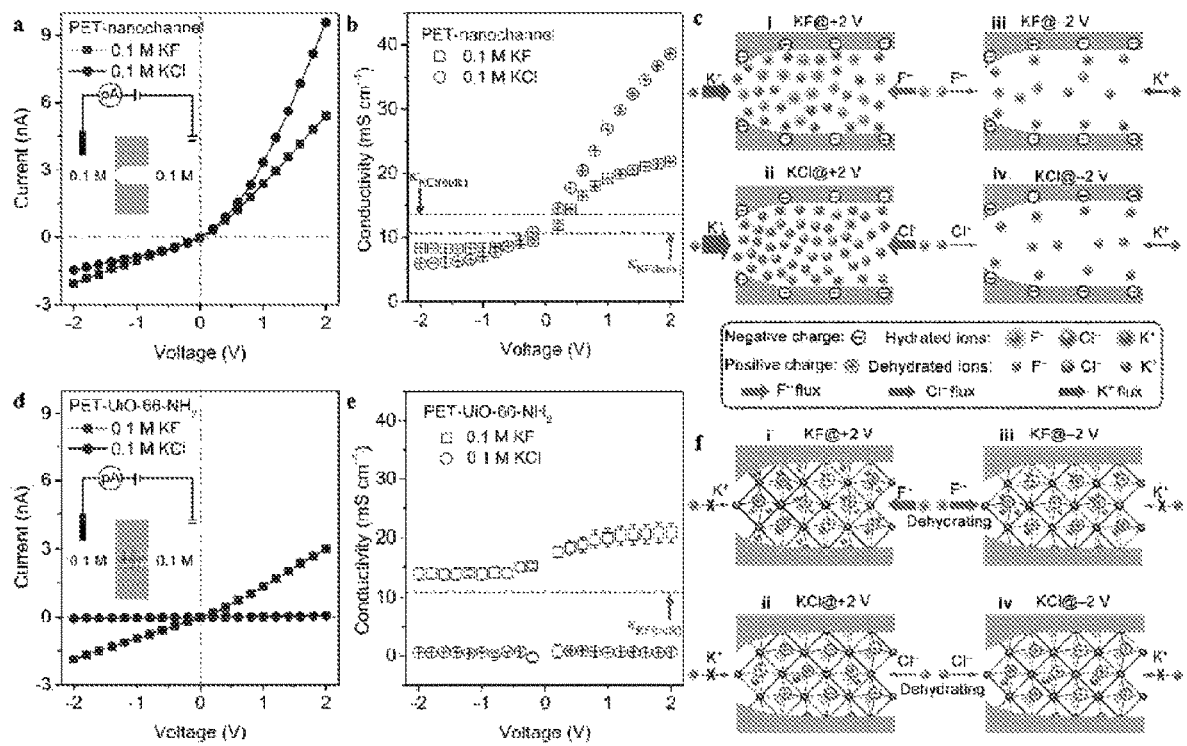
FIG. 27: Ionic transport in nanochannels and sub-1-nm MOF pores. (A) Asymmetric I-V curves of the bullet-shaped PET-nanochannel membrane observed in 0.1 M KF and KCl solutions (pH 5.7). (B) Specific KF and KCl conductivities in the nanochannel are higher than in bulk solutions at positive voltages but lower than in bulk solutions at negative voltages. (C) Schematic illustrations of hydrated ionic transport in the negatively charged nanochannel under different voltages: i, KF@+2V; ii, KCl@+2V; iii, KF@−2V; iv, KCl@−2V. Hydrated $F^-$ ions have larger ionic radius than hydrated $Cl^-$ ions, so hydrated $F^-$ ions transport slower than hydrated $Cl^-$ ions. Hydrated ions are accumulated into the nanochannel at positive voltages, resulting high ion conductivity. Whereas hydrated ions are depleted from the nanochannel at negative voltages (iii,iv), resulting low ion conductivities. (D) I-V curves of the PET-UiO-66-$NH_2$ membrane measured in 0.1 M KF and KCl solutions (pH 5.7). (E) KF conductivity in the MOF pores is voltage-dependent and much higher than KCl conductivity. (F) Schematic illustrations of dehydrated ions passing through the positively charged sub-1-nm UiO-66-$NH_2$ MOF pores under different voltages: i, KF@+2V; ii, KCl@+2V; iii, KF@−2V; iv, KCl@−2V. Ions are dehydrated in MOF pores because the window radius is smaller than the hydrated ionic radius. Dehydrated $F^-$ ions have smaller ionic radius than dehydrated $Cl^-$, so dehydrated $F^-$ ions transport faster than dehydrated $Cl^-$ in MOF pores. Besides, positively charged triangular windows function as specific $F^-$ selectivity filter to exclude other anions and cation.

For the pristine bullet-shaped PET-nanochannel membrane, asymmetric I-V curves of the nanochannel were observed in 0.1 M (pH 5.7) KCl and KF solutions, showing that the nanochannel could rectify ion currents (FIG. 27A). This rectifying behaviour is a signature of a negatively charged bullet-shaped nanochannel. The negative surface charges on the PET-nanochannel wall were induced by deprotonation of carboxylic groups at pH 5.7 (FIG. 26C). Since the two electrolyte solutions share the same cation (K$^+$), the differences of the ionic currents shown in FIG. 27A are mainly caused by the anions. Note that the ions are hydrated in water, and their hydrated ionic radii are in the order: F$^-$ (3.52 Å)>Cl$^-$ (3.32 Å)>K$^+$ (3.31 Å). As a result, conductivity of 0.1 M KF measured in bulk solution is 10.7 mS cm$^{-1}$, which is lower than 12.7 mS cm$^{-1}$ of 0.1 M KCl solution. In nanochannels, ions are also hydrated and both cation and anion can pass through the nanochannel because the pore radii are much larger than the hydrated ionic radii (FIG. 27C). Thus, conductivities of the electrolytes inside the nanochannels might be the same as those in the bulk solutions. However, conductivities of the electrolytes in the negatively charged bullet-shaped nanochannel (calculated by Equation 3) are higher than those of bulk solutions at positive voltages owing to the surface-charge-induced accumulation of hydrated ions in the nanochannel, while the conductivities are lower than those of bulk solutions at negative voltages due to the depletion26 of hydrated ions from the nanochannel (FIG. 27B and FIG. 27C). Besides, KF conductivity of the charged nanochannel is also lower than that of KCl under positive voltages and low negative voltages (0 to −0.6 V) because small hydrated Cl$^-$ ions are more easily to accumulate into the nanochannel than large hydrated F$^-$ ions (FIG. 27C-i,ii). Whereas KF conductivity is slightly higher than that of KCl under high negative voltages (−0.6 to −2.0 V) because small hydrated Cl$^-$ ions are more easily to deplete from the nanochannel than large hydrated F$^-$ ions (FIG. 27C-iii,iv). Therefore, the charged nanochannel exhibits limited anion selectivity of voltage-dependent conductivity ratios (K$_{KF}$/K$_{KCl}$) varying from 1.40 to 0.56 based on the differences in hydrated ionic radii compared with the constant K$_{KF}$/K$_{KCl}$ of 0.84 in water (see FIG. 34C).

Figure 35:
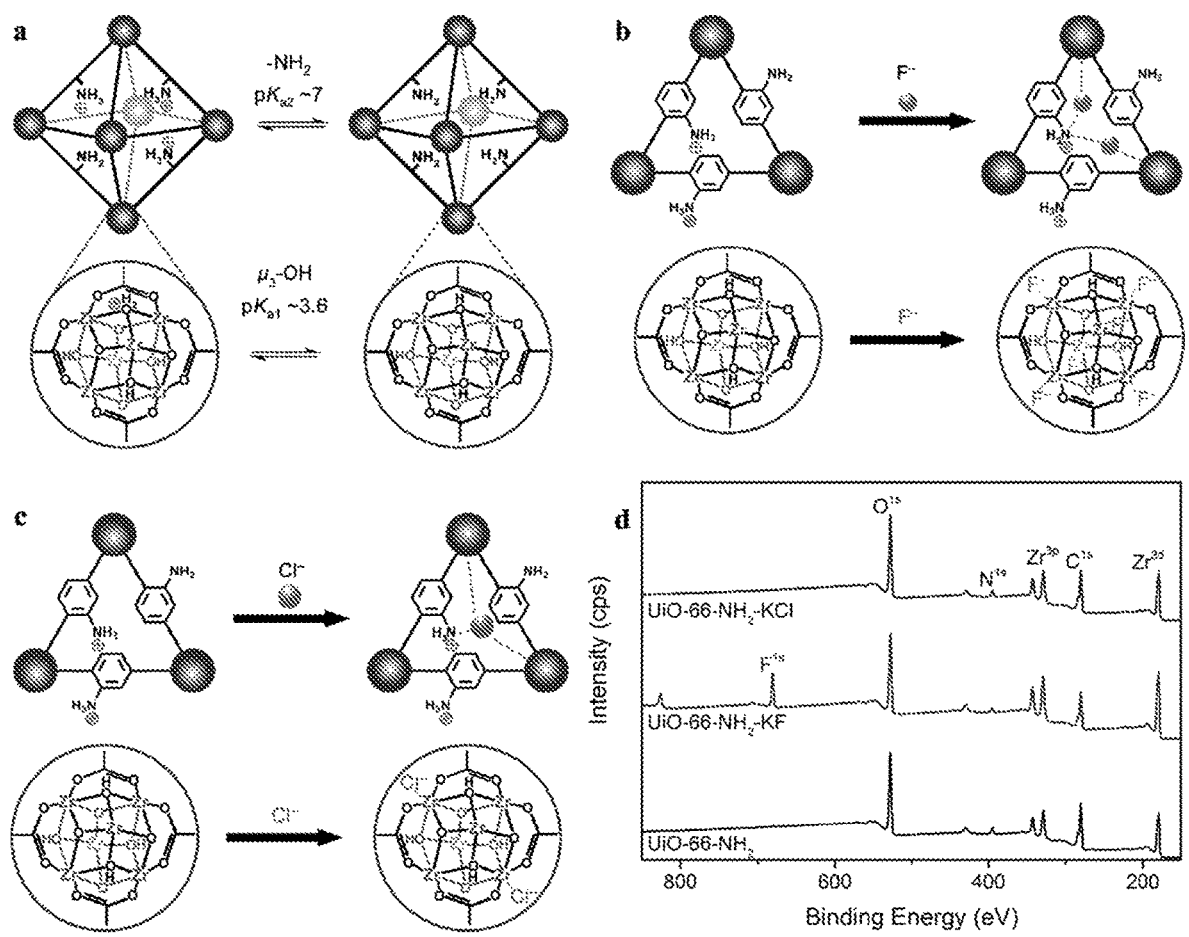
FIG. 35: Crystal structure and XPS of UiO-66-NH$_2$ before and after adsorption of F$^-$ and Cl$^-$. (A) pH responsive property of UiO-66-NH$_2$. pKa of the $_{\mu 3}$-OH group on the Zr-nodes is about 3.4, while pKa of the —NH$_2$ group on the ligand is about 7. (B) Specific interaction of F$^-$ with the Zr sites and electrostatic attraction of F$^-$ with the NH$_3^+$ groups. (C) Interaction of Cl$^-$ with the Zr sites and electrostatic attraction of Cl$^-$ with the NH$_3^+$ groups. (D) XPS results of the before and after adsorption of F$^-$ and Cl$^-$ (see Table 11 for element component).

After decoration with UiO-66-NH$_2$, however, I-V curves of the membrane became nearly symmetric (FIG. 27D). The KF conductivity in the MOF pore was much higher than that of KCl under the same positive/negative voltage (FIG. 27E), showing very high F$^-$ selectivity of voltage-dependent K$_{KF}$/K$_{KCl}$ ratios varying from ~31.2 to ~66.9 (see FIG. 34C to FIG. 34I). The sub-1-nm UiO-66-NH$_2$ MOF pores were positively charged due to protonation of the amino groups on the frameworks (FIG. 26B and FIG. 35 which illustrates crystal structure and XPS of UiO-66-NH$_2$ before and after adsorption of F$^-$ and Cl$^-$), which was confirmed by its zeta potential of 18.8±1.1 mV in water (see Table 10 below). As a result, the positively charged MOF pores can selectively transport anions but exclude cations (K$^+$ ions) (FIG. 27F). XPS results confirmed that no K$^+$ ion existed in KF and KCl treated UiO-66-NH$_2$ crystals (see Table 11 below). Moreover, since the pore windows of the UiO-66-NH$_2$ are proximately 3.0 Å in radius, ions should be dehydrated before permeating through the angstrom-sized widows (FIG. 27F). After dehydration, dehydrated ionic radii are: F$^-$ (1.36 Å)<K$^+$ (1.38 Å)<Cl$^-$ (1.81 Å), so the dehydrated F$^-$ ions transport faster than the dehydrated Cl$^-$ ions in MOF pores. Moreover, owing to the sufficiently open Zr sites on the Zr$_6$ nodes, the sub-1-nm MOF pores possess a specific F$^-$ adsorption property over Cl$^-$, which can contribute greatly to the ultrafast F$^-$ transport through the MOF pores (see FIG. 35B and FIG. 35C). The specific F$^-$ adsorption of UiO-66-NH$_2$ crystals over Cl$^-$ can be observed from the comparison of the XPS spectrum of the original crystals and crystals treated with KF and KCl solutions (See FIG. 35D). Therefore, the PET-UiO-66-NH$_2$ membranes exhibit ultrahigh F$^-$ selectivity over Cl$^-$ (see Table 12 below).

TABLE 10

Zeta potential of UiO-66 derivatives in H$_2$O at different pH and different anion solutions

| MOF | Zeta Potential (mV) | | | | | | |
| --- | --- | --- | --- | --- | --- | --- | --- |
| | KF | KCl | KBr | KI | H$_2$O pH = 5.7 | H$_2$O pH = 7.2 | H$_2$O pH = 9.2 |
| UiO-66 | −10.47 ± 0.39 | 3.71 ± 0.16 | 6.08 ± 0.84 | −2.06 ± 0.57 | 20.9 ± 1.81 | 29.6 ± 0.75 | −25.57 ± 0.25 |
| UiO-66-NH$_2$ | −11.47 ± 0.60 | 5.61 ± 1.20 | 7.75 ± 0.10 | −5.12 ± 0.50 | 7.14 ± 0.64 | 21.53 ± 2.67 | −30.57 ± 0.81 |
| UiO-66-N$^+$(CH$_3$)$_3$ | −19.67 ± 0.80 | 9.89 ± 1.00 | 9.76 ± 0.40 | −2.59 ± 0.30 | 19.43 ± 1.94 | 17.9 ± 1.39 | −21.3 ± 1.42 |

TABLE 11

XPS of UiO-66 derivatives crystals and after adsorption of different anions

| | Samples | | | | | | | | | | | |
|---|---|---|---|---|---|---|---|---|---|---|---|---|
| | UiO-66-NH$_2$ | | UiO-66-NH$_2$ + KF | | UiO-66-NH$_2$ + KCl | | UiO-66-NH$_2$ + KBr | | UiO-66-NH$_2$ + KI | | UiO-66-N$^+$(CH$_3$)$_3$I— | |
| Atomic % | Mean | Std | Mean | Std | Mean | Std | Mean | Std | Mean | Std | Mean | Std |
| F 1s | 0.00 | 0.00 | 9.82 | 0.09 | 0.00 | 0.00 | 0.00 | 0.00 | 0.00 | 0.00 | 0.00 | 0.00 |
| O 1s | 31.99 | 0.08 | 32.62 | 0.25 | 34.01 | 0.10 | 34.19 | 0.10 | 35.48 | 0.24 | 29.20 | 0.13 |
| N 1s | 4.07 | 0.02 | 2.96 | 0.18 | 3.90 | 0.19 | 3.97 | 0.11 | 3.90 | 0.15 | 4.00 | 0.24 |
| C 1s | 56.42 | 0.13 | 44.25 | 0.22 | 53.75 | 0.27 | 53.82 | 0.19 | 52.53 | 0.37 | 59.44 | 0.35 |
| Zr 3d | 6.63 | 0.04 | 10.03 | 0.04 | 7.51 | 0.01 | 7.46 | 0.18 | 7.37 | 0.06 | 5.30 | 0.01 |
| Br 3d | 0.00 | 0.00 | 0.00 | 0.00 | 0.00 | 0.00 | 0.00 | 0.00 | 0.00 | 0.00 | 0.00 | 0.00 |
| Cl 2s | 0.64 | 0.01 | 0.00 | 0.00 | 0.37 | 0.02 | 0.24 | 0.04 | 0.19 | 0.02 | 0.45 | 0.11 |
| Si 2p | 0.27 | 0.05 | 0.34 | 0.00 | 0.47 | 0.02 | 0.34 | 0.05 | 0.55 | 0.05 | 1.44 | 0.05 |
| I 3d | 0.00 | 0.00 | 0.00 | 0.00 | 0.00 | 0.00 | 0.00 | 0.00 | 0.00 | 0.00 | 0.19 | 0.02 |

TABLE 12

F$^-$ selectivity of reproduced PET-UiO-66-NH$_2$ membranes over other anions

| Sample | F$^-$/Cl$^-$ | F$^-$/Br$^-$ | F$^-$/I$^-$ | F$^-$/NO$_3^-$ | F$^-$/SO$_4^{2-}$ |
|---|---|---|---|---|---|
| 1 | 32.8 | 57.5 | 95.3 | 112.2 | 150.1 |
| 2 | 60.6 | 76.9 | 88.5 | 98.8 | 209.5 |
| 3 | 27.2 | 42.8 | 62.3 | 89.5 | 247.7 |
| Average | 40.2 ± 17.9 | 59.1 ± 17.1 | 82.0 ± 17.4 | 100.2 ± 11.4 | 202.4 ± 49.2 |

Dependence of F$^-$/Cl$^-$ Selectivity in MOF Pores on the pH and Concentration

Figure 28:
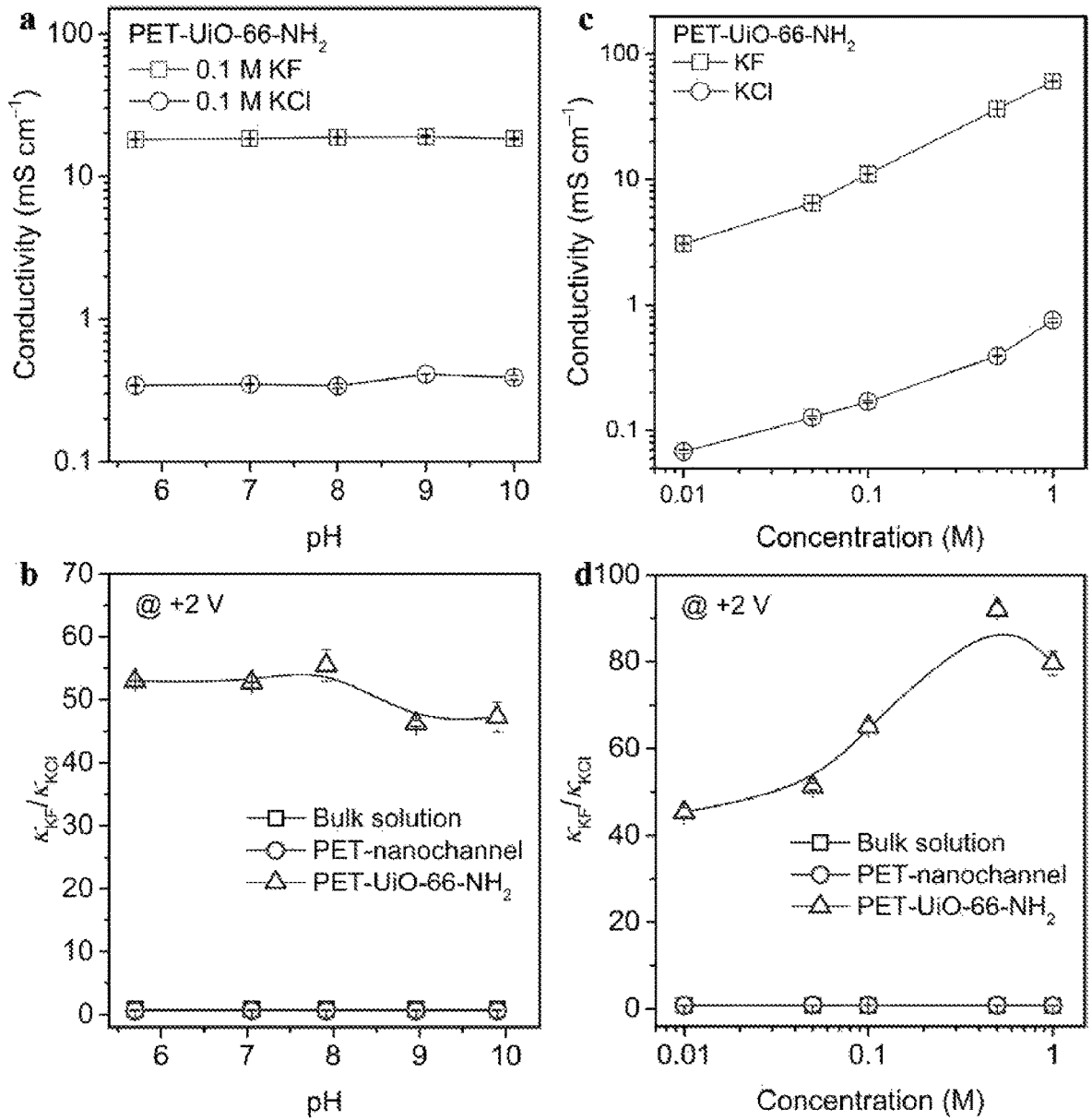
FIG. 28: Impacts of pH and concentration on F/Cl selectivity of UiO-66-$NH_2$ MOF pores at +2 V. (A) KF conductivity in bulk solution, PET-nanochannel and PET-UiO-66-$NH_2$. (B) KCl conductivity in bulk solution, PET-nanochannel and PET-UiO-66-$NH_2$ MOF pore. (C) Ratios of KF conductivity ($K_{KF}$) and KCl conductivity (KKl) measured in bulk solution, PET-nanochannel, and PET-UiO-66-$NH_2$ at +2 V.
Figure 36:
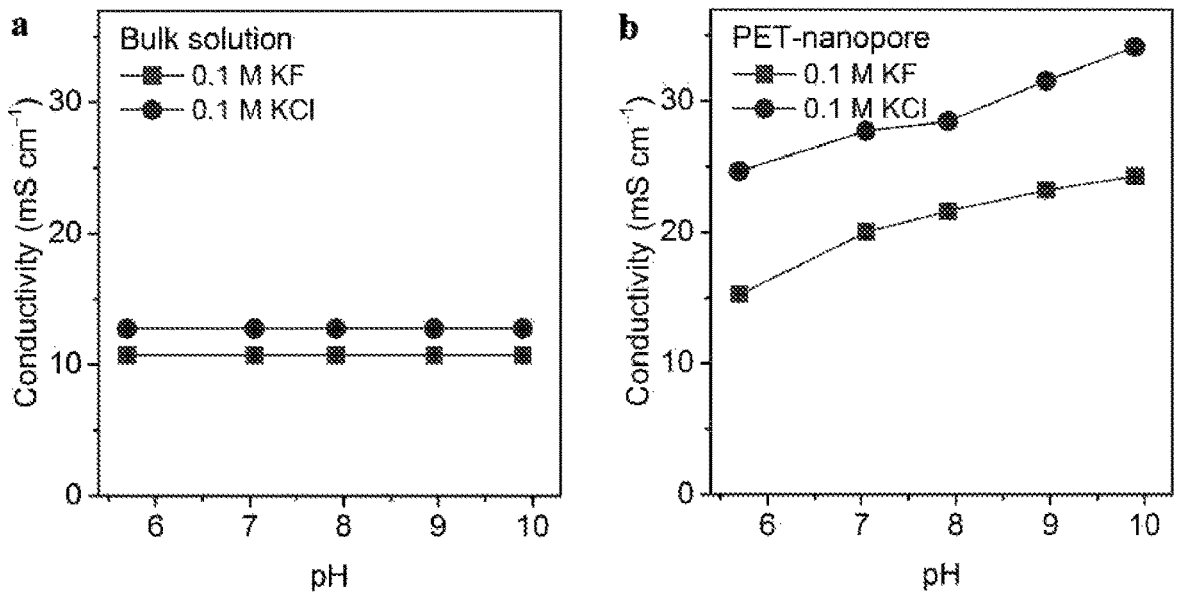
FIG. 36: pH responsive properties of the PET-nanochannel membrane. (A) Conductivities of 0.1M KF, KCl bulk solutions at different pH. (B) Conductivities of 0.1M KF, KCl solutions in PET-nanochannel at different pH.

Since carboxylate groups on the PET-nanochannel wall and amino groups on the MOF framework are pH responsive, we systematically studied conductivities of the PET-nanochannel and PET-UiO-66-NH$_2$ membranes in 0.1 M electrolyte solutions with pH values varied from 5.6 to 10. The results showing the pH responsive properties of the PET-nanochannel membrane are provided in FIG. 36A and FIG. 36B. In contrast with the nearly unchanged conductivities of bulk electrolyte solutions with different pH values (see FIG. 36A), ion conductivities of the PET-nanochannel membrane increase obviously with increasing the pH value of electrolyte solutions (see FIG. 36B). However, ion conductivities of the PET-UiO-66-NH$_2$ membrane is independent of pH value (FIG. 28A). The $K_{KF}/K_{KCl}$ ratios of the nanochannel remain quite similar to those in the bulk solution, which are all below 1; whereas the $K_{KF}/K_{KCl}$ ratios of PET-UiO-66-NH$_2$ membrane remain around 30 even when pH increases from 5.6 to 10 (FIG. 28B).

Figure 37:
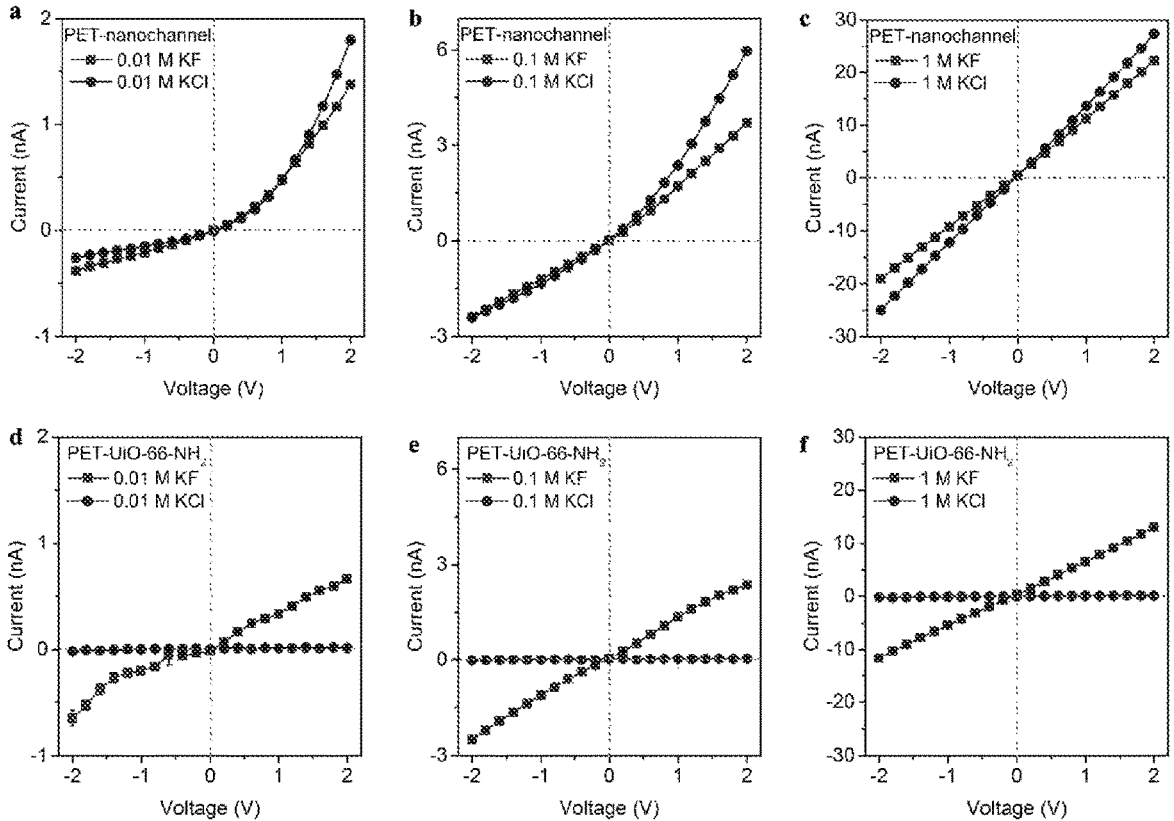
FIG. 37: I-V curves of a PET-nanochannel membrane before and after growth of UiO-66-NH$_2$ measured in different ion concentrations. (A) to (C) I-V curves of the PET-nanochannel membrane measured in 0.01 M, 0.1 M, and 1M, respectively. (D) to (F) I-V curves of the PET-UiO-66-NH$_2$ membrane measured in 0.01 M, 0.1 M, and 1M, respectively.
Figure 38:
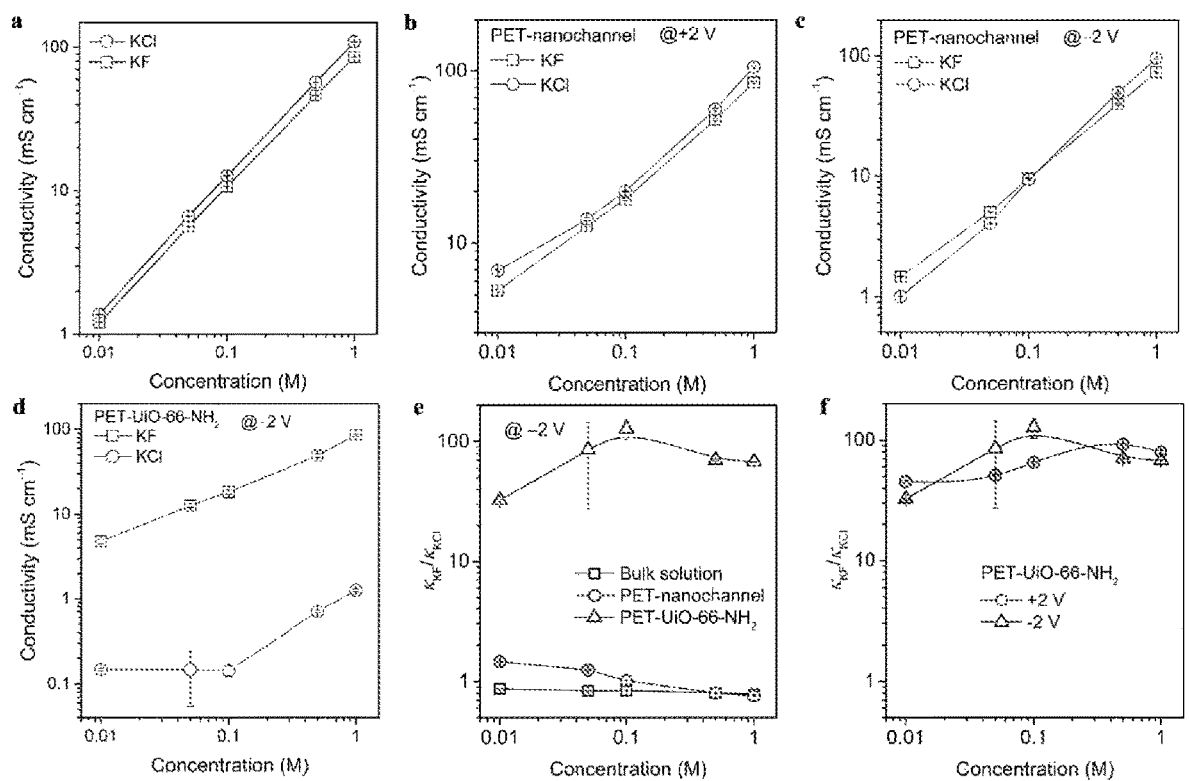
FIG. 38: Ion conductivities of a PET-nanochannel membrane before and after growth of UiO-66-NH$_2$ measured in different ion concentrations. (A) Conductivities increase linearly with the increasing of electrolyte solution concentration. (B) Conductivities in the PET-nanochannel membrane at +2 V are higher than those in the bulk solution at low concentrations but close to the values in the bulk solution at high concentration (1 M). (C) Conductivities in the PET-nanochannel membrane at −2 V are lower than those in the bulk solution at low concentrations but close to the values in the bulk solution at high concentration (1 M). (D) Conductivities in the PET-UiO-66-NH$_2$ membrane at −2 V are higher than those in the bulk solution at low concentrations but close to the values in the bulk solution at high concentration (1 M). (E) Ratios of KF conductivity (K$_{KF}$) and KCl conductivity (K$_{KCl}$) measured in bulk solution, PET-nanochannel, and PET-UiO-66-NH$_2$ at −2 V. (F) Comparison of the selectivity ratios of PET-UiO-66-NH$_2$ at +2 V and −2 V.

The dependence of ion conductivity on the ion concentrations was also studied by varying the concentrations of KF and KCl from 0.01 to 1.0 M (see FIG. 37 for I-V curves under different concentrations). In terms of the pristine nanochannel, the conductivity of chloride ions measured at +2V is slightly higher than that of fluoride ions at the same concentration (see FIG. 38A to FIG. 38F for Ion conductivities of a PET-nanochannel membrane before and after growth of UiO-66-NH$_2$ measured in different ion concentrations). As for the UiO-66-NH$_2$-modified nanochannel, the KF conductivity measured at +2V is much higher than KCl at the same concentration (FIG. 28C). Besides, KF conductivity increases prominently with the increasing of ion concentrations, while KCl conductivity varies indistinctively (FIG. 28C). The $K_{KF}/K_{KCl}$ ratios of the nanochannel measured at +2V remain quite similar to those in the bulk solution, which are all below 1; whereas the $K_{KF}/K_{KCl}$ ratios of the PET-UiO-66-NH$_2$ membrane increase from ~45.3 to ~92.1 with the concentrations increasing from 0.01 to 1.0 M (FIG. 28D).

Fluoride Selectivity of MOF Pores Over Other Anions

Figure 29:
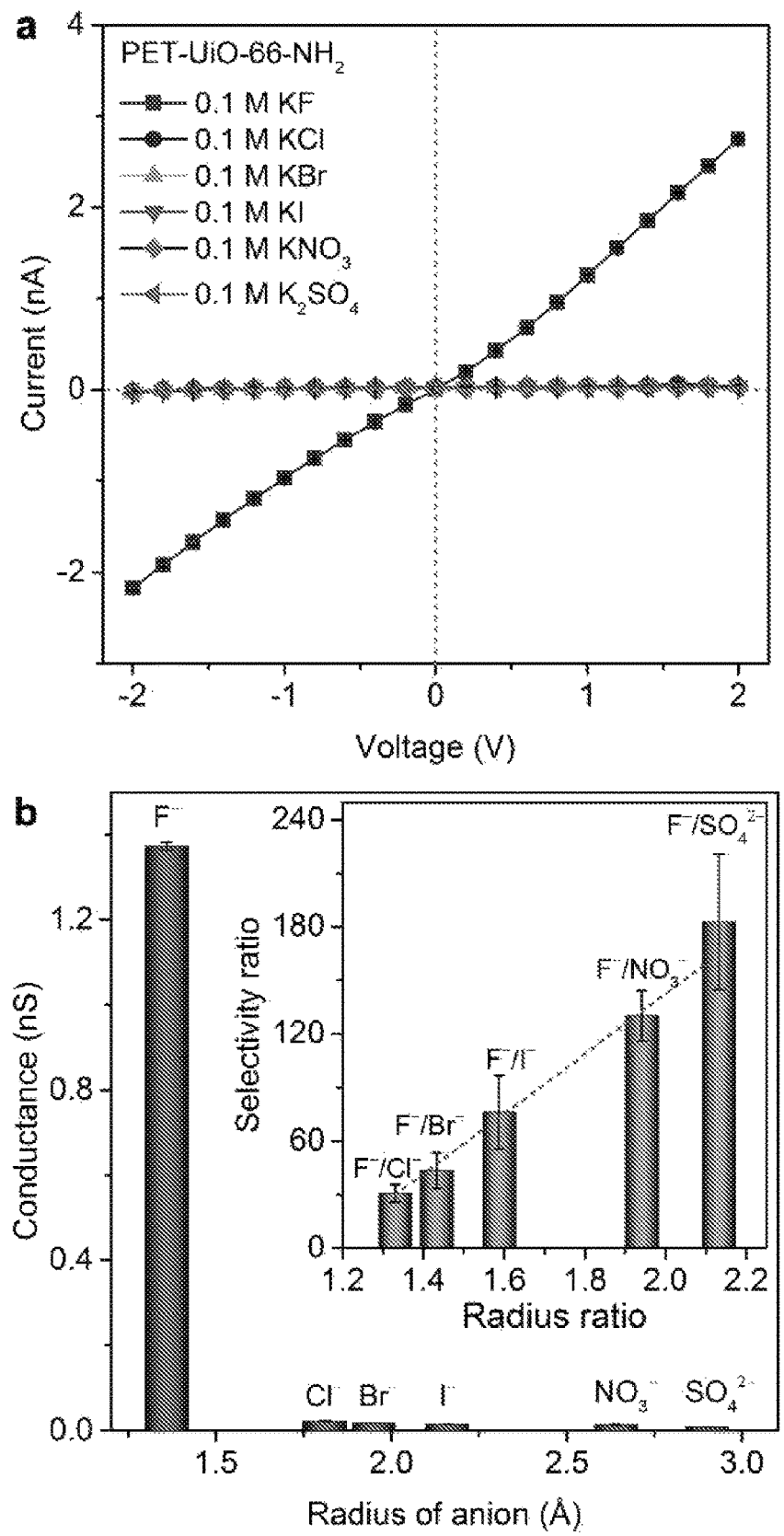
FIG. 29: $F^-$ selective properties of PET-UiO-66-$NH_2$ over other anions. (A) I-V curves of the PET-UiO-66-$NH_2$ membrane measured in different ionic solutions. (B) Ion conductance values of the PET-UiO-66-$NH_2$ decrease with increasing ionic radius of anions. The inset is the average ion selectivity ratio that is as a function of the radius ratio of anions.
Figure 39:
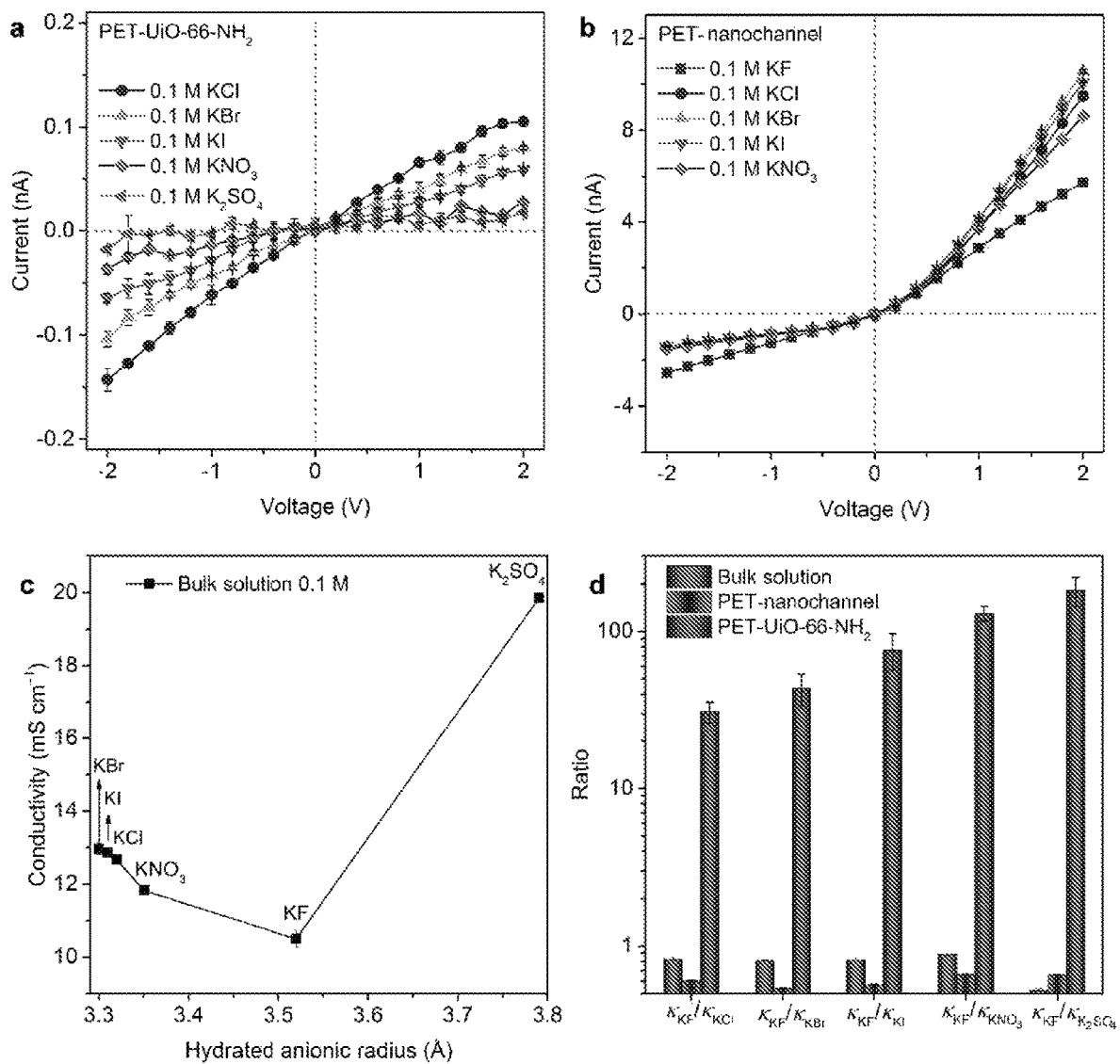
FIG. 39: Ion conductivities of the bulk solution and a PET-nanochannel membrane before and after growth of UiO-66-NH$_2$ measured in different electrolyte solutions. (A) I-V curves of the PET-UiO-66-NH$_2$ membrane measured in 0.1 M KCl, KBr, KI, KNO$_3$ and K$_2$SO$_4$ solutions. (B) I-V curves of the PET-nanochannel membrane measured in 0.1 M electrolyte solutions, including KF, KCl, KBr, KI, and KNO$_3$. (C) Conductivities of the electrolytes measured in 0.1 M bulk solutions. (D) Ratios of the electrolyte conductivities measured in the bulk solution, the PET-nanochannel membrane, and the PET-UiO-66-NH$_2$ membrane.

The selectivity of the PET-UiO-66-NH$_2$ membrane for F$^-$ over other anions was investigated by measuring the ion currents of the membrane under different electrolyte solutions including KCl, KBr, KI, KNO$_3$, K$_2$SO$_4$ and KF (0.1 M, pH 5.7). At pH 5.7, the UiO-66-NH$_2$ framework is positively charged due to the zirconium sites and amino groups (FIG. 26B and FIG. 27F). As a result, anions with smaller radius pass through the UiO-66-NH$_2$ MOF pore faster, while the cations (K$^+$) are blocked. From the I-V curves of PET-UiO-66-NH$_2$ membrane, the ionic current of F$^-$ is much higher than that of the other anions, and the trend is in agreement with the order of unhydrated ionic radius: F$^-$ (1.36 Å)<Cl$^-$ (1.81 Å)<Br$^-$ (1.95 Å)<I$^-$ (2.16 Å)<NO$_3^-$ (2.64 Å)<SO$_4^{2-}$ (2.90 Å) (FIG. 29A and FIG. 39A). In the bulk solution and in the PET-nanochannel membrane, conductivities of the hydrated monovalent anions decrease with the increasing of hydrated anionic radius: Br$^-$ (3.30 Å)<I$^-$ (3.31 Å)<Cl$^-$ (3.32 Å)<NO$_3^-$ (3.35 Å)<F$^-$ (3.52 Å), while the divalent anion SO$_4^{2-}$ (hydrated ionic radius of 3.79 Å) exhibit a higher conductivity than other hydrated monovalent anions (FIG. 39B and FIG. 39C). In the PET-UiO-66-NH$_2$ membrane, however, conductivities of different anions decrease with the increasing of dehydrated anionic radius, and F$^-$ ions transport much faster than the other anions (FIG. 29B). The average anion selectivity ratio increased linearly from F$^-$/Cl$^-$ of 30.7±4.8 to F$^-$/SO$_4^{2-}$ of 182.6±37.8 as the dehydrated ionic radii increased (FIG. 29B inset; see Table 12), which is much higher than that measured in the PET-nanochannel membrane and in the bulk solution (see FIG. 39D).

Effect of MOF Pore Size and Functional Groups on the F$^-$ Selectivity

Figure 30:
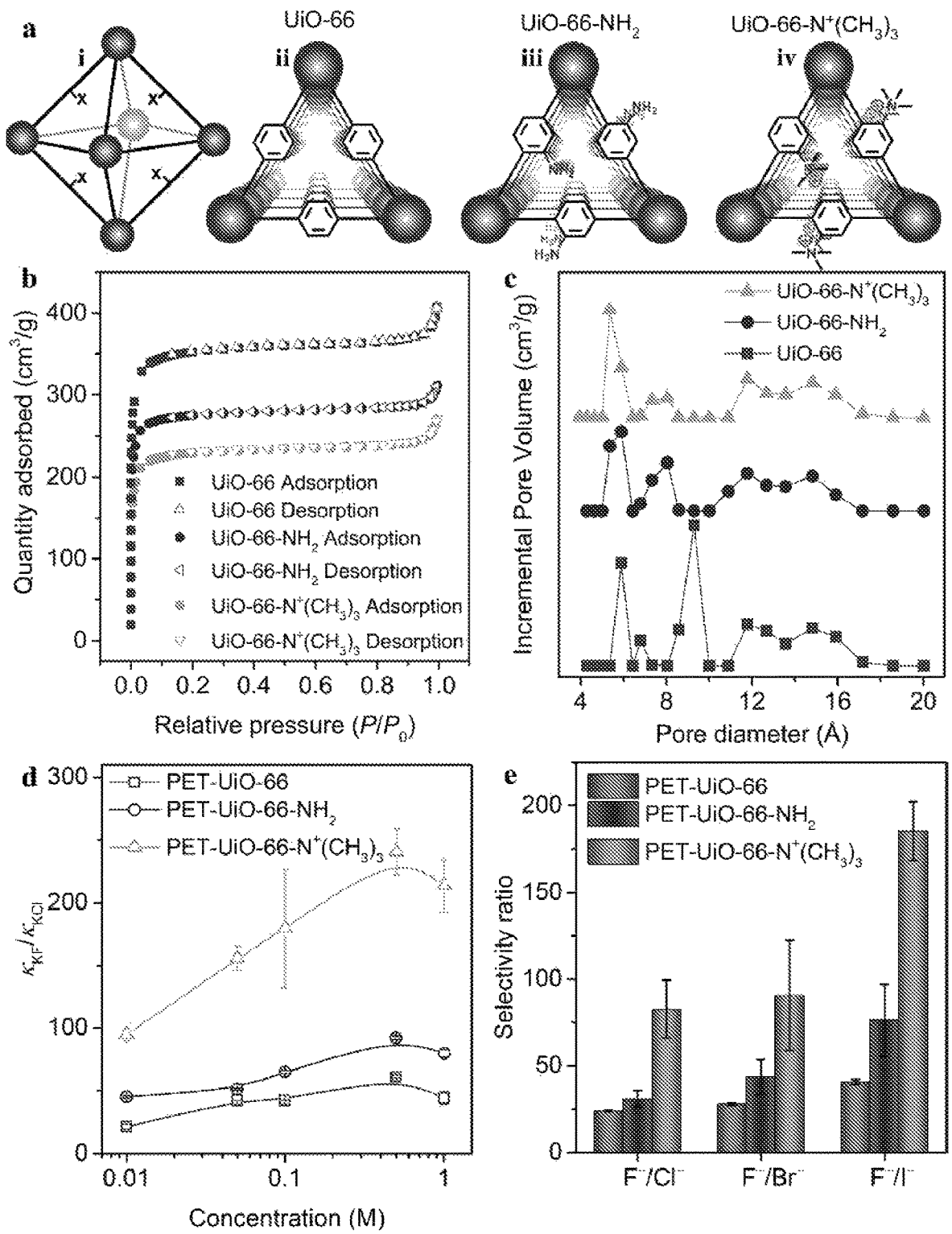
FIG. 30: Effect of the pore size on the ion selectivity. (A) Crystal structures (i) and window structures (ii-iv) of UiO- 66-derived MOFs (UiO-66-X; X=H, NH$_2$, and N$^+$(CH$_3$)$_3$) with different pore sizes and functional groups. (B) N$_2$ adsorption isotherms of UiO-66, UiO-66-NH$_2$ and UiO-66-N$^+$(CH$_3$)$_3$. (C) Pore size decreases with increasing of the volume of the functional group of the MOF. (D) Ratios of K$_{KF}$ and K$_{KCl}$ measured in PET-UiO-66-NH$_2$ and PET-UiO-66-N$^+$(CH$_3$)$_3$. (E) Anion selectivity ratios of UiO-66, UiO-66-NH$_2$ and UiO-66-N$^+$(CH$_3$)$_3$.
Figure 40:
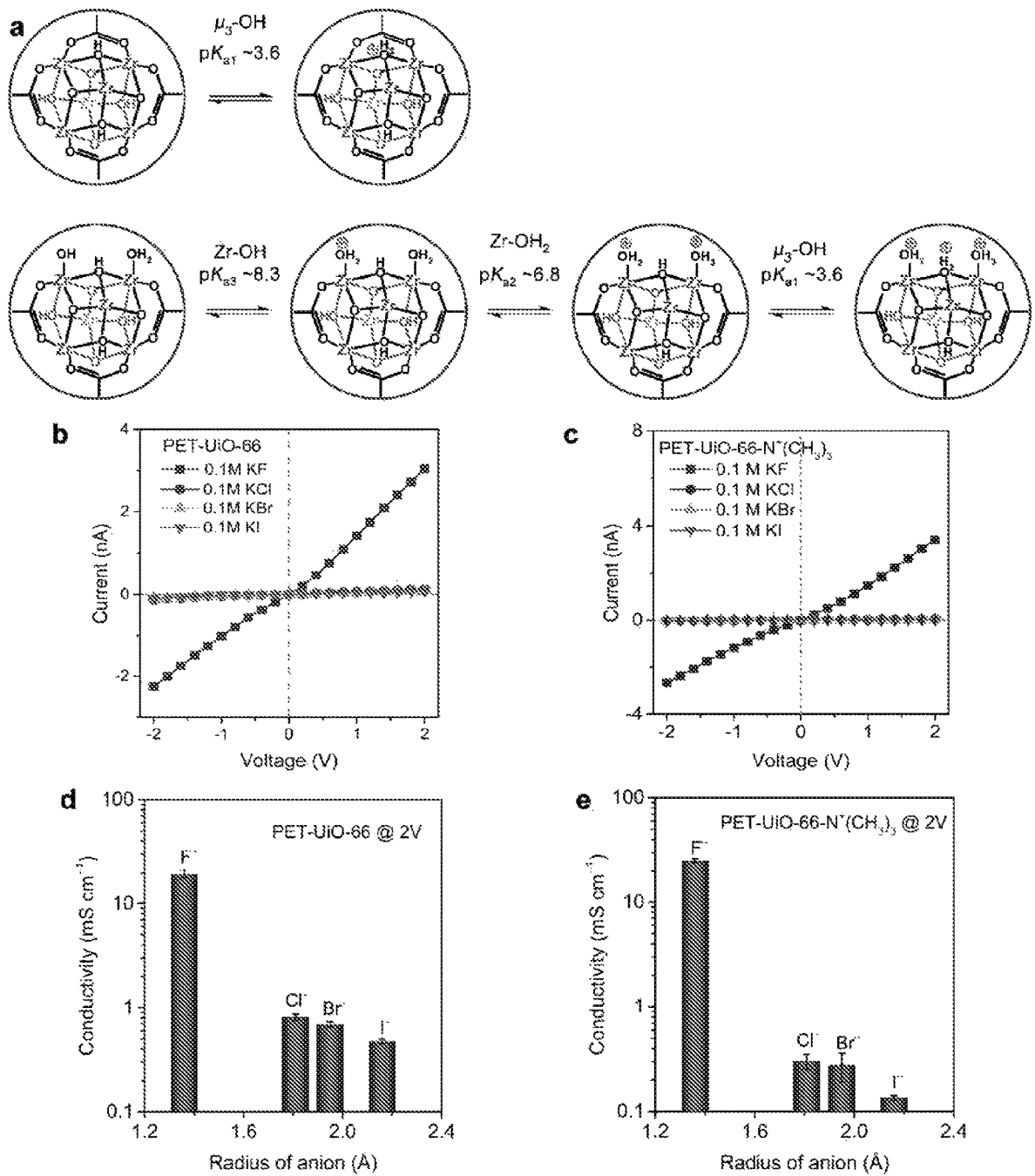
FIG. 40: Ion conductivities of a PET-UiO-66 membrane and PET-UiO-66-N$^+$(CH$_3$)$_3$ measured in different electrolyte solutions. (A) Schematics of pH-responsive properties of the Zr$_6$ nodes. (B) I-V curves of the PET-UiO-66 membrane measured in 0.1 M KCl, KBr, KI and KF solutions. (C) I-V curves of the PET-UiO-66-N$^+$(CH$_3$)$_3$ membrane measured in 0.1 M KCl, KBr, KI and KF solutions. (D) Conductivities of F$^-$, Cl$^-$, Br$^-$ and I$^-$ in the PET-UiO-66 membrane at 2 V. (E) Conductivities of F$^-$, Cl$^-$, Br$^-$ and I$^-$ in the UiO-66-N$^+$(CH$_3$)$_3$ membrane at 2 V.

Three PET-UiO-66-derived MOF (PET-UiO-66-X; X=H, NH$_2$, and N$^+$(CH$_3$)$_3$) membranes with different pore sizes and functional groups were investigated. The crystal structure and window structures of UiO-66, UiO-66-NH$_2$ and UiO-66-N$^+$(CH$_3$)$_3$ are displayed in FIG. 30A, and the UiO-66-N$^+$(CH$_3$)$_3$ was synthesized by quaternization of UiO-66-NH$_2$ with CH$_3$. The MOFs including UiO-66 (SBET=1431.8±11.7 m$^2$ g$^{-1}$), UiO-66-NH$_2$ (SBET=1133.8±11.1 m$^2$ g$^{-1}$) and UiO-66-N$^+$(CH$_3$)$_3$ (SBET=947.6±13.6 m$^2$ g$^{-1}$) display a gradually decreasing pore size, indicated by the N$_2$ sorption isotherm profiles of UiO-66 derivatives (FIG. 30B), as well as the pore size distribution profiles (FIG. 30C). Zeta potentials of UiO-66, UiO-66-NH$_2$ and UiO-66-N$^+$(CH$_3$)$_3$ in neutral water are 22.7±1.1 mV, 18.8±1.1 mV, and 35.1±4.4 mV, respectively (see Table 10). UiO-66 is positively charged because the Zr—OH on the Zr$_6$ node tended to form Zr—OH$_2$$^+$ in aqueous solution when pH is below 8.3 (see FIG. 40A which provides schematics of pH-responsive properties of the Zr$_6$ nodes). The F$^-$/Cl$^-$ ratios for UiO-66, UiO-66-NH$_2$ and UiO-66-N$^+$(CH$_3$)$_3$ under different concentrations increase with the decreasing of pore size (FIG. 30D). Furthermore, the selectivity of F$^-$/Cl$^-$, F$^-$/Br$^-$, and F$^-$/I$^-$ increases with the decreasing of MOFs pore size (FIG. 30E), which can be explained by the size sieving effect, namely the smaller the aperture size, the less the anions such as Cl$^-$, Br$^-$ and I$^-$ permeate through the nanochannel (see FIG. 40B to FIG. 40E).

Cycle Performance and Stability

Figure 41:
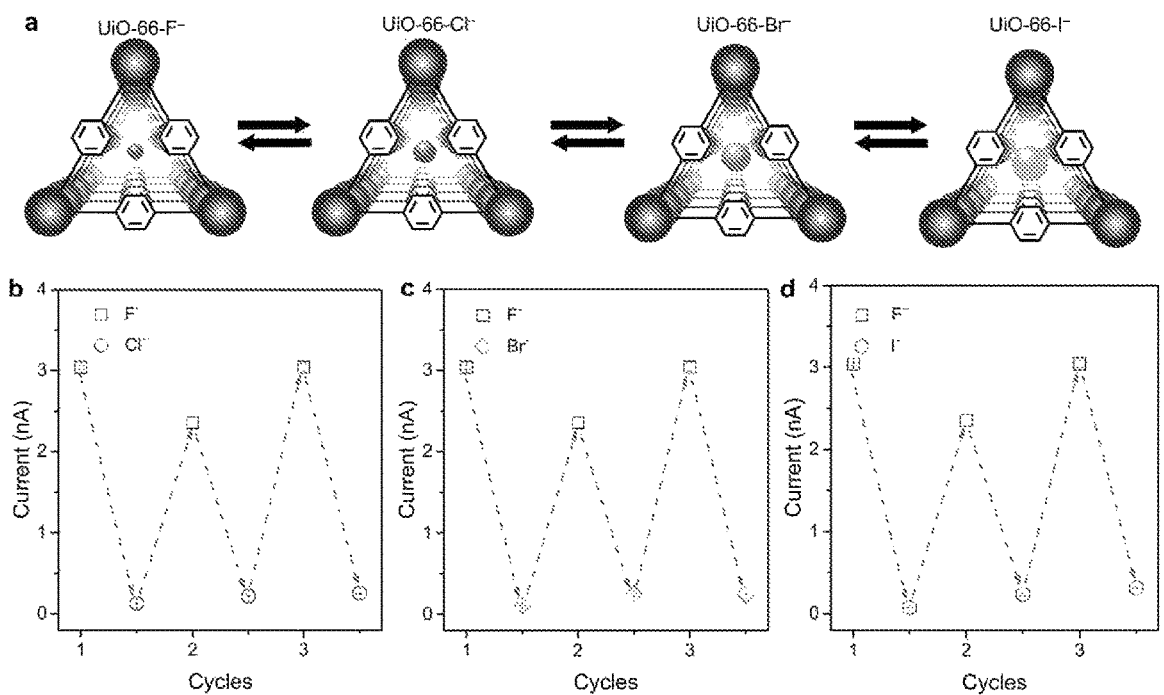
FIG. 41: Cyclic performance of the PET-UiO-66 membrane. (A) Schematics of different anions (F$^-$, Cl$^-$, Br$^-$ and I$^-$) exchange in the UiO-66 crystal pores. (B) Current values of F$^-$ and Cl$^-$ at 2V during 3 cycles test. (C) Current values of F$^-$ and Br$^-$ at 2V during 3 cycles test. (D) Current values of F$^-$ and I$^-$ at 2V during 3 cycles test. The PET-UiO-66 membrane was immersed in methanol for 3 days after each cycle test.
Figure 42:
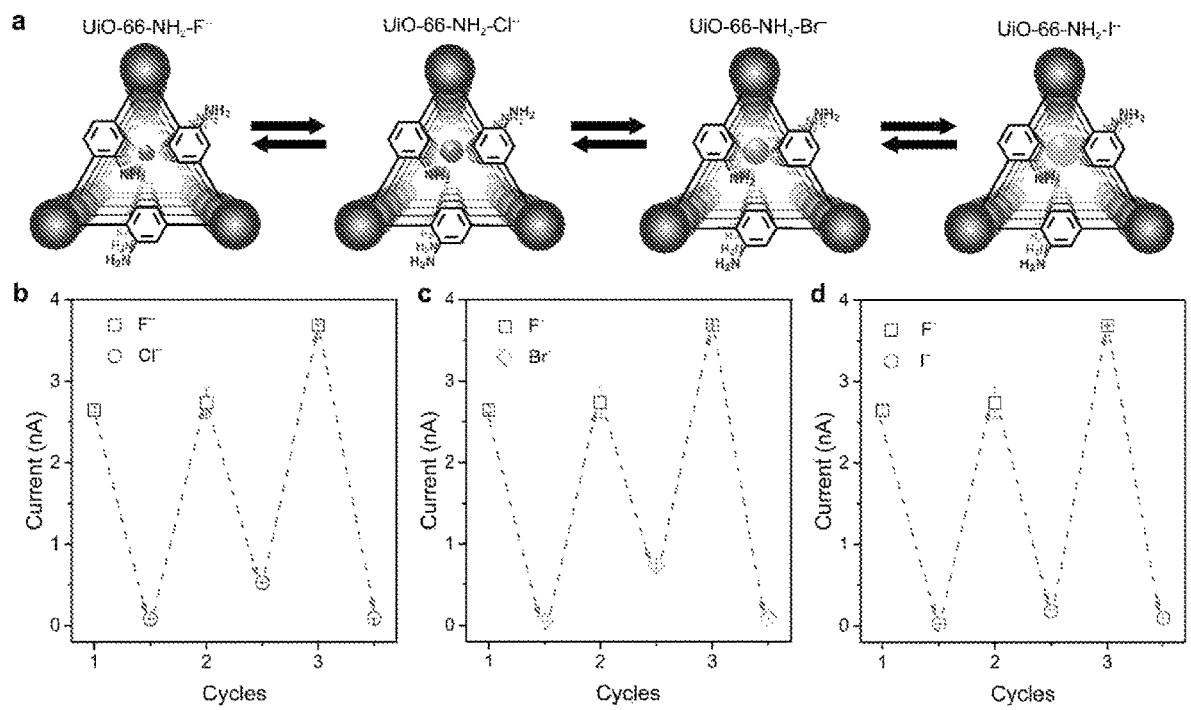
FIG. 42: Cyclic performance of the PET-UiO-66-NH$_2$ membrane. (A) Schematics of different anions (F$^-$, Cl$^-$, Br$^-$ and I$^-$) exchange in the UiO-66-NH$_2$ crystal pores. (B) Current values of F$^-$ and Cl$^-$ at 2V during 3 cycles test. (C) Current values of F$^-$ and Br$^-$ at 2V during 3 cycles test. (D) Current values of F$^-$ and I$^-$ at 2V during 3 cycles test. The PET-UiO-66-NH$_2$ membrane was immersed in methanol for 3 days after each cycle test.
Figure 43:
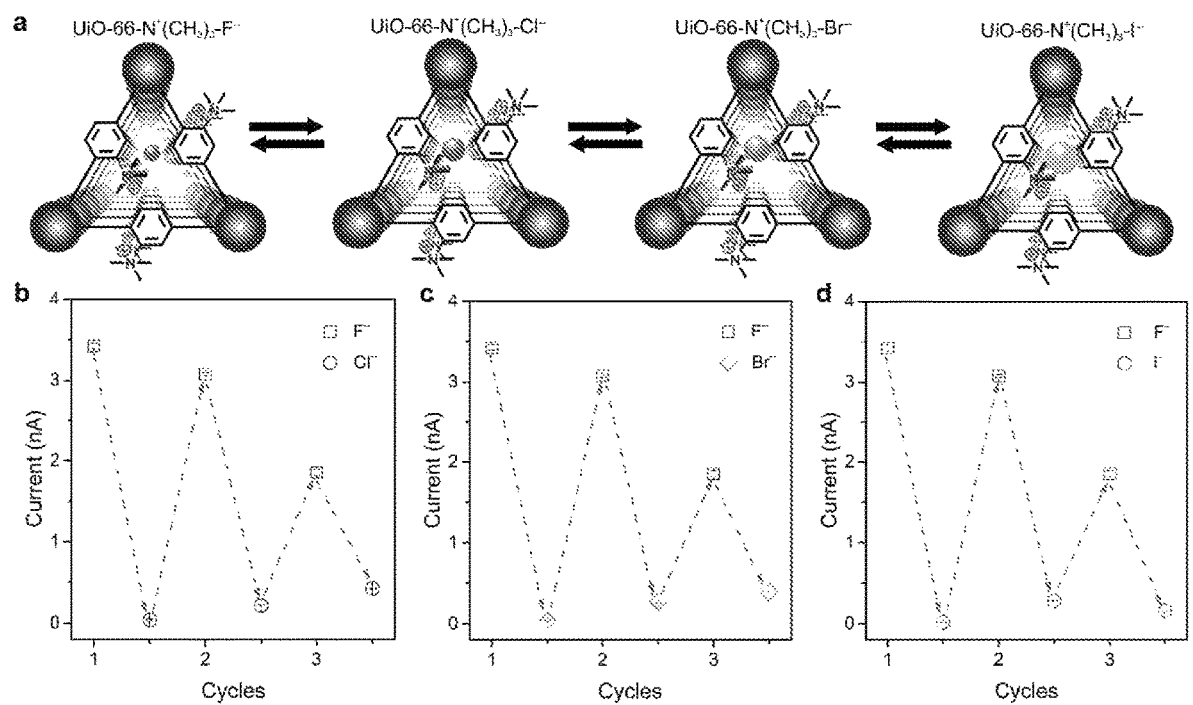
FIG. 43: Cyclic performance of the PET-UiO-66-N$^+$(CH$_3$)$_3$ membrane. (A) Schematics of different anions (F$^-$, Cl$^-$, Br$^-$ and I$^-$) exchange in the UiO-66-N$^+$(CH$_3$)$_3$ crystal pores. (B) Current values of F$^-$ and Cl$^-$ at 2V during 3 cycles test. (C) Current values of F$^-$ and Br$^-$ at 2V during 3 cycles test. (D) Current values of F$^-$ and I$^-$ at 2V during 3 cycles test. The PET-UiO-66-N$^+$(CH$_3$)$_3$ membrane was immersed in methanol for 3 days after each cycle test.
Figure 44:
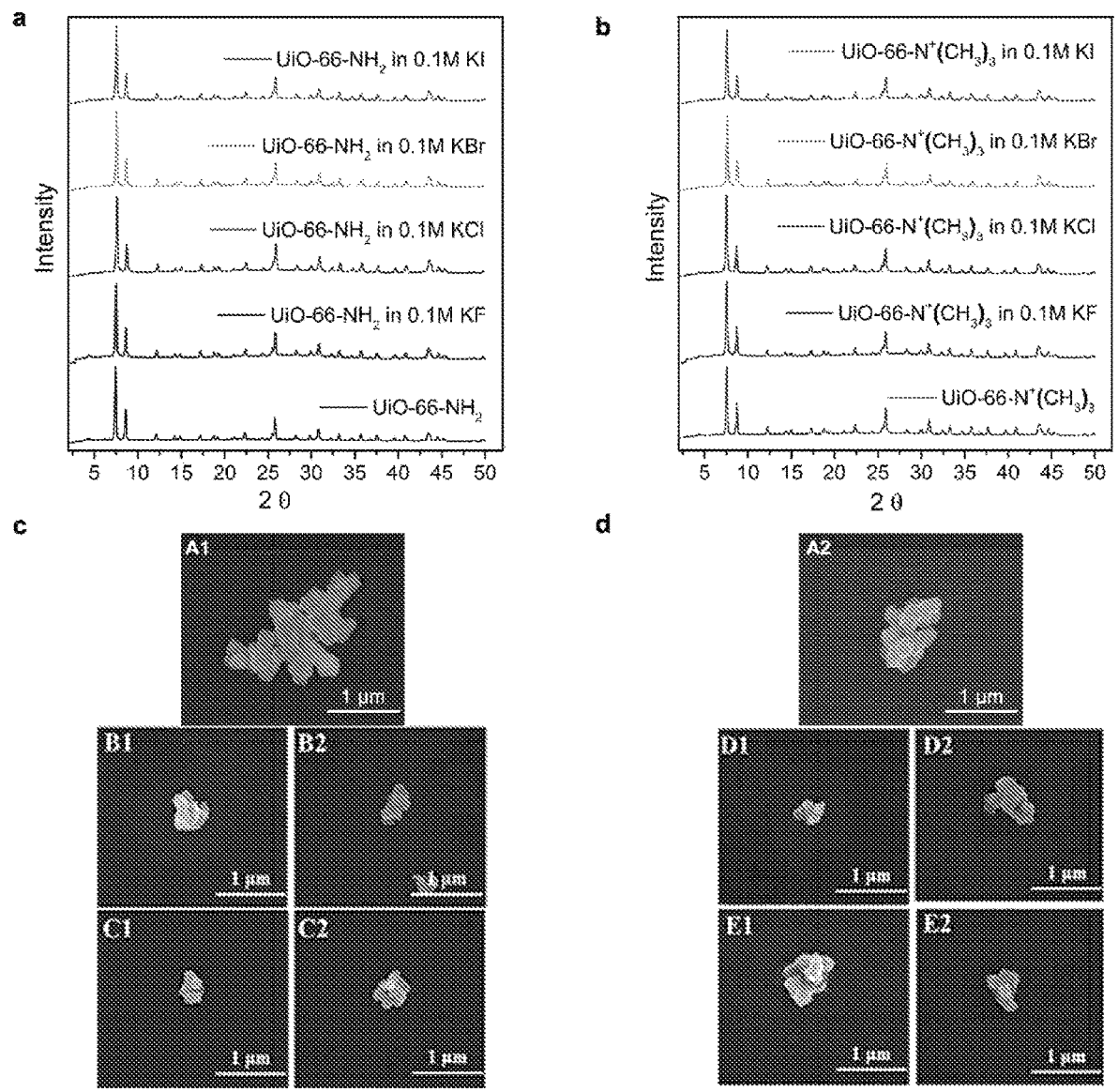
FIG. 44: Stability test of UiO-66-NH$_2$ and UiO-66-N$^+$(CH$_3$)$_3$ crystals. (A) XRD patterns of UiO-66-NH$_2$ before and after treatment in KF, KCl, KBr, KI (0.1M, pH=5.7) solutions for 3 days. (B) XRD patterns of UiO-66-N$^+$(CH$_3$)$_3$ before and after treatment in KF, KCl, KBr, KI (0.1M, pH=5.7) solutions for 3 days. (C) and (D) SEM images of UiO-66-NH$_2$ and UiO-66-N$^+$(CH$_3$)$_3$ crystals. (A1) UiO-66-NH$_2$ crystals in H$_2$O for 3 d, (B1) UiO-66-NH$_2$ crystals in 0.1 M KF (pH=5.7) for 3 d, (C1) UiO-66-NH$_2$ crystals in 0.1 M KCl (pH=5.7) for 3 d, (D1) UiO-66-NH$_2$ crystals in 0.1 M KBr (pH=5.7) for 3 d, (E1) UiO-66-NH$_2$ crystals in 0.1 M KI (pH=5.7) for 3 d, (A2) UiO-66-N$^+$(CH$_3$)$_3$ crystals in H$_2$O for 3 d, (B2) UiO-66-N$^+$(CH$_3$)$_3$ crystals in KF (pH=5.7) for 3 d, (C2) UiO-66-N$^+$(CH$_3$)$_3$ crystals in KCl (pH=5.7) for 3 d, (D2) UiO-66-N$^+$(CH$_3$)$_3$ crystals in KBr (pH=5.7) for 3 d, (E2) UiO-66-N$^+$(CH$_3$)$_3$ crystals in 0.1 M KI (pH=5.7) for 3 d.
Figure 45:
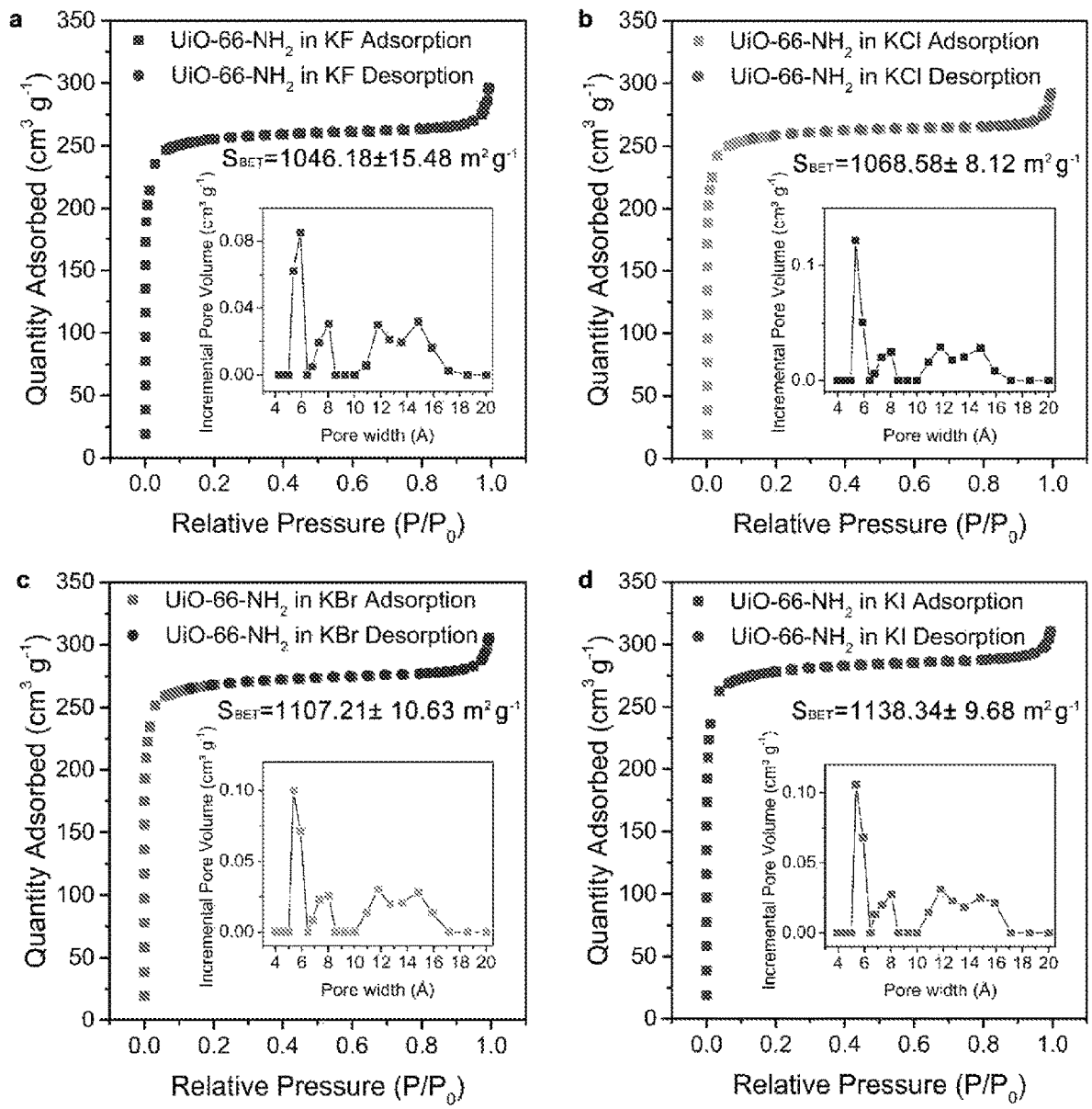
FIG. 45: Stability test of UiO-66-NH$_2$ crystals. (A) N$_2$ adsorption isotherms and pore size distribution of UiO-66-NH$_2$ after treatment in KF (0.1M, pH=5.7) for 3 days. (B) N$_2$ adsorption isotherms and pore size distribution of UiO-66-NH$_2$ after treatment in KCl (0.1M, pH=5.7) for 3 days. (C) N$_2$ adsorption isotherms and pore size distribution of UiO-66-NH$_2$ after treatment in KBr (0.1M, pH=5.7) for 3 days. (D) N$_2$ adsorption isotherms and pore size distribution of UiO-66-NH$_2$ after treatment in KI (0.1M, pH=5.7) for 3 days.

To confirm the stability of the PET-UiO-66-X membranes, ion current values were cyclically tested between KF, KCl, KBr and KI solutions (0.1 M, pH 5.7). After testing for at least three cycles, no obvious change in the current values at each testing state was observed in the PET-UiO-66 and PET-UiO-66-NH$_2$ membranes (see FIG. 41 and FIG. 42). But changes in ion currents were observed in the PET-UiO-66-N$^+$(CH$_3$)$_3$ membranes (see FIG. 43). This is because the interactions of F$^-$ on the UiO-66-N$^+$(CH$_3$)$_3$ frameworks are stronger than that of F$^-$ on the UiO-66 and UiO-66-NH$_2$. F$^-$ ions bound on the UiO-66-N$^+$(CH$_3$)$_3$ frameworks can enhance ion conductivity of the membrane when testing them in KCl, KBr and KI solutions. XRD patterns and SEM images of UiO-66-X crystals before and after treatment with KF, KCl, KBr and KI solutions for 3 days confirmed that the UiO-66-X MOFs are stable for further application in defluoridation (see FIG. 44). Moreover, the BET surface area and pore size distribution of UiO-66-X crystals show slightly changes before and after treatment with KF, KCl, KBr and KI solutions for 3 days (see FIG. 45).

Multichannel PET-UiO-66-N$^+$(CH$_3$)$_3$ Membranes for Water Defluoridation

Figure 31:
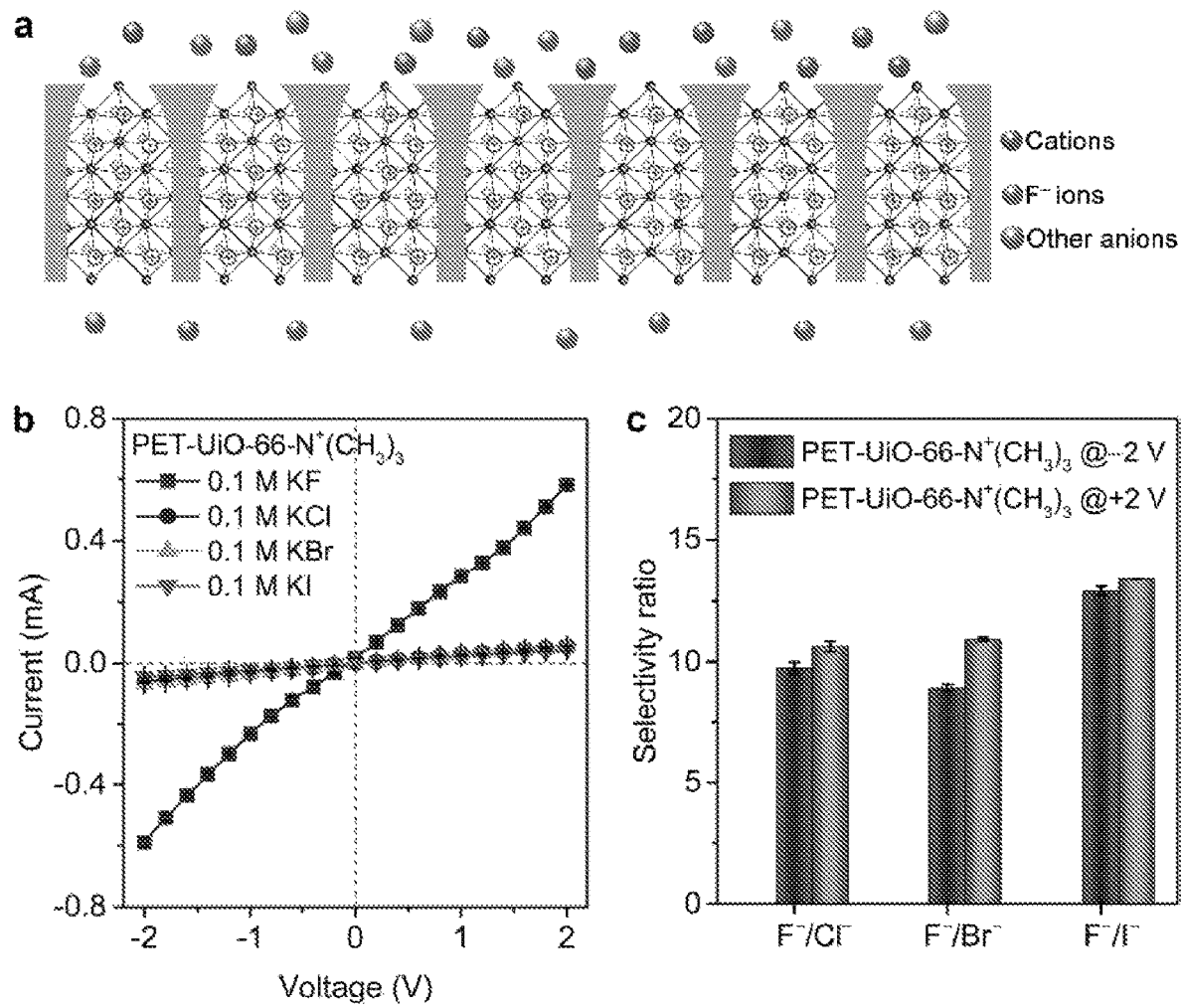
FIG. 31: Multichannel PET-UiO-66-N$^+$(CH$_3$)$_3$ membranes for water defluoridation. (A) schematic of multichannel PET-UiO-66-N$^+$(CH$_3$)$_3$ membrane (channel density of 10$^6$ cm$^{-2}$) for water deflouridation. (B) I-V curves of the membrane under different 0.1 M electrolyte solutions. (C) Selectivity ratios of the multichannel PET-UiO-66-N$^+$(CH$_3$)$_3$ membrane.
Figure 46:
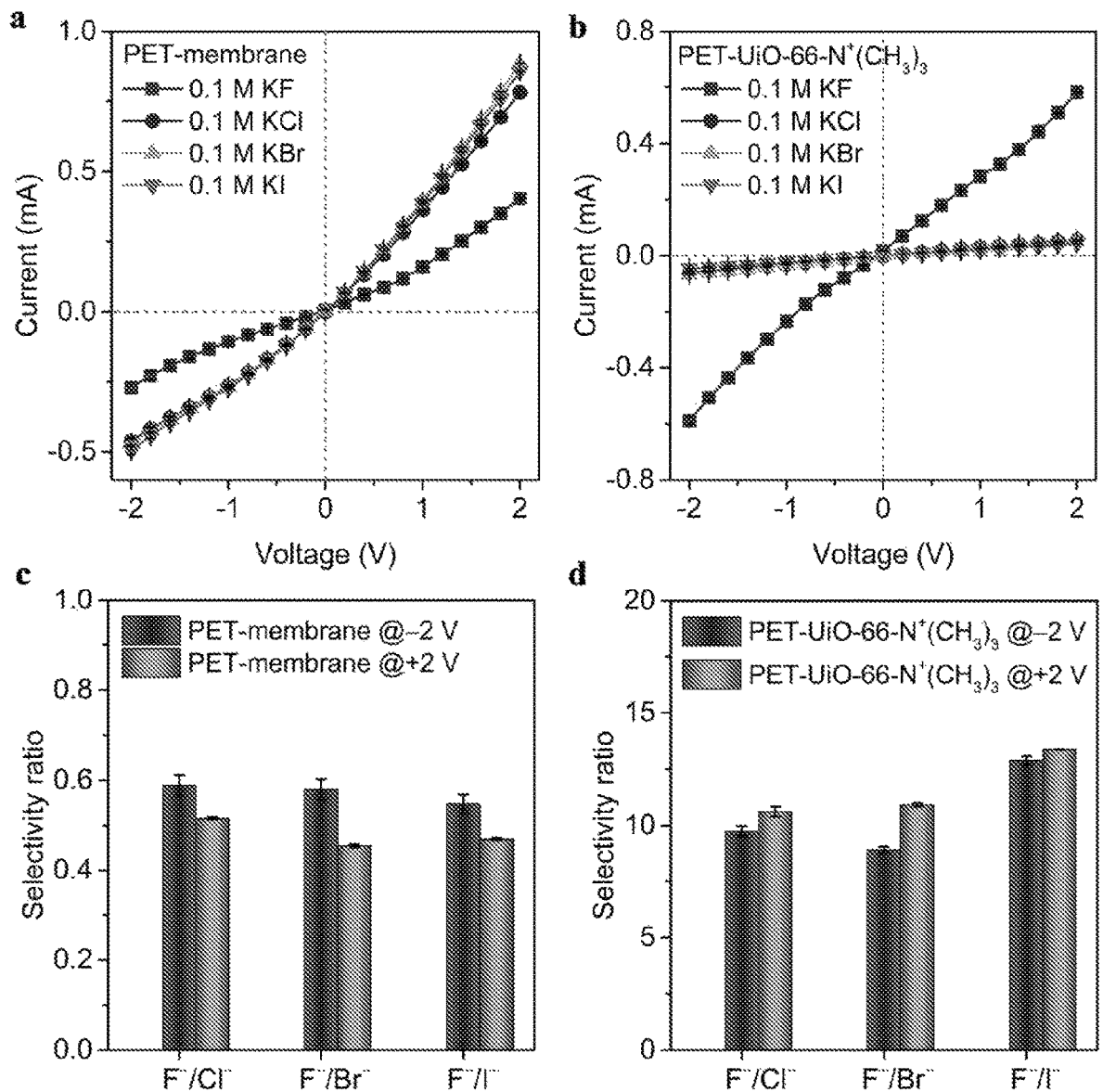
FIG. 46: F$^-$ selectivity of the PET multi-channel membrane. (A) I-V curves of the multiple-porous PET membrane under different 0.1 M electrolyte solutions. (B) I-V curves of the PET-UiO-66-N$^+$(CH$_3$)$_3$ membrane under different 0.1 M electrolyte solutions. (C) Selectivity ratios of the multiple-porous PET membrane at −2 V and 2 V. (D) Selectivity ratios of the multiple-porous PET-UiO-66-N$^+$(CH$_3$)$_3$ membrane at −2 V and 2 V.

Multichannel PET-UiO-66-N$^+$(CH$_3$)$_3$ membranes were fabricated for water defluoridation. The multichannel PET-UiO-66-N$^+$(CH$_3$)$_3$ membranes were fabricated in the same way as the single-porous membranes but based on multi-nanochannel PET membranes with pore density of $10^6$ cm$^{-2}$ (FIG. 31A). FIG. 31B shows I-V curves of a multichannel PET-UiO-66-N$^+$(CH$_3$)$_3$ membrane measured in 0.1 M KF, KCl, KBr and KI solutions (pH 5.7). See also FIG. 46. The multichannel PET-UiO-66-N$^+$(CH$_3$)$_3$ membrane shows similar ion transport order (F$^-$>Cl$^-$>Br$^-$>I$^-$) as the single-channel PET-UiO-66-N$^+$(CH$_3$)$_3$ membrane (see FIG. 40C). Selectivity ratios of F$^-$/Cl$^-$, F$^-$/Br$^-$, and F$^-$/I$^-$ of the multichannel MOF membrane at +2 V are 10, 11, and 13, respectively (FIG. 31C), which are lower than those of the single-channel MOF membrane. This is because of that the multichannel MOF membranes may possess more defects in the MOF frameworks compared to the single-porous membrane.

Example 4

This example reports the fabrication of a PET-NC membrane containing UiO-66-(COOH)$_2$ within the nanochannels (NC), and reports results of monovalent ion/divalent ion selectivity in comparison with a PET-NC membrane without the UiO-66-(COOH)$_2$.

Synthesis of UiO-66-(COOH)$_2$ Seeds by Hydrothermal Method

In a typical procedure, 1.4 g of ZrCl$_4$ was dissolved in 5 mL of MilliQ water and sonicated for 10 mins. 1.5 g of H$_4$BTEC was dispersed into 15 mL of MilliQ water and stirred at 600 RPM at room temperature for 20 mins. Afterwards, the above two solutions were mixed and stirred for another 20 mins. The thus mixture was sealed into a PTFE-lined autoclave and then transferred into a preheated oven at 100° C. for 48 h under static conditions. After cooling down to room temperature, the synthesized product was centrifuged and washed with water and methanol for 3 times respectively and finally dried at 80° C. under vacuum for 16 h. The obtained white product was ground into fine powder to be used as the UiO-66-(COOH)$_2$ seeds.

Preparation of UiO-66-(COOH)$_2$-SNC by a Facilitated Interfacial Growth Strategy A facilitated interfacial growth strategy was developed to assemble UiO-66-(COOH)$_2$ into the confined nanochannel of PET film. 0.1 g of UiO-66-(COOH)$_2$ seeds was dispersed into 10 mL of MilliQ water and sonicated for 1 h before being put into two cells separated by the PET film. Driven under −2 V for 20 mins, the UiO-66-(COOH)$_2$ seed particles migrated and then deposited into the nanochannel. After washing with distilled water to remove the seed attached on the film surface, the seeded PET NC was clamped by home-made interfacial synthesis equipment consisting of two cells, one of which was filled with 5 mL of ZrCl$_4$ (0.35 g) solution and the other side with 5 mL of H$_4$BTEC (0.38 g) solution. The interfacial synthesis equipment was then sealed into a PTFE-lined autoclave and transferred into a preheated oven at 100° C. and maintained for 48 h under static conditions. When the interfacial synthesis ended, the MOF modified PET film was taken out, washed with distilled water, and finally dried at room temperature.

Results and Discussion

Figure 47:
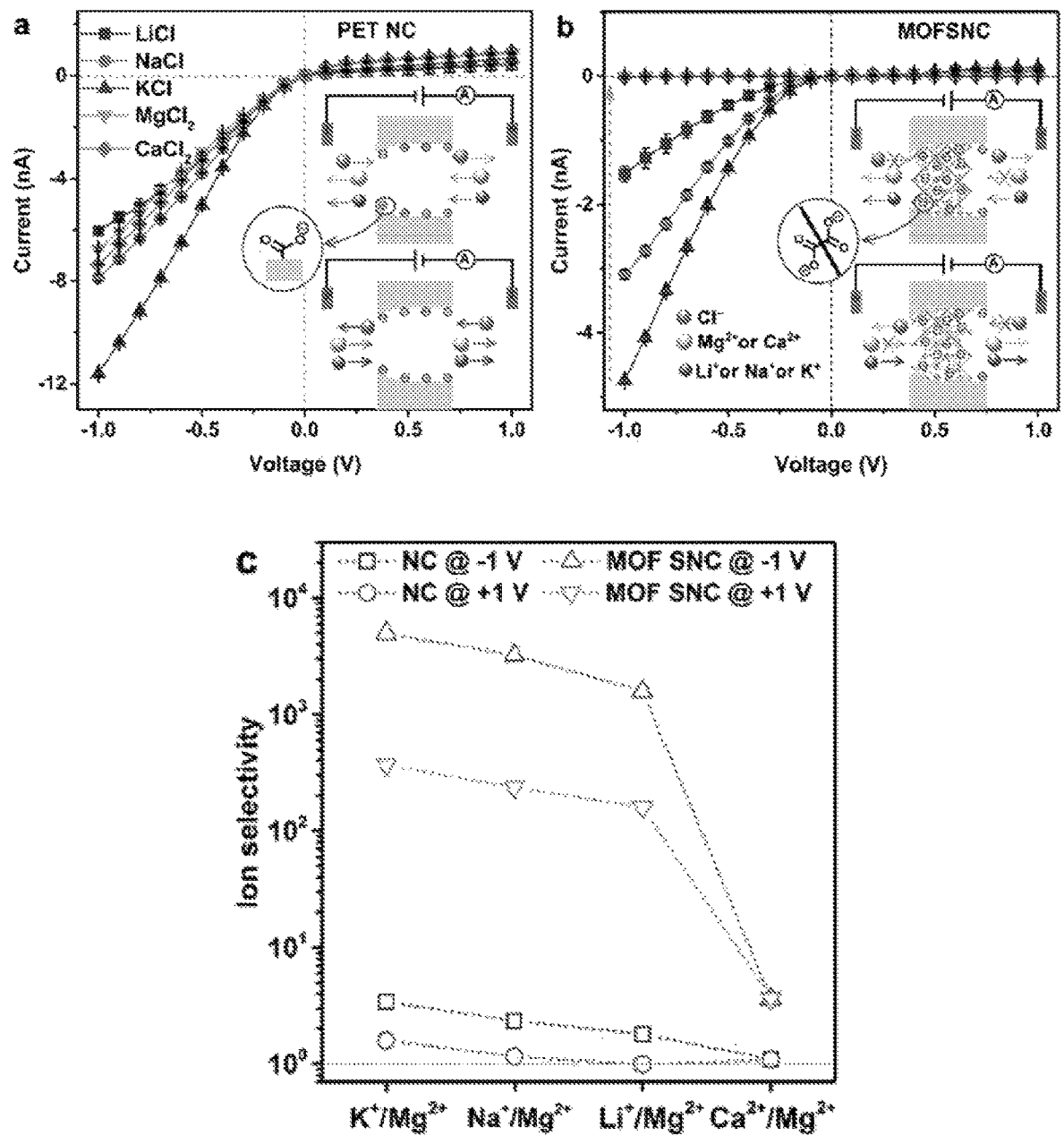
FIGS. 47(a) and (b): (a) Asymmetric I-V curve of the bullet-shaped PET NC, and (b) asymmetric I-V curves of the bullet-shaped PET NC after growth of UiO-66-(COOH)$_2$, measured in 0.1 M LiCl, NaCl, KCl, MgCl2 and CaCl$_2$) solutions (pH 5.7). The inset schematics show ion flux direction of the negatively charged NC and MOFSNC at negative and positive applied voltages, respectively.
FIG. 47(c): Graph showing ion selectivity of the PET NC and MOFSNC membranes at ±1 V for K$^+$/Mg$^{2+}$, Na$^+$/Mg$^{2+}$, Li$^+$/Mg$^{2+}$, and Ca$^{2+}$/Mg$^{2+}$.

FIG. 47 illustrates results for ultrahigh and unidirectional monovalent/divalent metal ion selectivity in UiO-66-(COOH)$_2$—SNC. FIGS. 47(a) and (b) are asymmetric I-V curves of the bullet-shaped PET NC before (a, PET NC) and after (b, MOFSNC) growth of UiO-66-(COOH)$_2$, measured in 0.1 M LiCl, NaCl, KCl, MgCl$_2$ and CaCl$_2$) solutions (pH 5.7). Inset schematics show ion flux direction of the negatively charged NC and MOFSNC at negative and positive applied voltages, respectively. The negative charges are induced by the partial deprotonation of carboxylic groups on the channel wall and the MOF frameworks at pH 5.7, respectively. FIG. 47(c) shows ion selectivity of the NC and MOFSNC at ±1 V. K$^+$/Mg$^{2+}$, Na$^+$/Mg$^{2+}$, Li$^+$/Mg$^{2+}$, and Ca$^{2+}$/Mg$^{2+}$ selectivity ratios of the PET MOFSNC at −1 V are ~4948.0, ~3230.2, ~1590.1, and ~3.6, respectively, which are much higher than those of the PET NC. K$^+$/Mg$^{2+}$, Na$^+$/Mg$^{2+}$, Li$^+$/Mg$^{2+}$, and Ca$^{2+}$/Mg$^{2+}$ selectivity ratios of PET NC at −1 V are ~3.4, ~2.3, ~1.8, and ~1.1, respectively. The ion selectivity at +1 V are lower than those of the channel at −1 V, indicating that both NC and MOFSNC have asymmetric ion selectivity.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An ion selective separation membrane comprising:
a metal organic framework layer formed on, in, and/or around a substrate, the metal organic framework having a crystal structure that includes a first surface and a second surface and includes ion transport channels formed between respective pore windows in the first surface and the second surface, wherein the substrate is a porous substrate having a plurality of channels, and the metal organic framework layer is formed as a plug of metal-organic framework material within each of the channels of the substrate, wherein the channels of the substrate taper from a first diameter at a first surface of the substrate to a second diameter at a second surface of the substrate, wherein the first diameter is greater than the second diameter;

first and second electrodes to apply a potential difference across the membrane;

wherein the respective pore windows have a pore size that is less than the hydrated diameter of the ion for which the ion selective separation membrane is selective; and wherein the substrate is formed from a 2D layered material selected from the group consisting of graphene oxide, zeolite, $MoS_2$, $WS_2$, and BN.

2. The ion selective separation membrane of claim 1, wherein the metal organic framework is a material selected from the group consisting of: ZIF-8, UiO-66, UiO-66-$NH_2$, and UiO-66-$N^+(CH_3)_3$.

3. The ion selective separation membrane of claim 1, wherein the ion transport channels include a plurality of expanded regions, each expanded region separated by an internal pore having an opening that corresponds to the shape and size of the pore windows, and wherein the size of the expanded regions is greater than pore size of the pore windows.

4. The ion selective separation membrane of claim 1, wherein the ion selective membrane further includes a support layer, and the metal organic framework layer is applied to a surface of the support layer.

5. The ion selective separation membrane of claim 1, wherein the channels of the substrate are nanochannels having a size of from 5 nm to 200 nm.

6. The ion selective separation membrane of claim 1, wherein the pore size is from 2.8 Å and less than 1 nm.

7. The ion selective separation membrane of claim 1, wherein the membrane is selected from the group consisting of: an $Li^+$ ion selective membrane and an $F^-$ ion selective membrane.

8. A method for selectively separating ions in a polar solution, the method comprising:

providing an ion selective separation membrane comprising:

a metal organic framework layer formed on, in, and/or around a substrate, the metal organic framework having a crystal structure that includes a first surface and a second surface and includes ion transport channels formed between respective pore windows in the first surface and the second surface, wherein the substrate is a porous substrate having a plurality of channels, and the metal organic framework layer is formed as a plug of metal-organic framework material within each of the channels of the substrate, wherein the channels of the substrate taper from a first diameter at a first surface of the substrate to a second diameter at a second surface of the substrate, wherein the first diameter is greater than the second diameter; and first and second electrodes to apply a potential difference across the membrane;

wherein the respective pore windows have a pore size that is less than the hydrated diameter for which the ion selective separation membrane is selective;

exposing a polar solution containing a plurality of ions to the first surface; and applying a potential difference from 10 mV to 2 V across the membrane to selectively transport ions into a pore window in the first surface, through the ion transport channel, and out of a pore window in the second surface.

9. The method of claim 8, wherein the method is for selectively separating $Li^+$ ions from the polar solution, and the polar solution contains $Li^+$ ions and at least one further cation.

10. The method of claim 9, wherein the further cation is an alkali metal ion selected from the group consisting of $Na^+$, $K^+$, and $Rb^+$.

11. The method of claim 8, wherein the selectivity for the $Li^+$ ion is at least 1.1 in comparison to the further cation.

12. The method of claim 8, wherein the method is for selectively separating $F^-$ ions from the polar solution, and the polar solution contains $F^-$ ions and at least one further anion.

13. The method of claim 12, wherein the further anion is selected from the group consisting of $Cl^-$, $Br^-$, $I^-$, and $SO_4^{2-}$.

14. The method of claim 8, wherein the selectivity for the $F^-$ ion is at least 20 in comparison to the further anion.

15. An ion selective separation membrane comprising:

a nanoporous substrate having a plurality of nanochannels, the nanochannels extending through the nanoporous substrate from openings in a first surface of the nanoporous substrate to openings in a second surface of the nanoporous substrate, wherein the nanochannels taper from a first diameter at the first surface of the nanoporous substrate to a second diameter at the second surface of the nanoporous substrate, wherein the first diameter is greater than the second diameter; and a plug of a metal-organic framework material within each of the plurality of nanochannels;

the metal-organic framework having a crystal structure that includes a first surface and a second surface and including ion transport channels between respective pore windows in the first surface and the second surface; and wherein the respective pore windows have a pore size that is less than the hydrated diameter for which the ion selective separation membrane is selective.

16. A method of forming an ion selective separation membrane comprising:

crystallizing a metal-organic framework material from a metal ion and an organic ligand to plug nanochannels of a nanoporous substrate, the nanochannels extending through the nanoporous substrate from openings in a first surface of the nanoporous substrate to openings in a second surface of the nanoporous substrate, wherein the nanochannels taper from a first diameter at the first surface of the nanoporous substrate to a second diameter at the second surface of the nanoporous substrate, wherein the first diameter is greater than the second diameter;

wherein the metal-organic framework has a crystal structure that includes a first surface and a second surface and includes ion transport channels formed between respective pore windows in the first surface and the second surface; and wherein the respective pore windows have a pore size that is less than the hydrated diameter for which the ion selective separation membrane is selective.

17. The method of claim 16, wherein the step of crystallizing the metal organic framework includes:
    exposing the first surface of the nanoporous substrate to a ligand containing solution, and
    exposing the second surface of the nanoporous substrate to a metal ion containing solution;
    wherein the ligand containing solution and the metal ion containing solution infiltrate into the nanochannels of the nanoporous substrate through the respective openings in the first surface and the second surface of the nanoporous substrate, and react to crystallise the metal-organic framework material.

18. The method of claim 16, wherein the step of crystallizing the metal organic framework includes:
    filling the pores of the porous substrate with a solution comprising the metal ion and the organic ligand, and
    crystallizing the metal-organic framework material within the pores.

19. The method of claim 18, wherein the method includes submerging the porous substrate within the solution such that the solution infiltrates into the pores of the porous substrate.

20. The method of claim 19, wherein the method additionally includes heating the solution for a time sufficient to crystallize the metal-organic framework material within the pores.

21. The ion selective separation membrane of claim 15, further comprising first and second electrodes to apply a potential difference across the membrane.

22. A method for selectively separating ions in a polar solution, the method comprising:
    providing an ion selective separation membrane according to claim 1, and
    exposing a polar solution containing a plurality of ions to the first surface of the substrate; and
    applying a potential difference across the membrane to selectively transport ions into a pore window in the first surface, through the ion transport channel, and out of a pore window in the second surface.

23. The ion selective membrane of claim 1, wherein the ion selective membrane is a monovalent ion selective membrane.

* * * * *